United States Patent [19]
Hug et al.

[11] Patent Number: 5,806,078
[45] Date of Patent: Sep. 8, 1998

[54] VERSION MANAGEMENT SYSTEM

[75] Inventors: Richard A. Hug; Leon Presser, both of Santa Barbara, Calif.

[73] Assignee: Softool Corporation, Goleta, Calif.

[21] Appl. No.: 257,816

[22] Filed: Jun. 9, 1994

[51] Int. Cl.⁶ .................................................. G06F 15/00
[52] U.S. Cl. ........................................... 707/511; 707/203
[58] Field of Search ........................... 364/419.19, 225.3, 364/225.4, 225.6, 966, 400, 401, 402; 395/600, 772, 765, 779, 619, 712, 326; 707/200, 203, 511

[56] References Cited

U.S. PATENT DOCUMENTS

| | | | |
|---|---|---|---|
| 4,809,170 | 2/1989 | Leblang et al. | 364/200 |
| 5,231,577 | 7/1993 | Koss | 395/140 |
| 5,303,146 | 4/1994 | Ammirato et al. | 395/764 |

Primary Examiner—Gail O. Hayes
Assistant Examiner—Frantzy Poinvil
Attorney, Agent, or Firm—Wilson Sonsini Goodrich & Rosati

[57] ABSTRACT

A version management system for storing and retrieving changes to spreadsheet and word processor documents on a digital computer. The version management system is preferably integrated into the interface of existing spreadsheet or word processing software to permit a user to access a plurality of versions of spreadsheet or word processing documents. An original version of each document and all alternative versions are stored in a delta format, i.e., storing only the differences from a prior document version, in a common difference data file and version data file. A delta-formatted document will generally require less storage than an entire alternative version. Additionally, this delta formatting facilitates generating difference reports that emphasize the differences between multiple versions of a document. These difference reports are of particular value when applied to spreadsheet and word processing documents.

29 Claims, 61 Drawing Sheets

| Project 1 | | | Project 2 | | | Project 3 | | |
|---|---|---|---|---|---|---|---|---|
| F I L E 1 | F I L E 2 | F I L E 3 | F I L E 1 | F I L E 2 | F I L E 3 | F I L E 1 | F I L E 2 | F I L E 3 |

Version Open

Project:

File:

Version number/name:

File Open Type
- ○ Read-Write (default)
- ○ Read-Only

☐ Check out latest version

[OK]  [Cancel]

Version Save

Project:
WWWWWWWWWWWWWWWWWWWWWWWWWWWWWWWWWWWWWWWWWWWWW

File: WWWWWWWWW.WWW

Existing Versions:

New Version: 3.1.1.1.1

Save Type
- ⦿ Create New Version
- ○ Override Existing Version
- ○ Create Branch from Existing Version

Version name:

Changed by:

Date: 06/19/94   Time: 12:32 pm

Change Comment:

[OK]  [Cancel]

FIG. 10

| | [VERSIONS.XLW]Version 1 | | | |
|---|---|---|---|---|
| | A | B | C | D |
| 1 | Music Budget | | | |
| 2 | | | | |
| 3 | | 1993 | 1994 | Difference |
| 4 | Software | $860.00 | $325.00 | ($535.00) |
| 5 | Office Supplies | $100.00 | $75.00 | ($25.00) |
| 6 | Music scores | $50.00 | $175.00 | $125.00 |
| 7 | Instrument Purchase | $425.00 | $4,000.00 | $3,575.00 |
| 8 | Instrument Maintenence | $227.75 | $680.00 | $462.25 |
| 9 | Total> | $1,662.75 | $5,255.00 | $3,592.25 |

FIG. 15

| | [VERSIONS.XLW]Version 2 | | | |
|---|---|---|---|---|
| | A | B | C | D |
| 1 | Music Budget | | | |
| 2 | | | | |
| 3 | | 1993 | 1994 | Difference |
| 4 | General Software | $860.00 | $325.00 | ($535.00) |
| 5 | Office Supplies | $75.25 | $75.00 | ($0.25) |
| 6 | Music score purchases | $50.00 | $175.00 | $125.00 |
| 7 | Instrument Purchase | $425.00 | $6,250.00 | $5,825.00 |
| 8 | Instrument Maintenence | $227.75 | $120.00 | ($107.75) |
| 9 | Total> | $1,638.00 | $6,945.00 | $5,307.00 |

FIG. 16

| | OLDDATA.XLS | | | |
|---|---|---|---|---|
| | A | B | C | D |
| 1 | Music Budget | | | |
| 2 | | | | |
| 3 | | 1993 | 1994 | Difference |
| 4 | *Software* | $860.00 | $325.00 | ($535.00) |
| 5 | Office Supplies | *$100.00* | $75.00 | *($25.00)* |
| 6 | *Music scores* | $50.00 | $175.00 | $125.00 |
| 7 | Instrument Purchase | $425.00 | *$4,000.00* | *$3,575.00* |
| 8 | Instrument Maintenence | $227.75 | *$680.00* | $462.25 |
| 9 | Total> | *$1,662.75* | *$5,255.00* | *$3,592.25* |

FIG. 17A

| | NEWDATA.XLS | | | |
|---|---|---|---|---|
| | A | B | C | D |
| 1 | Music Budget | | | |
| 2 | | | | |
| 3 | | 1993 | 1994 | Difference |
| 4 | *General Software* | $860.00 | $325.00 | ($535.00) |
| 5 | Office Supplies | *$75.25* | $75.00 | *($0.25)* |
| 6 | *Music score purchases* | $50.00 | $175.00 | $125.00 |
| 7 | Instrument Purchase | $425.00 | *$6,250.00* | *$5,825.00* |
| 8 | Instrument Maintenence | $227.75 | *$120.00* | *($107.75)* |
| 9 | Total> | *$1,638.00* | *$6,945.00* | *$5,307.00* |

FIG. 17B

[UIME.XLW]Top Level Implementation

User Interface Module/Excel      UIM/E
User Interface Module/All      UIM/A
Data Processing Module      DPM
File Management Module      FMM

[UIME.XLW]Exit Sequence

[UIMA.XLW]Project Create Dialog Initialization

User Interface
Module/All

[UIMA.XLW]Project Delete Dialog Initialization

User Interface
Module/All

[FMM.XLW]Checkout Processing

[FMM.XLW]Project-File-Version Lists

[FMM.XLW]Project-File-Version Lists

[FMM.XLW]Project-File-Version Lists

Module Name: *deListchangeItem*

Module Name: *Delta Engine Components*

VERSION MANAGEMENT SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to version management systems for spreadsheet and word processing documents and more particularly to systems for minimizing storage requirements by storing delta-formatted versions of such documents and systems that generate difference reports to facilitate comparisons between different versions of a document.

Common uses for computers, especially personal computers, include the processing of documents by spreadsheet processors, using programs such as Lotus 1-2-3, Microsoft Excel and Borland Quattro Pro, for displaying a tabular presentation of numerical data and word processors, using programs such as WordPerfect, Microsoft Word and Lotus Ami Pro, for generating and modifying primarily textual data. One of the major strengths of a computer is that its use allows a user to generate and evaluate modifications from original versions of documents. As part of this evaluation, a user or group of users may desire to compare different versions of these documents to determine an optimum result. Presently, this requires the storage of multiple versions of each document, which multiplies the data storage, i.e., disk storage, requirements of the computer. While disk storage capacity has vastly increased since the introduction of the IBM PC as well as the availability of disk compression software, it is still desirable to minimize disk storage requirements. Additionally, the known capabilities for comparing documents is limited. For example, Microsoft Excel is known to be able to generate a list of differences by cell addresses but fails to show version comparisons within its normal spreadsheet display format.

SUMMARY OF THE INVENTION

The present invention is directed toward a version management system, applicable for maintaining a plurality of versions of spreadsheet or word processing documents, for operation on a digital computing system, e.g., a personal computer (PC). Embodiments of the present invention preferably include delta-formatting means for storing subsequent versions of each document such that only changes from each prior version are stored.

A version management system in accordance with the invention preferably includes a version management processor operating in combination with a document processor for storing and retrieving a plurality of documents stored in a digital computer. An original version of a document is stored in a common file with subsequent versions of the document as delta-formatted data representative of the differences from a each prior version document.

In a preferred embodiment of the present invention, all of said delta-formatted document versions are stored in a pair of commonly used files where a first file contains said delta-formatted data pertaining to differences from a prior version of a document and a second file contains identification data and pointers for selecting delta-formatted data from within the first file to be applied to generate a desired document version.

Embodiments of the present invention preferably include means to format documents to emphasize changes between versions. In one mode, only difference data is displayed and any unaltered data, such as in a spreadsheet, is displayed with a value of 0. Alternatively, the altered data is formatted according to user-selectable options to emphasize the changes via bolding, font selection or color.

In a preferred embodiment, sets of delta-formatted data are consecutively applied to regenerate intermediate files until a desired version is regenerated. In an alternative embodiment, the delta-formatted data is directly applied to the original version of a document.

Embodiments of the present invention preferably include version management processors for interfacing to spreadsheet processors, e.g., Lotus 1-2-3, Microsoft Excel and Borland Quattro Pro, and word processors, e.g., Microsoft Word, WordPerfect and Lotus Ami Pro.

Other features and advantages of the present invention should become apparent from the following description of the presently-preferred embodiments, taken in conjunction with the accompanying drawings, which illustrate, by way of example, the principles of the present invention.

BRIEF DESCRIPTION OF THE DRAWINGS

FIGS. 9–14 comprise representations of various dialogue boxes accessible from the menu of FIG. 7;

FIGS. 15–16 comprise displays representative of two versions of a spreadsheet document as normally displayed by a spreadsheet processor;

FIGS. 17A–17C comprise alternative representations of difference data displays available from a preferred embodiment;

FIGS. 18–21 comprise additional representations of various dialogue boxes accessible from the menu of FIG. 7.

DESCRIPTION OF THE PREFERRED EMBODIMENTS

Figure 1:
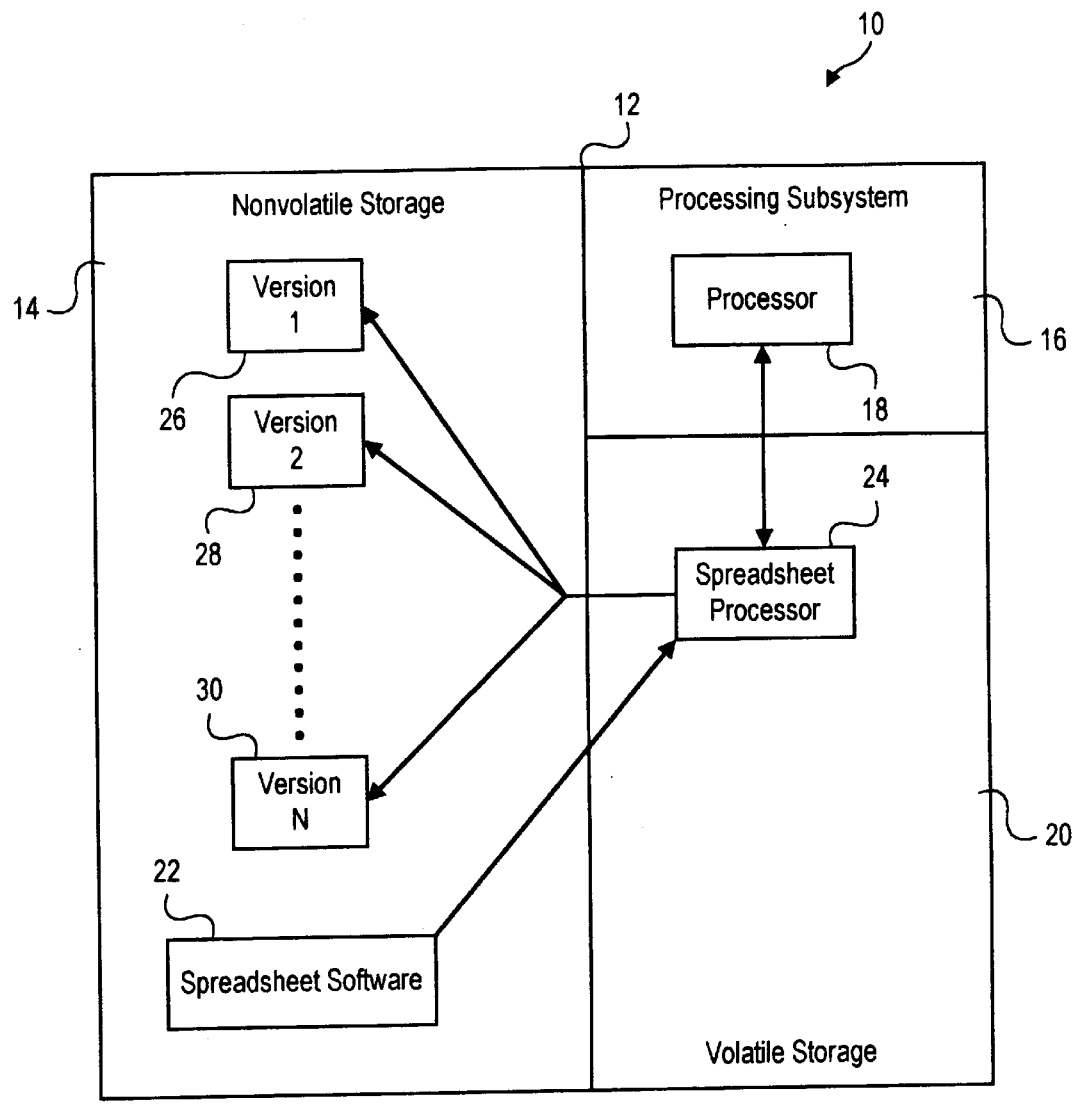
FIG. 1 comprises a typical prior art spreadsheet processing system.

Throughout the following detailed description, similar reference characters refer to similar elements in all figures of the drawings.

With reference now to the drawings, and particularly to FIG. 1, there is shown a block diagram of a typical prior art system 10 that can process a plurality of different versions of a document. An exemplary system for processing spreadsheets is now described. However, it should be recognized that word processing systems operate in a similar manner. Typically, processing systems are comprised of a personal computer (PC) 12 having a nonvolatile storage device 14 such as a hard disk and a processing subsystem 16 that includes a digital processor 18 and a volatile storage 20 device such as a RAM. Spreadsheet software 22 is stored within the nonvolatile storage 14 where it is fetched by the processing subsystem 16 and loaded into the volatile storage 20 for execution by the digital processor 18. The digital processor 18, under control of a spreadsheet processor 24 (which is essentially a copy of the spreadsheet software 22 in volatile storage 20), can be controlled by a user to retrieve one of a plurality of versions of documents 26, 28 or 30, stored as files in the nonvolatile storage 14. In such systems, each version 26, 28 and 30 is a stand-alone document, that is, each document can be retrieved by the processing subsystem 16 without any reference to a prior version. This technique ignores the potential commonalities between versions and thus much of the contents of the nonvolatile storage 14 is potentially redundant on prior versions of documents. Thus, in particular for a spreadsheet document where only cell data has been modified between versions, the file size of each version of a document will be essentially identical.

Figure 2:
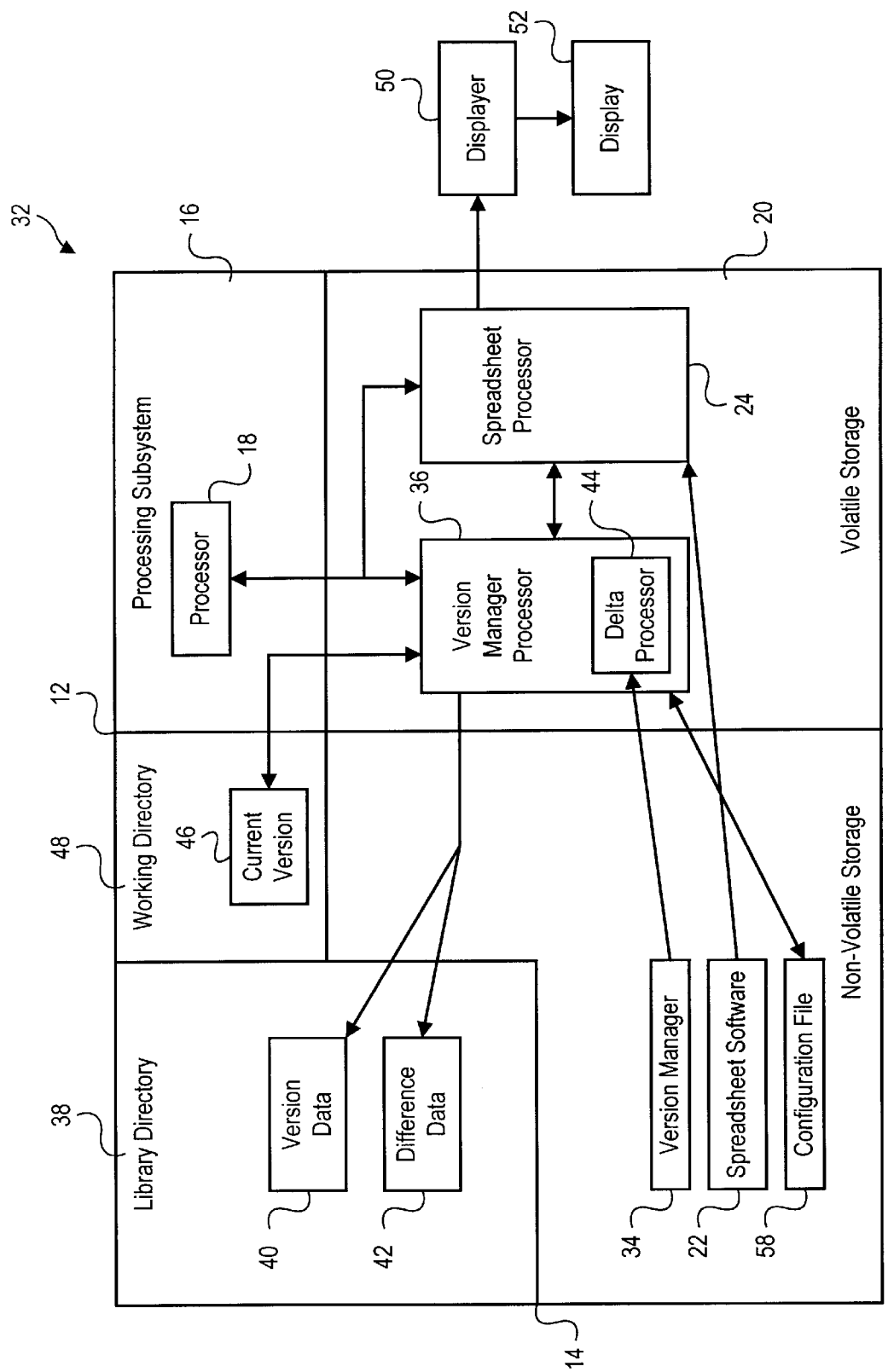
FIG. 2 comprises a functional block diagram of a version management system in accordance with the present invention as applied to spreadsheet processing.

With reference now to FIG. 2, there is shown a preferred embodiment of a version management system 32 that minimizes the storage requirements from the prior art and additionally provides improved means for comparing different document versions. In a manner similar to the prior art, the PC 12 is still comprised of nonvolatile storage 14, a processing subsystem 16, spreadsheet software 22 that is loaded into volatile storage 20 in the processing subsystem 16 for processing documents under control of the spreadsheet processor 24. However, preferred embodiments of the present invention additionally comprise version manager software 34. The version management software 34 and the spreadsheet software 22 are loaded into the volatile storage 20 in the processing subsystem 16 to form a version manager processor 36. The version manager processor 36 serves as an interface between the spreadsheet processor 24 and information stored in a library directory 38. The information in the library directory 38 includes a pair of version control files (a version data file 40 and a difference data file 42) corresponding to all existing document versions (Versions 1-N), all stored in the nonvolatile storage 14. The version manager processor 36 additionally comprises a delta processor 44 that stores and retrieves each version of a document in reference to each prior version using the version control data files 40 and 42.

When versions are retrieved from the library directory 38, this operation is referred to as checking out a document. Similarly, when a subsequent version is stored in the library directory 38, this operation is referred to as checking in a document. Each version of a document is stored as a set of variable-sized delta-formatted data records representing characters, words, lines, paragraphs, or any other elementary portion of a document. Initially, when Version 1 of a document is checked out from the library directory 38, the Version manager processor 36 recognizes this document as an original version and thus transfers this document, essentially unchanged, as a current version 46 to a working directory 48 where it is accessible to the spreadsheet processor 24. One may regard Version 1 of a document as a single delta-formatted record showing the differences from a void document, thus it may be used in its entirety without significant processing. However, if Version 2 of a document is checked out from the library directory 38, the version manager processor 36 recognizes this as a subsequent version. The version manager processor 36 will first retrieve Version 1 of the document from the common version control data files 40 and 42 and then fetch the set of data records pertaining to Version 2 from the version control data files 40 and 42 and use their contents to modify the data previously retrieved from Version 1 of the document. The spreadsheet processor 24 drives a displayer 50 to generate a display 52. The displayer 50 is usually a video monitor and/or a printer and the display 52 is a video screen and/or a printed page.

Since the version control data files 40 and 42 contain only difference or delta data from each prior version document, this data is referred to as being delta formatted. Document versions saved in a delta format generally require less disk space than the original documents. Similarly, if Version 3 of a document is checked out from the library directory 38, the version manager processor 36 will first fetch Version 1 of the document from the version control data files 40 and 42 to generate the original document and then fetch data records pertaining to Version 2 of the document from the version control data files 40 and 42. The version manager will then use the delta processor 44 to apply the delta-formatted data contained within the version control data files 40 and 42 to regenerate an intermediate Version 2 document. The version manager processor 36 will then process the delta-formatted data from version control data files 40 and 42 pertaining to Version 3, and the delta processor 44 will apply this delta-formatted data to the intermediate Version 2 document that was just regenerated, to regenerate the Version 3 document. This regenerated Version 3 document is then stored as the current version 46 for processing by the spreadsheet processor 24. This process can similarly iteratively repeat for Version N of a document. Embodiments of the present invention preferably support versions and subversions of a document and thus limit the number of regeneration iterations required. Thus, a Version 2.1.1 of a document is regenerated from Version 1 of a document and a regenerated Version 2 document but will not require regenerating Version 3 of a document. This concept, referred to as branching, is described further below. In an alternative embodiment, the delta-formatted data within the version control data files 40 and 42 can directly reflect Version N changes from Version 1, the original version, of a document 26 without referencing any intermediate delta-formatted data and thus without generating any intermediate versions, e.g., Version 2, Version 3, etc.

Figure 3:
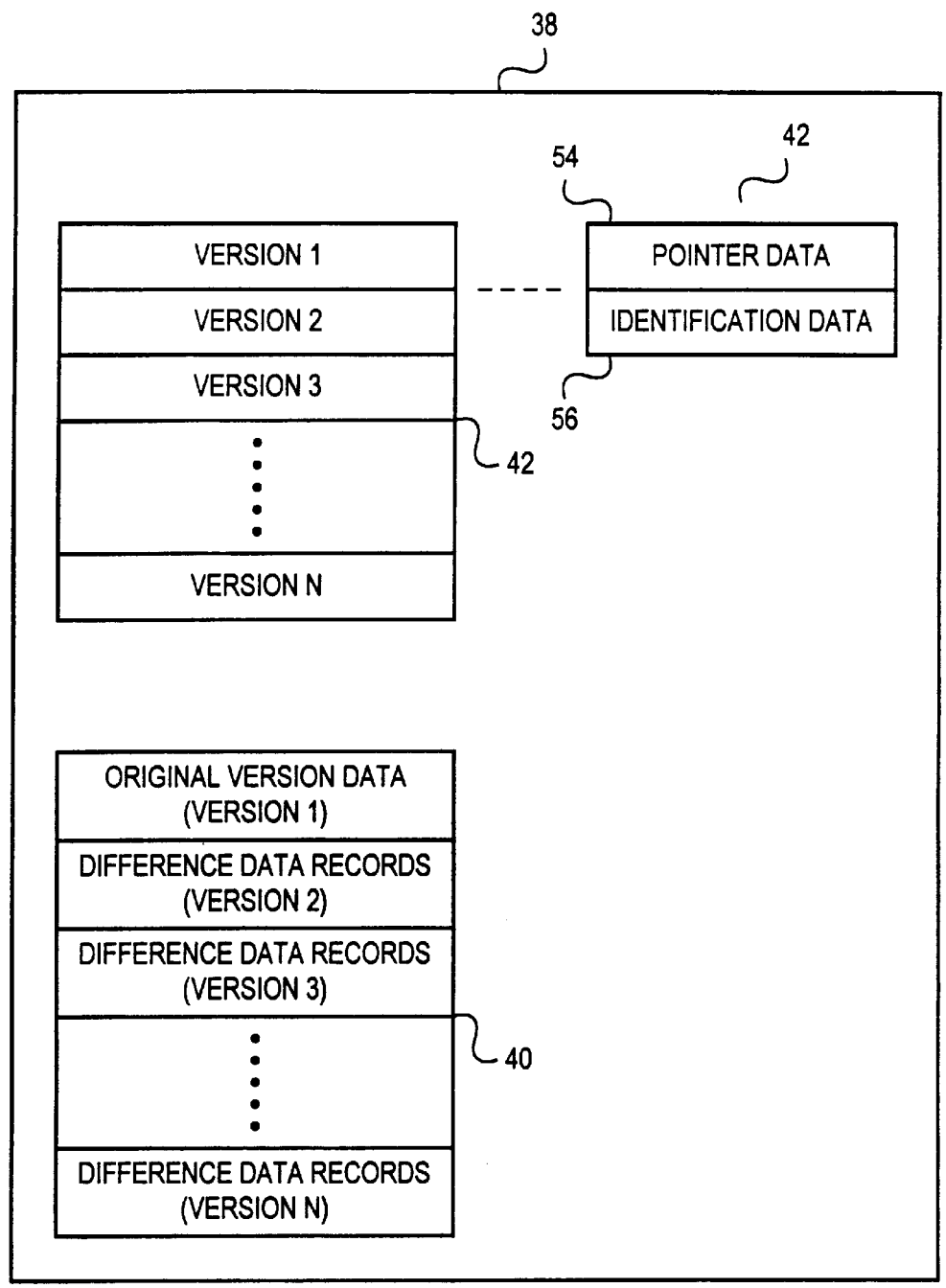
FIG. 3 comprises a simplified block diagram of the structure of version control files comprising a version file and a delta-formatted difference file.

FIG. 3 shows the basic structure of the version control data files 40 and 42. The difference data file 42 contains sets of data records reflecting the delta-formatted differences from each prior version of a document, e.g., the changed data and the cell location in a spreadsheet. The first set of data records pertains to Version 1 of a document, that is the original unmodified document. Since this is the first version it reflects the differences from a void document and thus contains Version 1 of the document essentially intact. One or more records exist for each document version. Thus, the difference data file can contain a large number of data records since there can be a large number of versions and changes peculiar to each version. If a system required access to each data record to determine its relevance for a particular version, the performance of such a system would be degraded. Thus, the version data file 40 preferably contains a set of pointers 54 for each stored document version that point to a set of data records in the difference data file 42 that are used to regenerate each document version. By using the set of pointers 54 from the version data file 40, a significant speed improvement is accomplished.

In addition to the pointer data 54, the version data file 40 additionally stores identification data 56 for providing attributes to each version changed from the prior version. The identification data 56 preferably identifies the date and time the version was created, a version name associated with the version, text describing the reason for the change, and the user making the change. When a new document is saved, i.e., checked in, to the library directory the version manager processor generates the version data file 40 and the difference file 42 for the new document. When each subsequent version is checked in to the library directory 38, the version manager processor 36 using the delta processor 44 updates and stores the version data file 40 and the difference data file 42 to reflect the changes in the subsequent version.

As a consequence of the previously-described delta-formatted storage method, embodiments of the present invention can generate data adapted to display the differences between any two selected document versions. For example, the set of delta-formatted data for a particular version preferably contains data that directly represents the difference between two consecutive versions of the document. Normally, a regenerated version file is displayed as a plurality of display fields, each having a character display format inherent to each display field. Instead of displaying the regenerated version document according to its inherent character display format, the user can direct the version manager processor 36 to alter the character display format for display fields which reflect differences between selected document versions. The method used to display this data is determined by the user and stored within a configuration file 58 (FIG. 2) retained in the nonvolatile storage 14. In a preferred embodiment, these differences can be displayed through any combination of bolding, font type, or changes in color of display.

A preferred embodiment of the present invention is currently under development by the assignee of the present invention. In this embodiment, shown in the following pages, a version management system adapted for a Microsoft Excel spreadsheet processing system operating under Microsoft Windows is described. It should be apparent to one of ordinary skill in the art that the teachings of this application are equally applicable to other spreadsheet processors and word processors operating on a PC or any computing system. The following comprises a Product Description that includes a description of different parts of software in processing data, and a User Interface Description that includes features that can be selected by a user. With this embodiment, a user identifies a document by its name and by an available version number, preferably from a list of available documents and associated versions. These two choices are provided to the version manager processor 36 that uses the previously described process to regenerate the selected document version.

1. Product Description

The spreadsheet version control processor 36 stores document versions in an independent library directory 38, as defined by the user. Alternative versions of a document will be stored in delta file format, thus minimizing storage space. Stored versions can be retrieved at any time, worked on, saved in a working directory, and then checked back into the library structure as a new version. If a document version before the "latest" version is checked out, the user can save it as the "latest" or "interim" (branch) version.

1.1 Software Execution

This product will be installed so that it will automatically execute whenever the host application is initiated, where the host application is defined as the spreadsheet application using version control. Additional menu selections will provide access to all software functionality.

1.2 Data Storage & Retrieval

Figure 4:
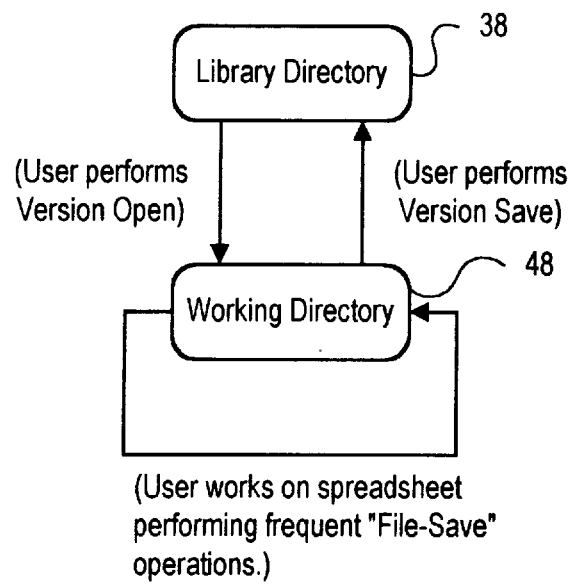
FIG. 4 comprises a simplified block diagram of the check-in, check-out procedure to the library directory.

This product will store all of its data in the library directory 38 on a hard disk, which is designated by the user. With reference to FIG. 4, a file is checked out and locked from the library directory, and copied to the working directory 48. While the file is being updated, it can be saved using the File-Save option from the main menu, and it will be stored in the working directory 48 during this period. When final modifications are saved to the working directory 48, the user can then perform a Version Save which will be an option provided in this product's main menu. At this point, the file will be automatically saved again to the working directory 48. It is then copied to the library directory 38. While a copy of the file will remain in the working directory 48, it will have the read-only attribute switched on so that modifications cannot be made to it without performing a check-out from the library 38.

Data storage will be performed by creating directory structures to separate project areas. Each project will further be divided into sub-directories as needed by the software. There will be a base library directory. In the base library directory, project sub-directories will be created—one to each project. As project names can be more than 8 characters long, a database file will be written to the library directory which will map each project name to a given project directory. (The maximum length of a project name is 40 characters.)

Figure 5:
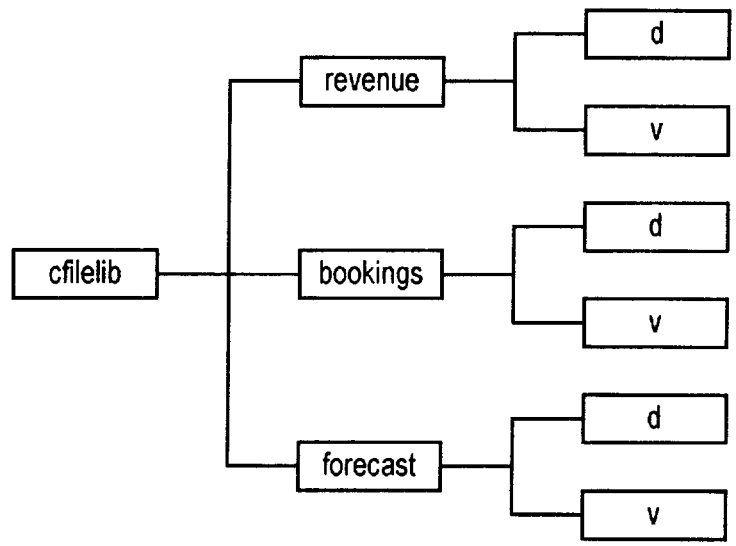
FIG. 5 comprises a simplified block diagram of the structure of a project area.

Within each project directory, there will be two sub-directories—one is d and the other is v where d is for storing the difference data files 42 and v is for storing the version data files 40. A sample directory tree is shown in FIG. 5. In this example, cfilelib is the base library directory. Revenue, bookings, and forecast are project sub-directories that represent various areas, such as would be used by an accountant. In each of these subdirectories exists additional sub-directories known as d and v, as described above.

The current status of each given document is maintained in its respective version data file 40 within sub-directory v. This will be accomplished in the file header. As for information that goes along with each version, data strings will be inserted in each version's records in the version data file 40. This will include the name of the version, the person who changed it and the change comment. (Other information, such as date & time and version number are already stored in this file.) The file header will hold information about whether a document is checked in, checked out, read/write status and the version that is checked out.

1.3 Version Numbering

For library check-ins, this product will create a new version number automatically. The baseline copy of a given document will be version number 1. Its revisions would then be versions 2, 3, 4, and so on. Branched versions are numbered 1.1.1, 3.2.2, 5.1.2.3.2, 3.10.23.1.2, or some combination fitting this pattern. Periods are used as branching level separators. Also, each version number will be required to have an odd number of numbers. Thus, 1, 1.1.1, 1.1.1.1.1, and 1.1.1.1.1.1.1 are valid version numbers, and 1.1, 2.2.2.2, and 3.3.3.3.3.3 are invalid version numbers.

1.4 Branching

Branching will be utilized on demand by the user. Under normal conditions, versions of a document will be designated by single-level version numbers. If the stored versions are 1, 2, and 3, and version 3 is the latest version and versions 1 or 2 are checked out, the newly-created version will be version 4. Branching can be manually selected by the user at save. In this specific case, a check-out of version 2 and then a check-in with branching will yield version 2.1.1. Checking in a new version 2.1.1 will yield version 2.1.2. The branch of version 2.1.1 would be version 2.1.1.1.1. Up to five (5) branching levels will be allowed (i.e., Version 1.2.1.1.1 has the maximum number of parts available) in the display, although the software itself allows for more branching levels. A sample tree with branches is as follows:

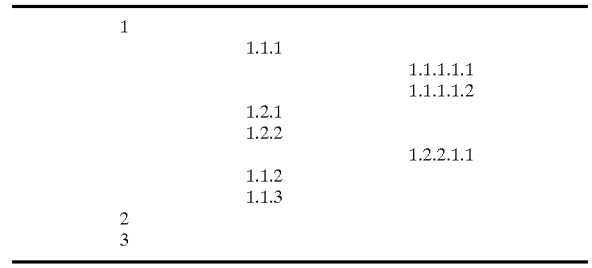

1.5 Version Naming

At check-in, a version name and description will be requested from the user. If an accountant were to create a spreadsheet called Bookings in January and check it into the library, this would automatically be known as Version 1. The accountant could then use "January_93" for the version name. The comment could be "January 1993 Bookings & Cost". Version names will be limited to 25 characters.

1.6 Creating a New Spreadsheet and First-time Check-in

A new spreadsheet will be created in the ordinary way of selecting File-New from the menu bar. As soon as data is entered, the user selects Version Save As . . . from the FileVersion menu.

For an already-existing spreadsheet, that file is opened as any ordinary spreadsheet. The user selects FileVersion, Version Save As . . . to check the selection into the library. During check-in, the read-only attribute is set in the working directory, and the files will be accessible from the working directory, but cannot be changed until a version open is accomplished.

1.7 Project Groups

Figures 6, 7:
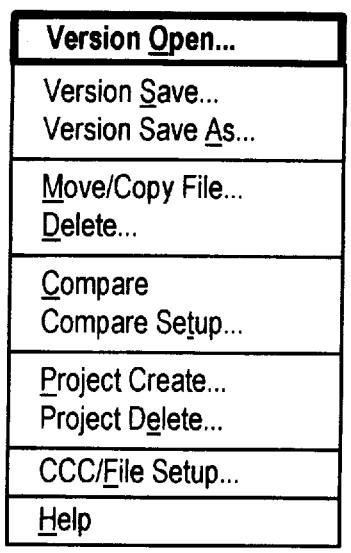
FIG. 6 comprises a simplified block diagram of the structure of a project group.
FIG. 7 comprises a representation of the menu for a preferred embodiment.

Any number of files can be stored in one group. This group will be known as a project. Groups of related files and their offspring ("versions") will reside in a given project directory. This concept is illustrated in FIG. 6.

1.8 On-line Help

On-line help will be available to the user by selecting help from the main menu. This will be accomplished using a separate help file in conjunction with the Microsoft Windows help engine.

2. User Interface Description

2.1 Program Menu

Figure 8:
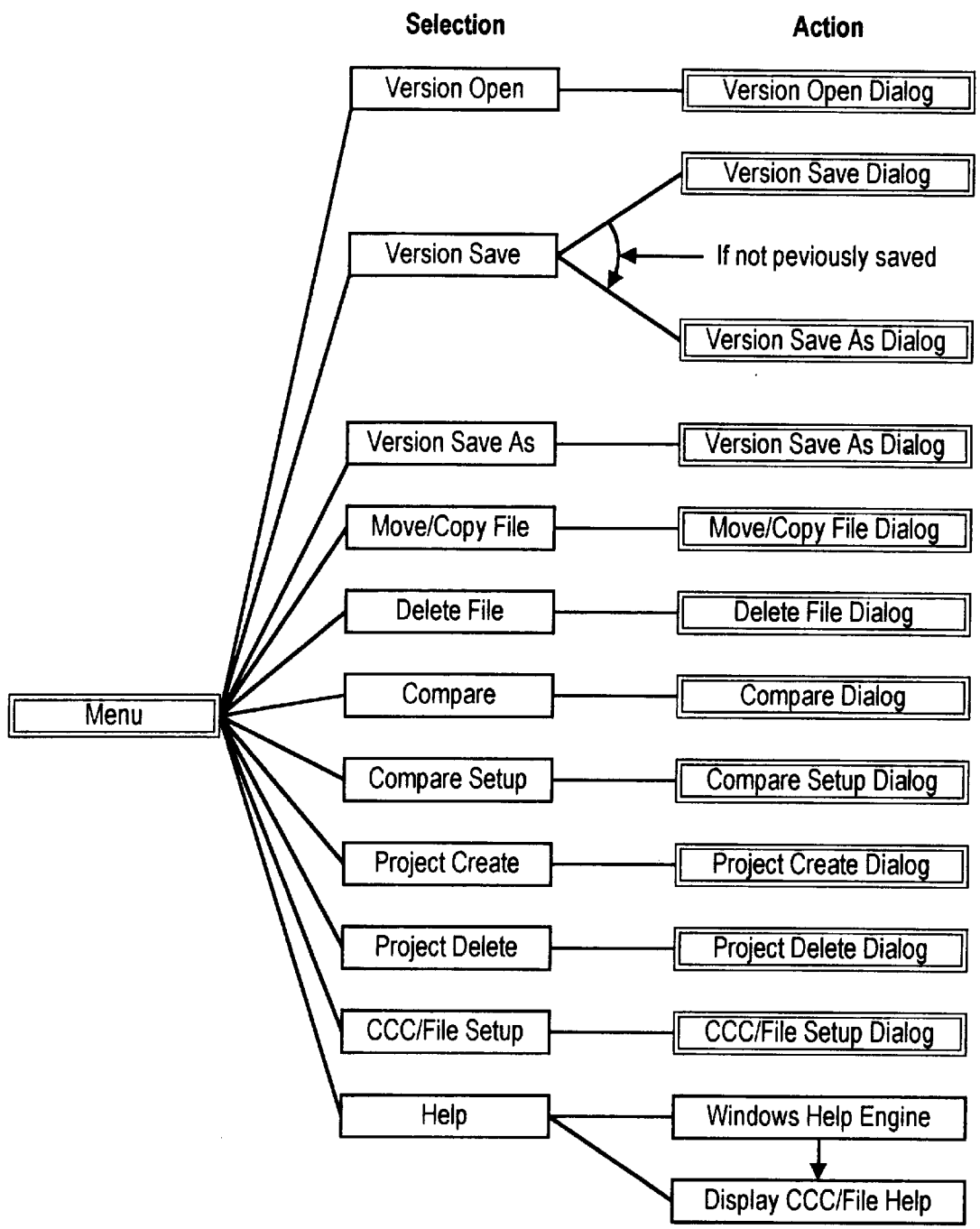
FIG. 8 comprises a block diagram of the functions available from the menu in FIG. 7.

A menu selection will be added to the spreadsheet menu bar. This will consist of the word FileVersion and it can be activated by a mouseclick, or by hitting the <ALT> key followed by the "l" key (standard Window's functionality). This menu modification will occur during host application initialization and will appear as shown in FIG. 7. The program execution associated with this menu selection process can be generally described by the block diagram shown in FIG. 8.

2.2 Version Open Dialogue

The Version Open dialogue allows the user to perform library check-out functions. Selection is done by project, file (document), and version number/name. A checkbox appears for the latest version to be checked out by default. The user can change this by un-checking the latest version checkbox and selecting an alternate version. The version combo-box will be disabled by changing its color from black to gray when the latest version checkbox is checked. The Version Open dialogue appears as shown in FIG. 9.

2.3 Version Save Dialogue

The Save dialogue allows the user to perform library check-in functions. If the document to be checked in does not yet have a baseline version (that is, the document does not yet exist in the selected project), then the Save as . . . dialogue automatically appears. The Save dialogue appears as shown in FIG. 10.

2.4 Save As . . . Dialogue

Figure 11:
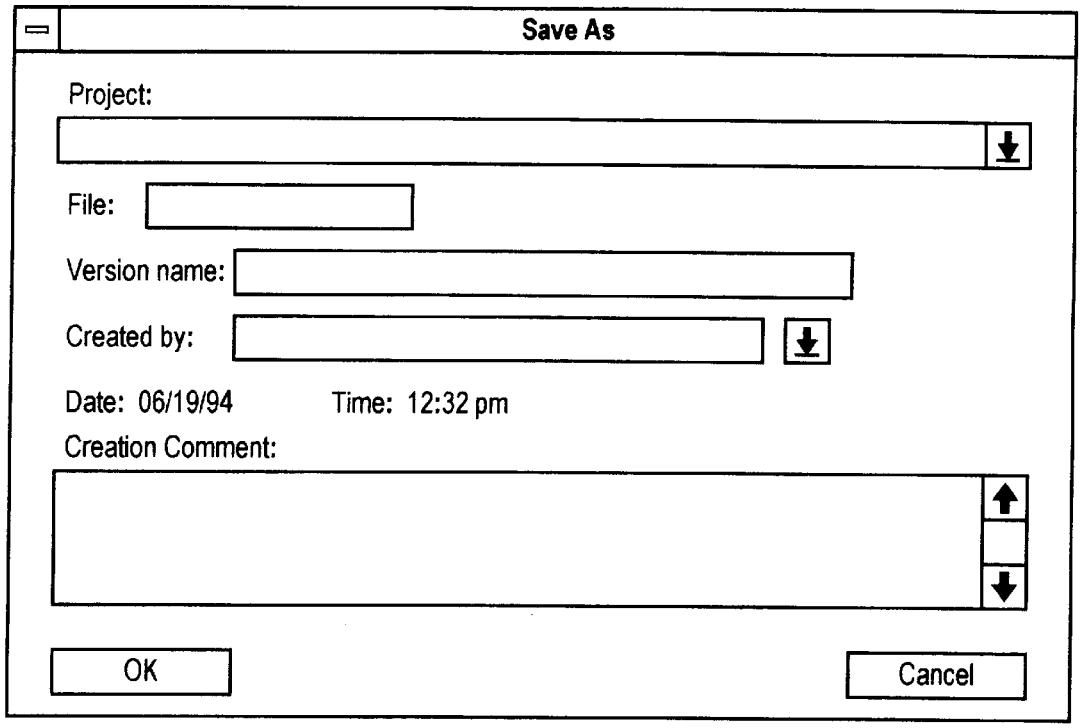

The Save As . . . dialogue allows the user to perform library check-in functions for documents that did not previously exist in the library. The dialogue appears the same as the Save dialogue box except that the project name field is a combo-box and the file name field is an edit box, and version-related items are not present except for the version name. The Save As . . . dialogue appears as shown in FIG. 11.

2.5 Move/Copy Dialogue Box

Figure 12:
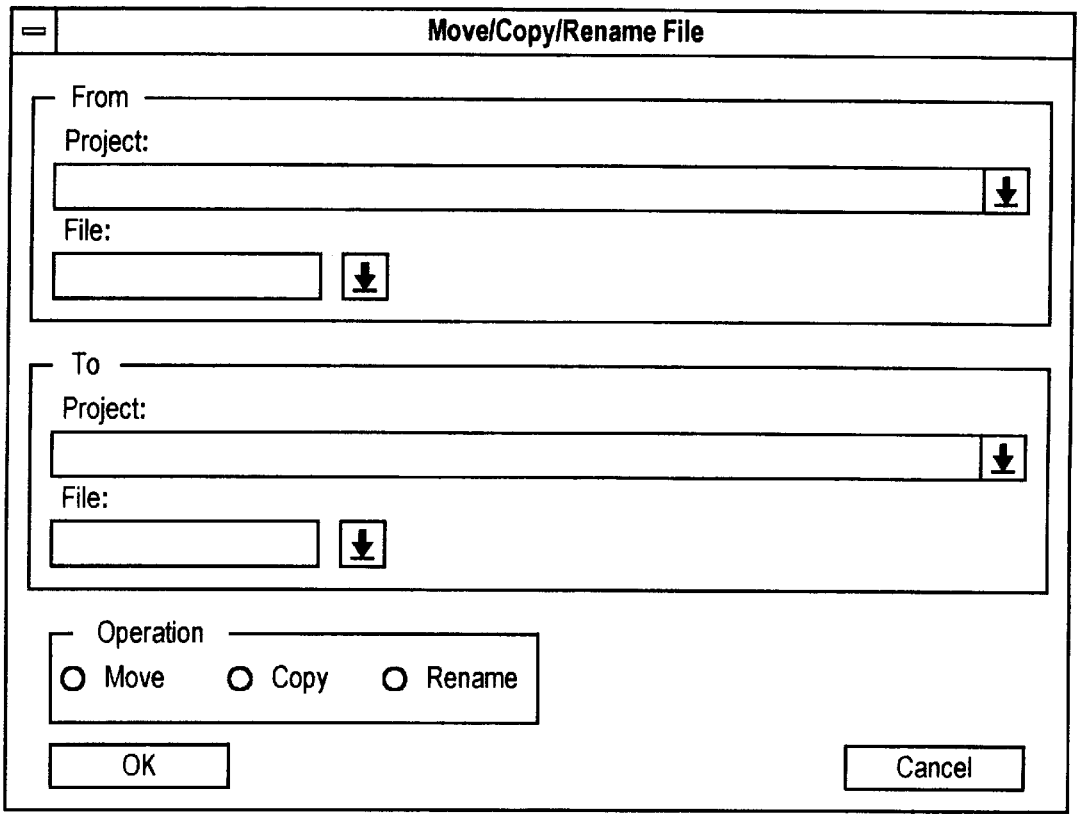

This feature allows a whole spreadsheet, i.e., all versions, to be copied or moved to another project group, or to be renamed within a project. The copy function is best used when the user wants different copies of the same thing for different purposes and the two copies of the spreadsheets are to be maintained independently. The Move/Copy dialogue box appears as shown in FIG. 12.

2.6 Delete Dialogue Box

Figure 13:
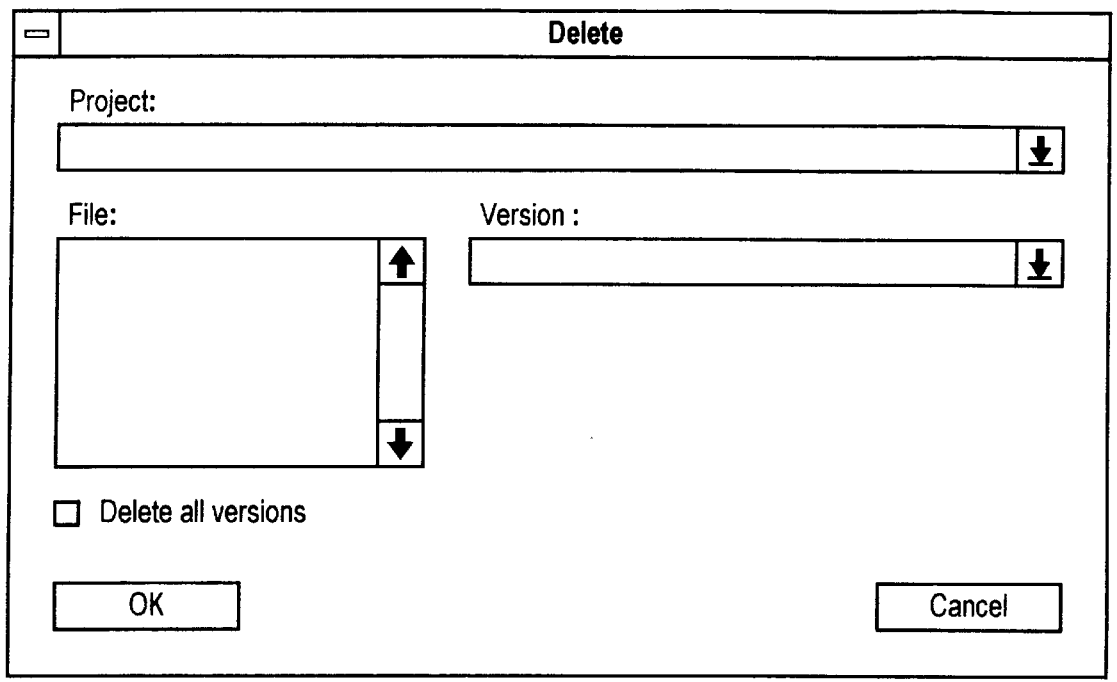

This feature will allow the user to delete all or part of a spreadsheet document from a project group. All document versions will be listed in the Version combo box. The user can select any number of versions, including all versions. However, if all versions are selected, an alert message will appear upon clicking on the OK button indicating that all but Version 1 will be deleted, and indicating that to delete Version 1, the user should select Delete all versions. This will happen even if there is only one version in the repository file, and Delete all versions is not checked. The Delete dialogue box is shown in FIG. 13.

2.7 File Version Compare Dialogue Box

Figure 14:
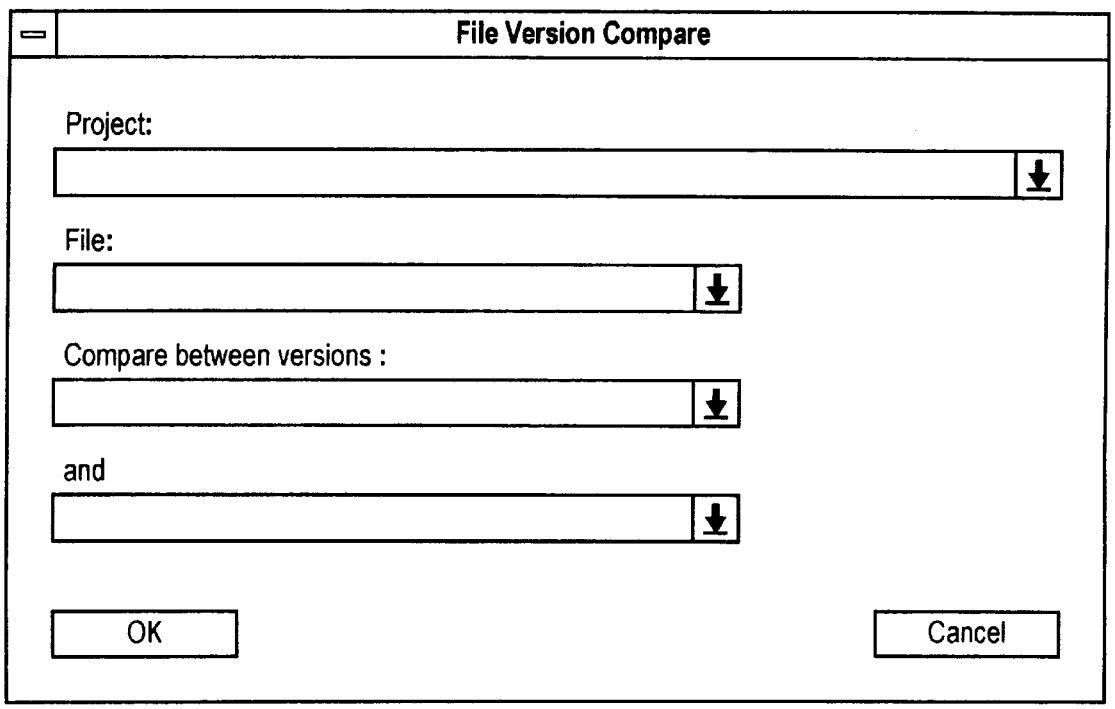

This feature is one of the more powerful features of this product. Comparisons are accomplished between differing versions of a given spreadsheet in a project. The version combo boxes show version numbers and version names to facilitate selection. The differences will be shown by creating a new spreadsheet file and writing the differences to it. Once created, the difference file will be in the same format as the original versions with changes highlighted according to settings accomplished with Compare setup. The File Version Compare dialogue box is shown in FIG. 14.

2.8 Version Compare

Figures 17C, 18:
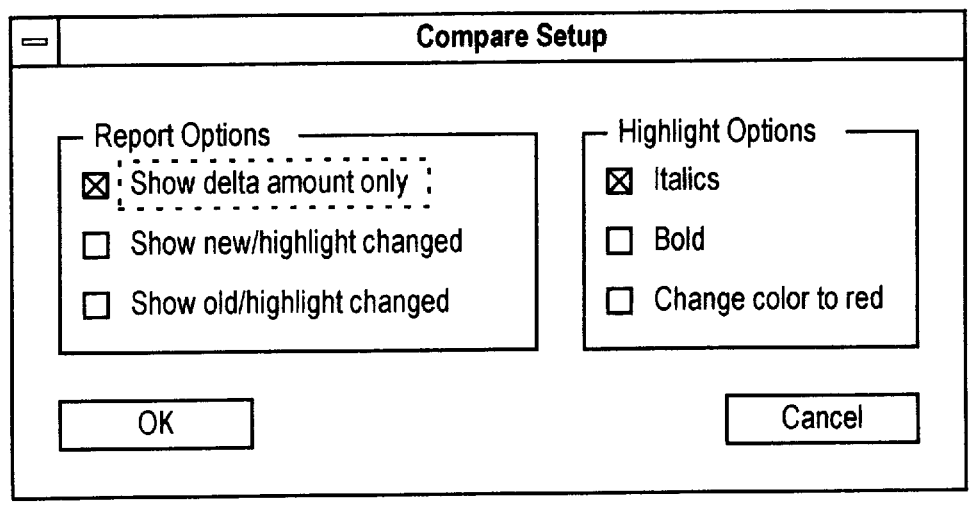
Figure 19:
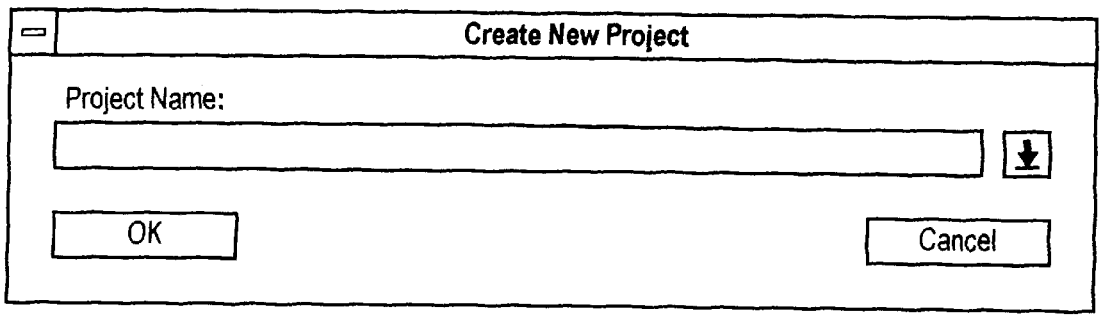

Options allow the user to alternatively select a display of a first, e.g., old, version of a document with differences from a second, e.g., new, version indicated, a display of the second version of a document with differences from the first version indicated, or a delta report showing subtractive differences for numerical data. The report is generated on a selected spreadsheet with changes being shown according to user-selected format options. With reference to FIG. 15, there is shown a display of an "Old" version of a document according to its normal display format as determined by its internal data and the spreadsheet processor. Similarly, FIG. 16 shows a display of a "New" version of a document. In a first report format shown in FIG. 17A, data from the "Old" version of the document is displayed according to the normal display format for the "Old" version of the document. However, the normal display format is modified by italicizing the cells that are different in the "New" version of the document as well as italicizing labels that are different in the "New" version. Similarly in a second report shown in FIG. 17B, data from the "New" version of the document is displayed with italicizing of the cells and labels that are different in the "Old" version of the document. A third report format, as shown in FIG. 17C, shows subtractive differences of numerical data. In this figure, DELTA.XLS, shows the newer version of labels with the changed alphanumeric information and non-zero subtractive differences italicized. Numerical data is displayed by computing the difference on a cell-by-cell basis such that:

DELTA=NEW−OLD

Cells with unchanged data remain un-italicized and numerical data is set to 0.

2.9 Compare Setup Dialogue

Compare setup operations, when performed, are written to an configuration file 58 (CCCFILE.INI) to retain setup options for later usage. Any combination of report options and highlight options may be selected. If no report options are selected, a Delta Report will be generated. Likewise, if no highlight options are selected, all changes will appear in italics. The Compare Setup dialogue box is shown in FIG. 18.

2.10 Project Create Dialogue

A name for a new project is created in this dialogue as shown in FIG. 18. If a given project already exists, then the user is alerted accordingly and is requested to select another name. The project name uses a combo bar so the user can see what project names are already in use.

2.11 Project Delete Dialogue

Figure 20:
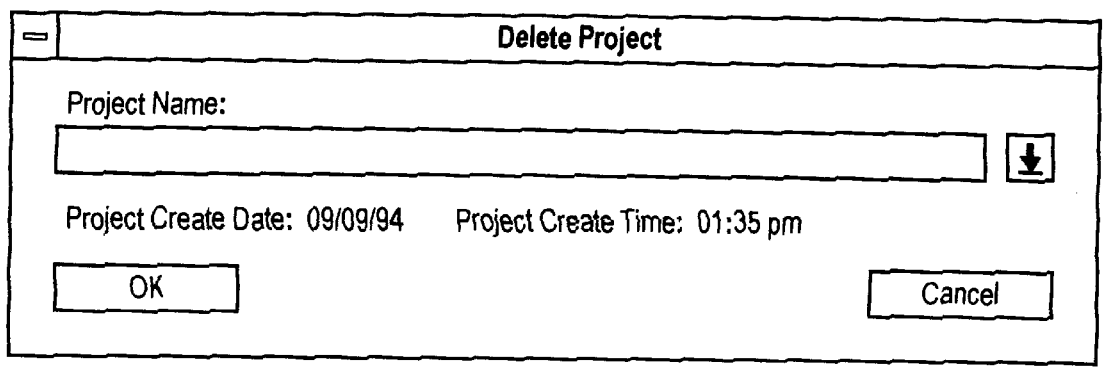

Creation information about an existing project will be shown as in FIG. 20 to facilitate the user's decision whether or not to delete a whole project. Since deleting a whole project database has major implications, the user will be asked to verify deletion once OK is selected.

2.12 General Setup Dialogue

Figure 21:
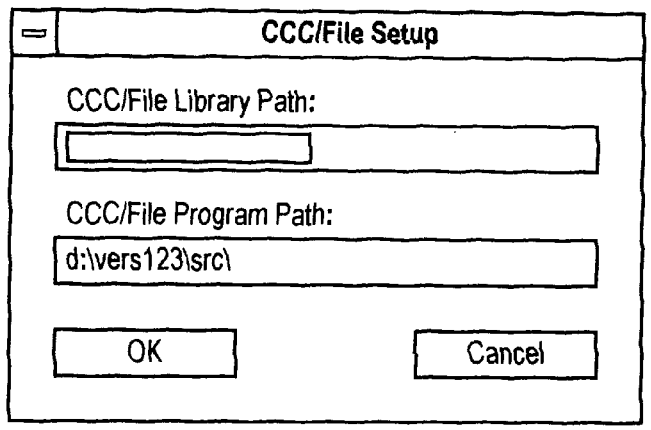

File path names are originally set during program installation, however, they can be changed by the user at any time using this dialog as shown in FIG. 21. The library path is the base directory for the currently-selected library. It is possible for a user to have more than one library. The Program Path is where the program software and help files reside. While the program path is not changed unless the software is moved, the option is provided to facilitate a user changing resident directories for this software.

With reference now to FIGS. 22–53, there is shown a top level flow chart of the user interface to the previously described embodiment. There are found software listings of a presently preferred embodiment corresponding to these flow charts. FIGS. 54–64 provide a top level flowchart referencing the software.

Figure 22:
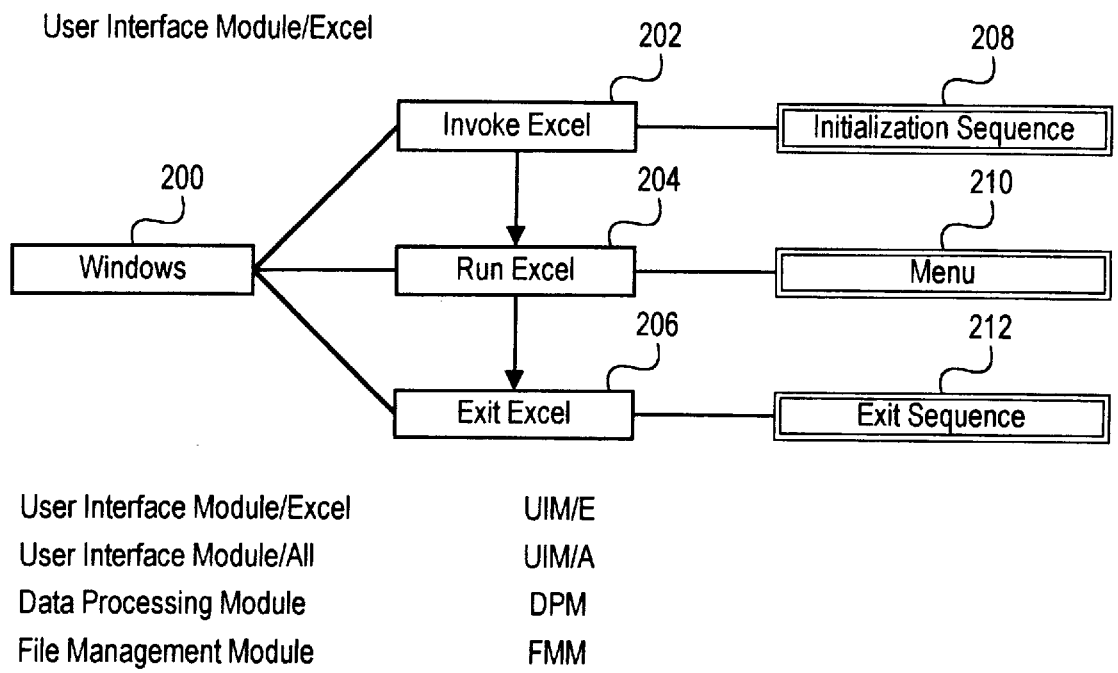
FIG. 22 shows a block diagram of top level implementation for a user interface.

FIG. 22 shows a block diagram of top level implementation for a user interface. From Windows 200 Excel is invoked 202, run 204, and exited 206. Invoke Excel 202 includes initialization sequence 208. Run Excel 204 includes a menu 210. Exit Excel 206 includes exit sequence 212.

Figure 23:
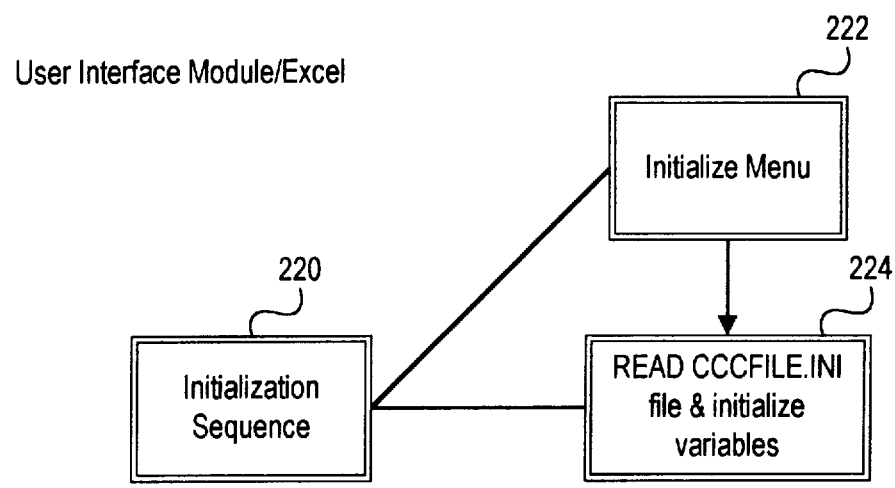
FIG. 23 shows a block diagram of an initialization sequence for the user interface.

FIG. 23 shows a block diagram of an initialization sequence for the user interface. Initialization sequence 220 includes initialize menu block 222 and read CCCFILE.INI file & initialize variables 224.

Figure 24:
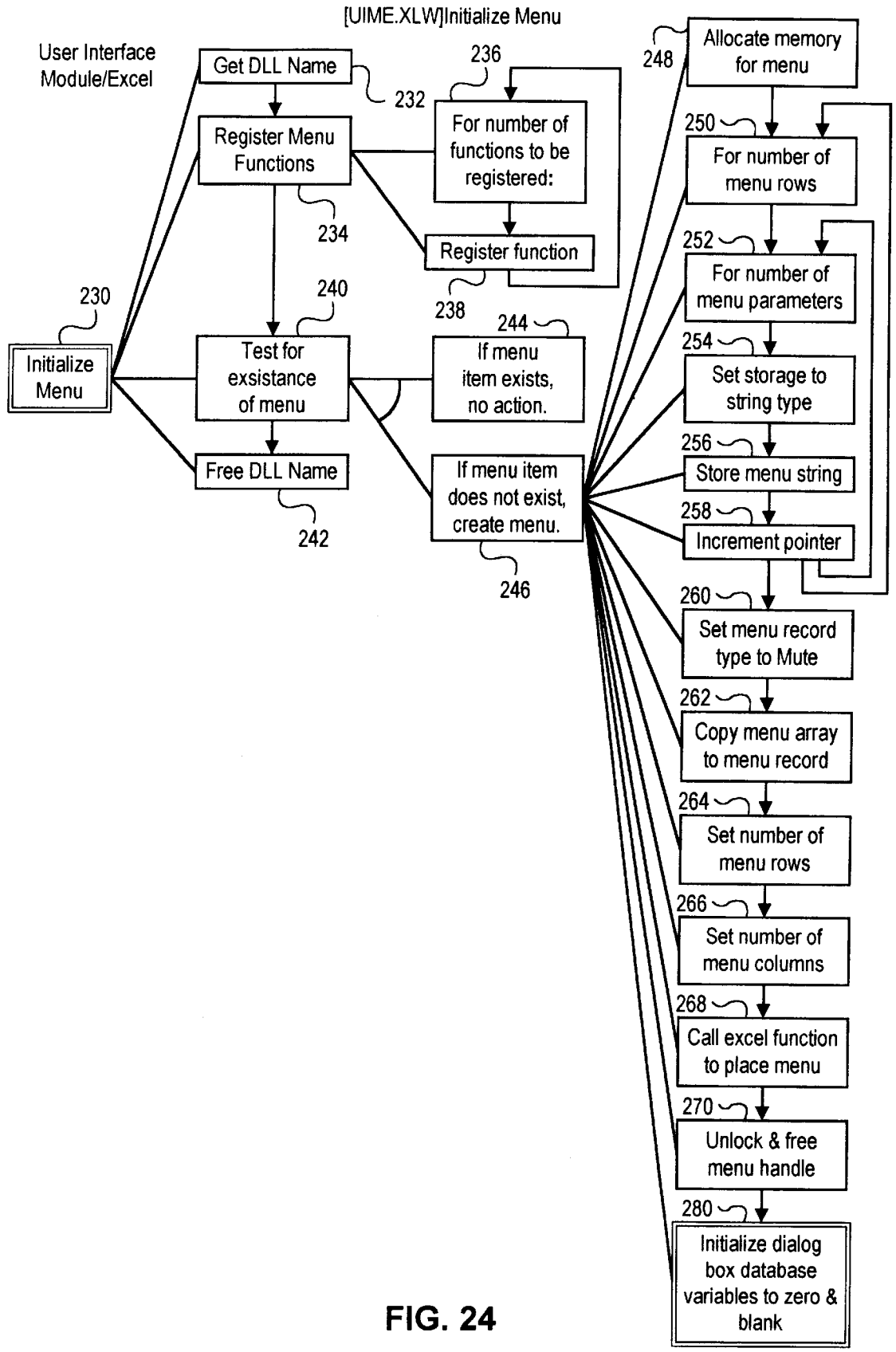
FIG. 24 shows a block diagram for an initialization menu for a user interface.

FIG. 24 shows a block diagram for an initialization menu for a user interface. From initialize menu 230 get DLL name 232. Next, register menu functions 234. From register menu functions 234, for number of functions to be registered 236, register function 238. After register menu functions 234, test for an existence of menu 240. In testing for existence of menu 240, if menu item exists, no action 244, and if menu item does not exist, create menu 246. In creating menu 246, allocate memory for menu 248. For number of menu rows 250 do the following: For number of menu parameters 252, set storage to string type 254, store menu string 256, and increment pointer 258. Next, set menu record type to Multi 260, copy menu array to menu record 262, set number of menu rows 264, set number of menu columns 266, call Excel function to place menu 268, unlock and free menu handle 270, and initialize dialogue box database variables to zero and blank 280. After test for existence of menu 240, free DLL name 242.

Figure 25:
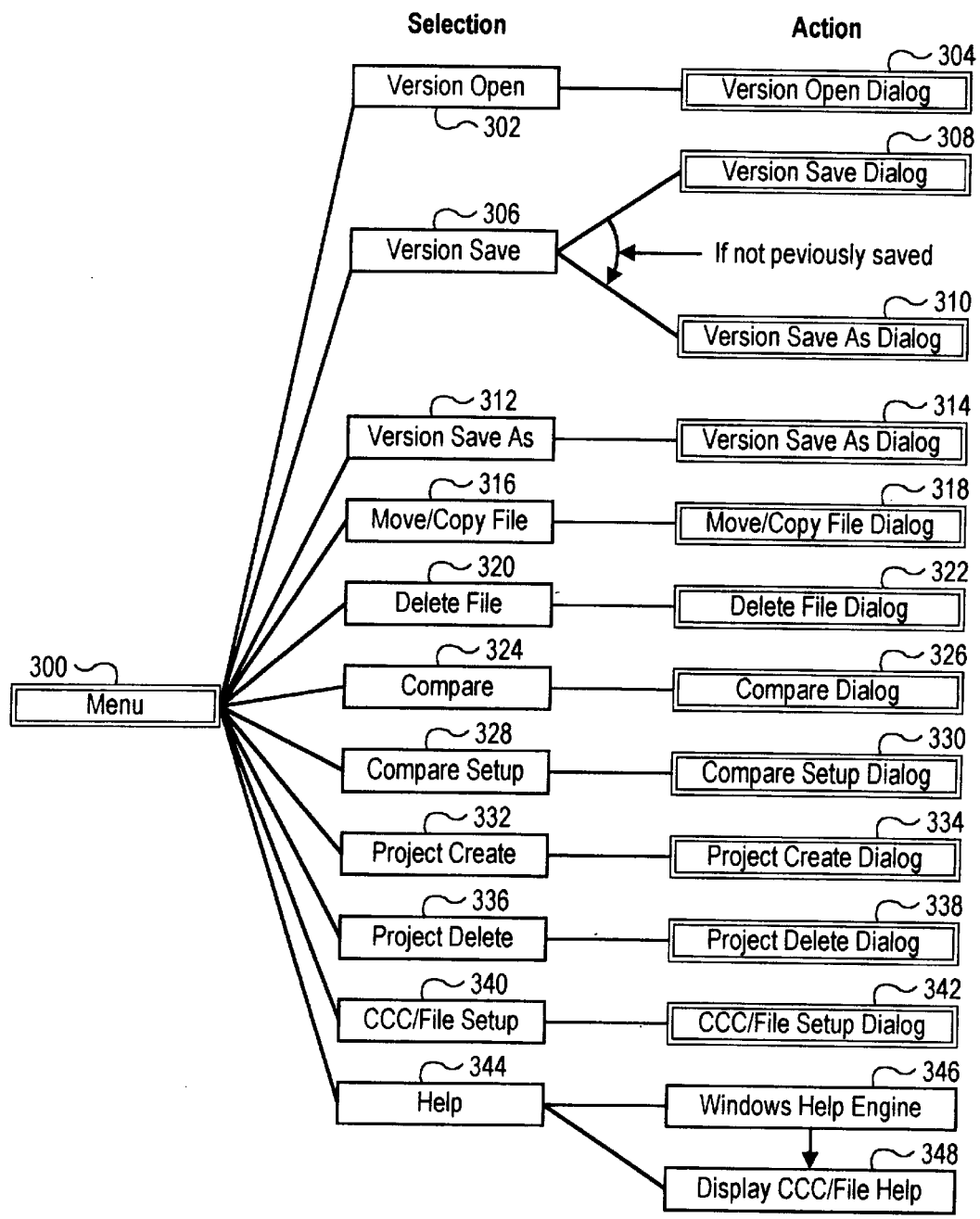
FIG. 25 shows a block diagram for a menu with selection and action blocks for a user interface.

FIG. 25 shows a block diagram for a menu with selection and action blocks for a user interface. Menu 300 provides selection of: version open 302, version save 306, version save as 312, move/copy file 316, delete file 320, compare 324, compare set up 328, project create 332, project delete 336, CCC/file set up 340, and help 344. From version open 302, version open dialog 304 may be executed. From version save 306, version save dialog 308 may be executed or, alternatively, if not previously saved, version save as dialogue 310 may be executed. From version save as 312, version save as dialogue 314 may be executed. From move/copy file 316, move/copy file dialogue 318 may be executed. From delete file 320, delete file dialog 322 may be executed. From compare 324, compare dialog 326 may be executed. From compare setup 328, compare setup dialog 330 may be executed. From project create 332, project create dialog 334 may be executed. From project delete 336, project delete dialog 338 may be executed. From CCC/file set up 340, CCC/file set up dialog 342 may be executed. From help 344, Windows HELP engine 346, and display CCC/file help 348 may be executed.

Figure 26:
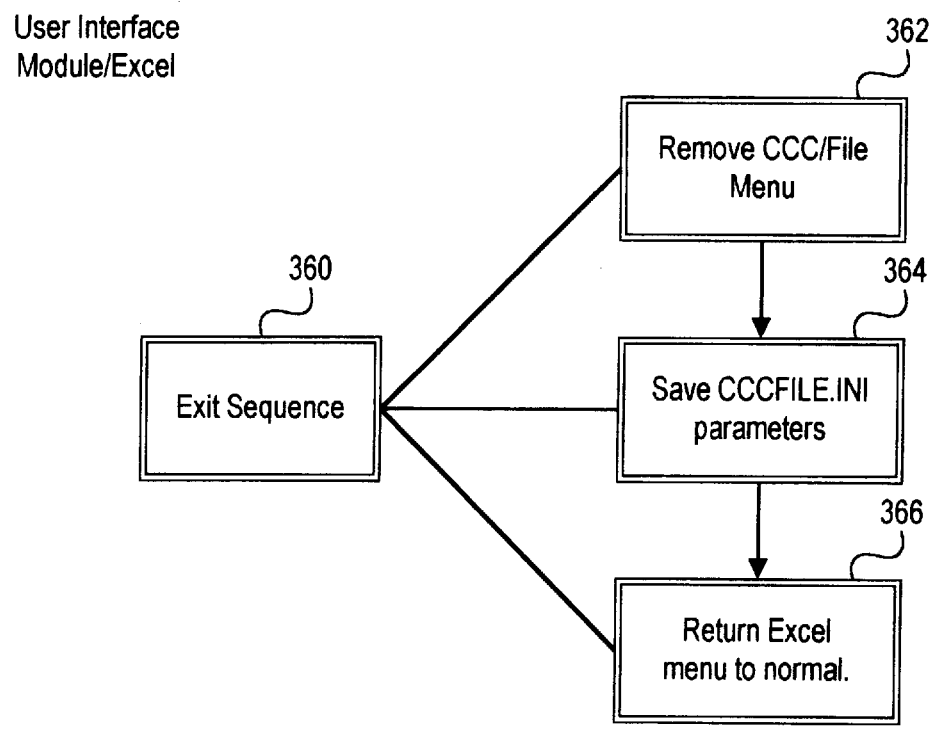
FIG. 26 shows a block diagram of an exit sequence for a user interface.

FIG. 26 shows a block diagram of an exit sequence for a user interface. Exit sequence 360 includes remove CCC/file menu 362, save CCCFILE.INI parameters 364, and return Excel menu to normal 366.

Figure 27A:
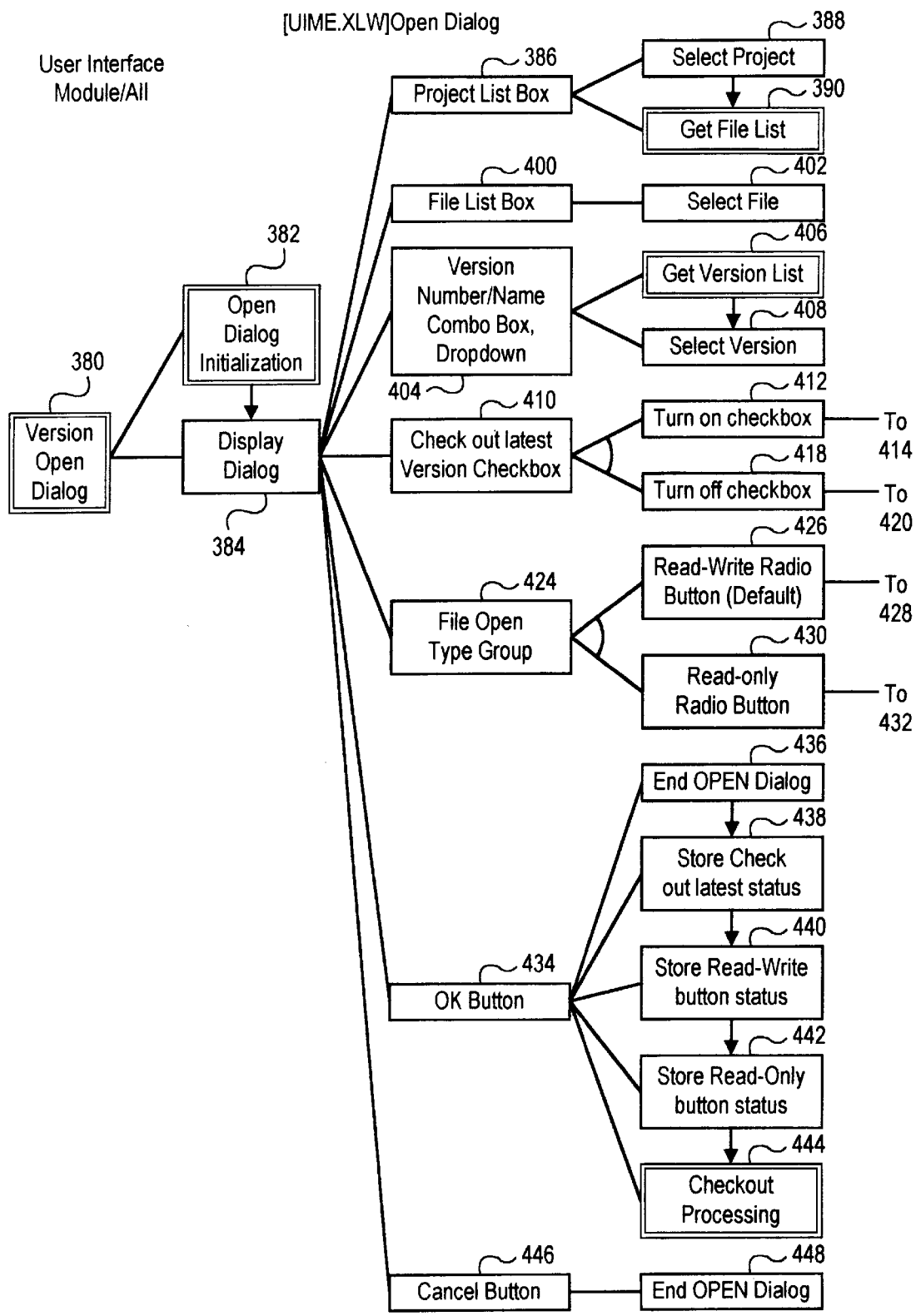
FIG. 27 shows a block diagram for an open dialog for a user interface.
Figure 27B:
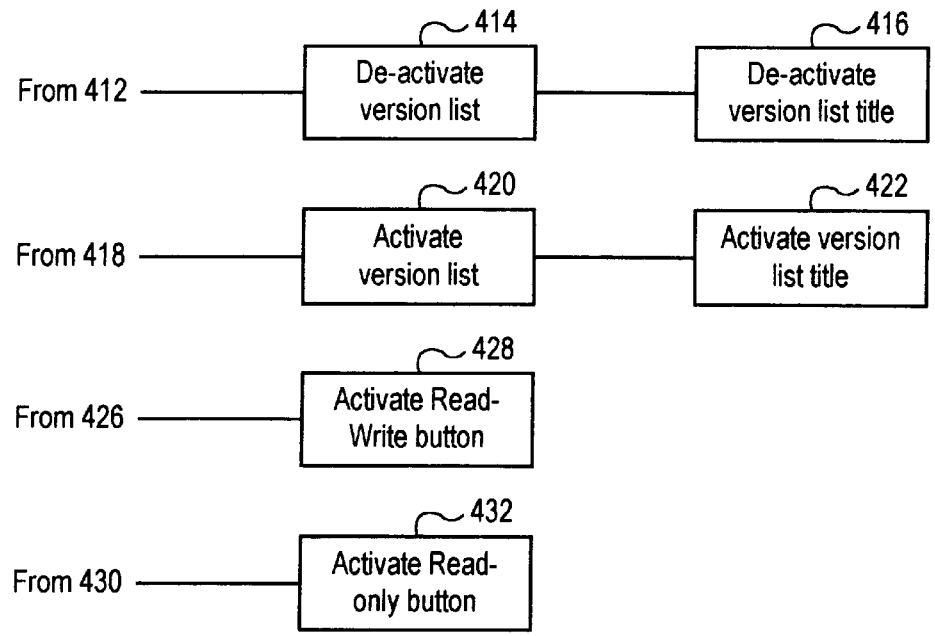

FIG. 27 shows a block diagram for an open dialog for a user interface. Version open dialog 380 causes open dialog initialization 382 and display dialog 384. Display dialog 384 is connected with project list box 386, file list box 400, version number/name combo box drop down 404, check out latest version check box 410, file open type group 424, OK button 434, and cancel button 446. Project list box 386 includes select project 388 and get file list 390. File list box 400 includes select file 404. Version number/name combo box, drop down 404 includes get version list 406 and select version 408. Check out latest version checkbox 410 includes turn on checkbox 412 and turn off checkbox 418. Turn on checkbox 412 includes deactivate version list 414 and deactivate version list title 416. Turn off box 418 includes activate version list 420 and activate version list title 422. File open type group 424 includes read-write radio button (default) 426, which includes activate read/write button 428, and read-only radio button 430, which includes activate read-only button 432. OK button 434 includes end open dialog 436, store check out latest status 438, store read/write button status 440, store read-only button status 442, and check out processing 444. Cancel button 446 includes end open dialog 448.

Figure 28:
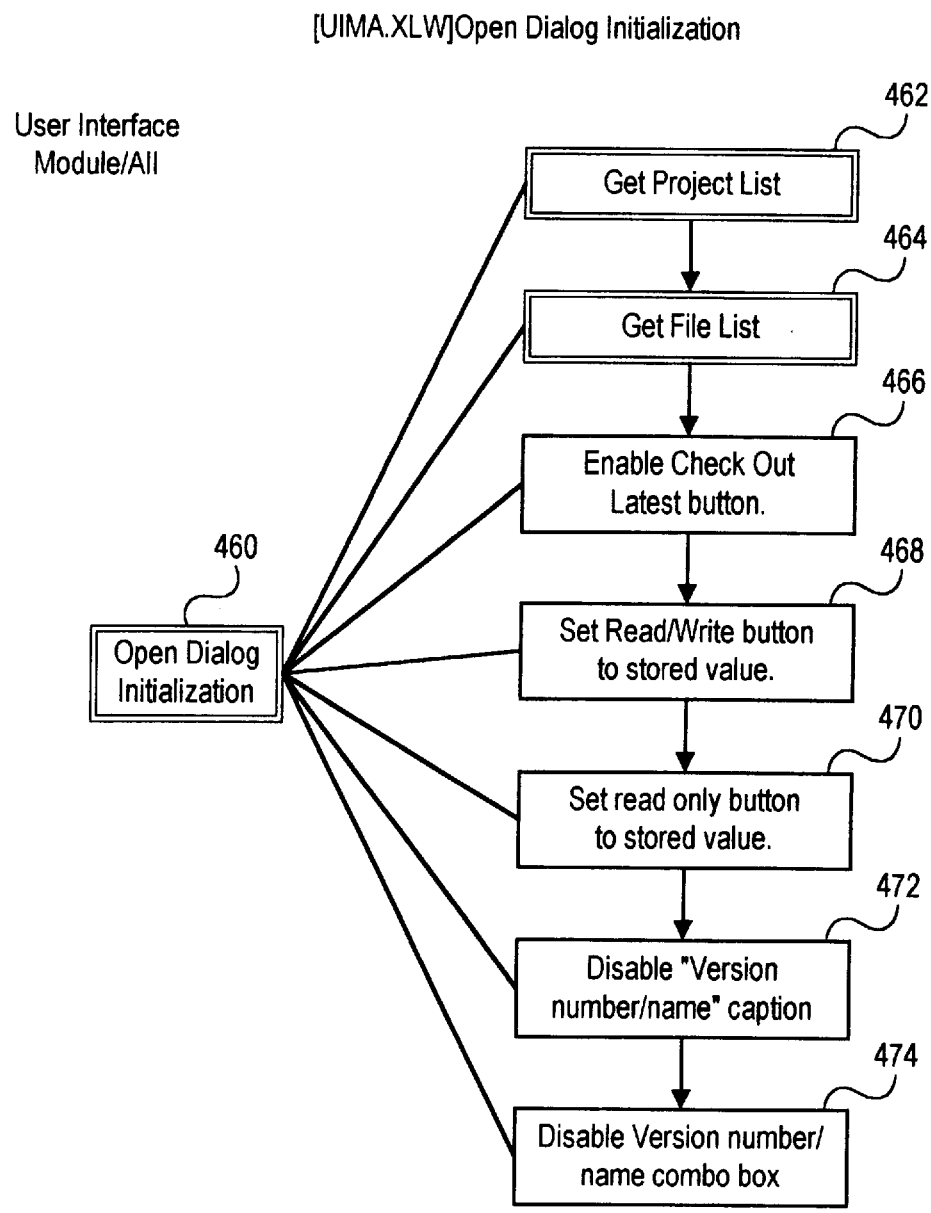
FIG. 28 shows a block diagram for an open dialog initialization for a user interface.

FIG. 28 shows a block diagram for an open dialog initialization for a user interface. Open dialog initialization 460 includes get project list 462, get file list 464, enable check out latest button 466, set read/write button to stored value 468, set read-only button to stored value 470, disable "version number/name" caption 472, and disable version number/name combo box 474.

Figure 29A:
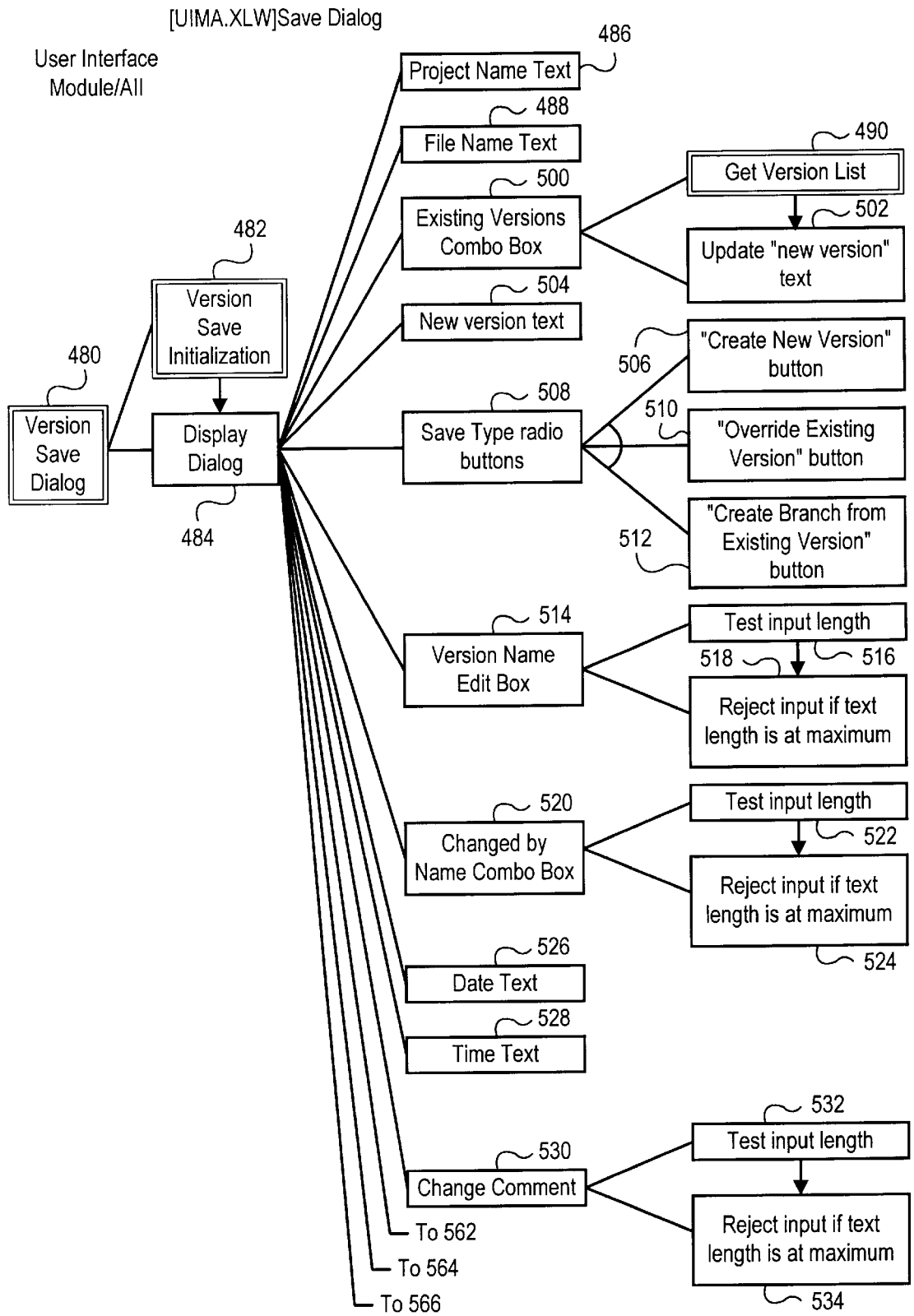
FIG. 29 shows a block diagram of a save dialog for a user interface.
Figure 29B:
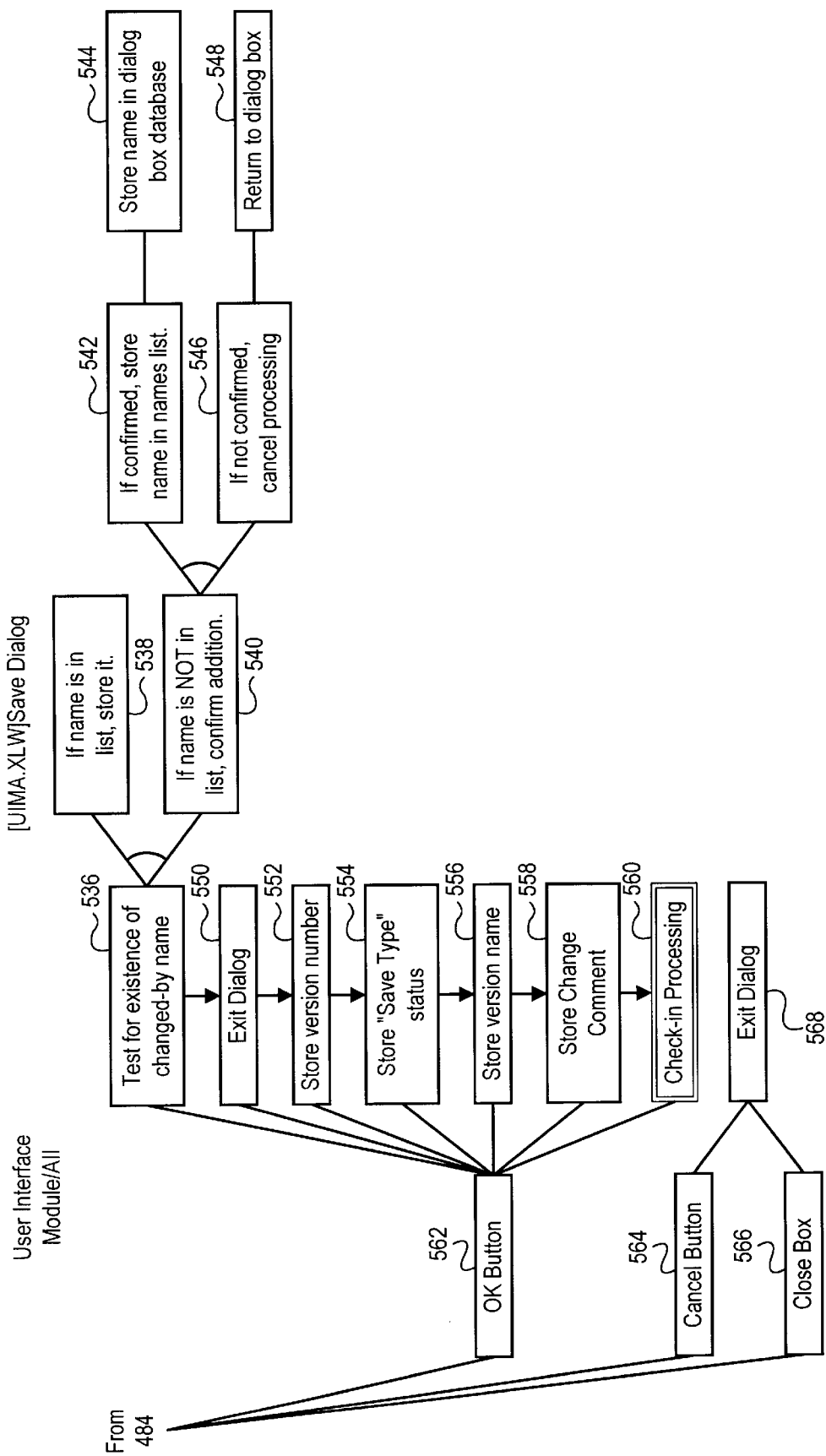

FIG. 29 shows a block diagram of a save dialog for a user interface. Version save dialog 480 includes version save dialog initialization 482 and display dialog 484. Display dialog 484 includes project name text 486, file name text 488, existing versions combo box 500, new version text 504, save type radio buttons 508, version name edit box 514, changed by name combo box 520, date text 526, time text 528, change comment 530, OK button 562, cancel button 564, and close box 566. Existing versions combo box 500 includes get version list 490 and update "new version" text 502. Save type radio buttons 508 includes "create new version" button 506, "override existing version" button 510, and "create branch from existing version" button 512. Version name edit box 514 includes test input length 516 and reject input if text length is at maximum 518. Changed by name combo box 520 includes test input length 522 and reject input if text length is at maximum 524. Change comment 530 includes test input length 532 and reject input if text length is at maximum 534. OK button 562 includes test for existence of changed by name 536, exit dialog 550, store version number 552, store "save type" status 554, store version name 556, store change comment 558, and check-in processing 560. Test for existence of changed-by name 536 includes if name is in list, store it 538, and if name is not in list, confirm addition 540, which includes if confirmed, store name in names list 542 and if not confirmed, cancel processing 546. If confirmed, store name in names list 542 includes store name in dialog box database 544. If not confirmed, cancel processing 546 includes return to dialog box 548. Cancel button 564 and close box 566 include exit dialog 568.

Figure 30:
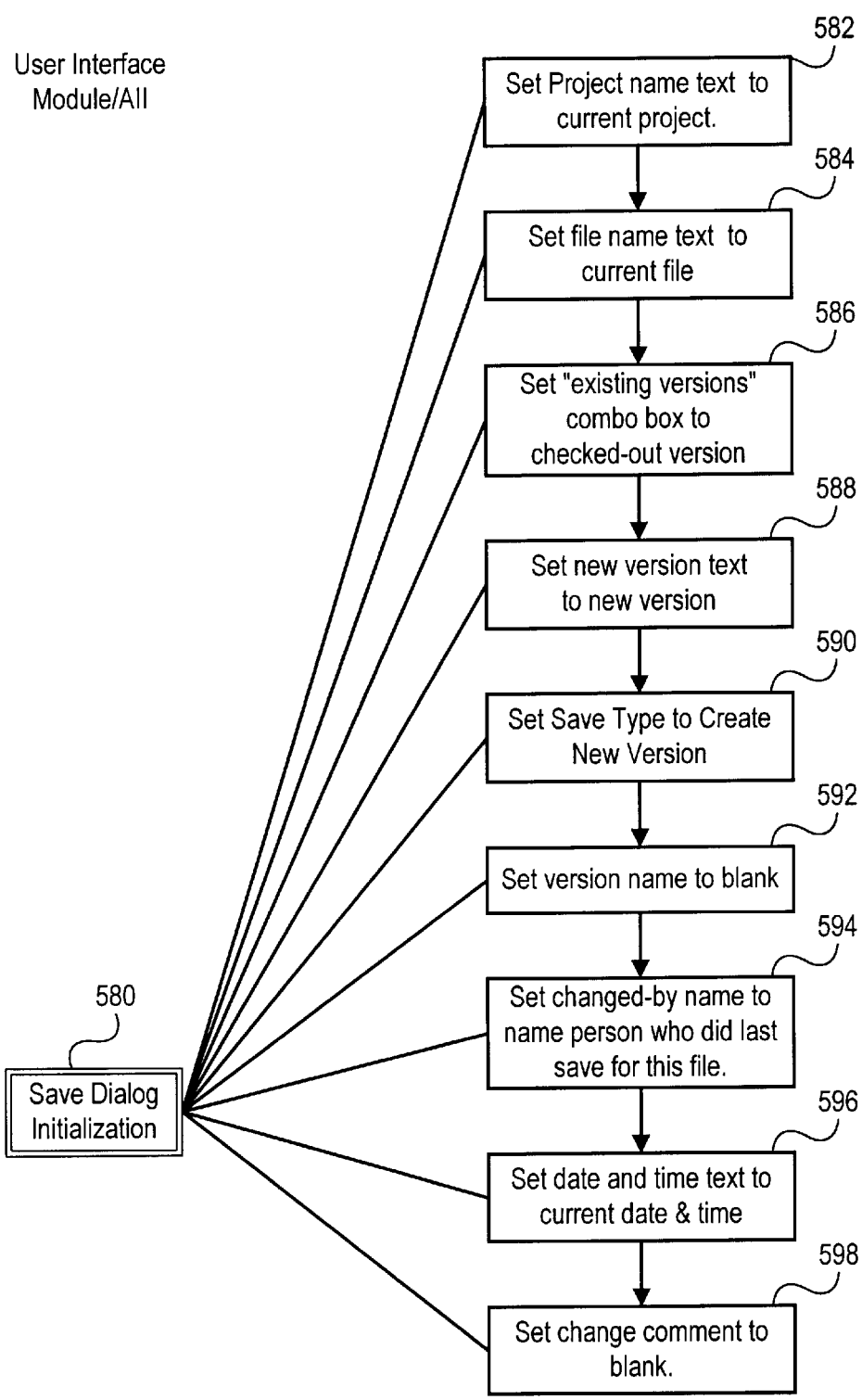
FIG. 30 shows a block diagram of a save dialog initialization for a user interface.

FIG. 30 shows a block diagram of a save dialog initialization for a user interface. Save dialog initialization 580 includes set project name text to current project 582, set file name text to current file 584, set "existing versions" combo box to checked-out version 586, set new version text to new version 588, set save type to create new version 590, set version name to blank 592, set changed-by name to name person who did last save for this file 594, set date and time text to current date and time 596, and set change comment to blank 598.

Figure 31A:
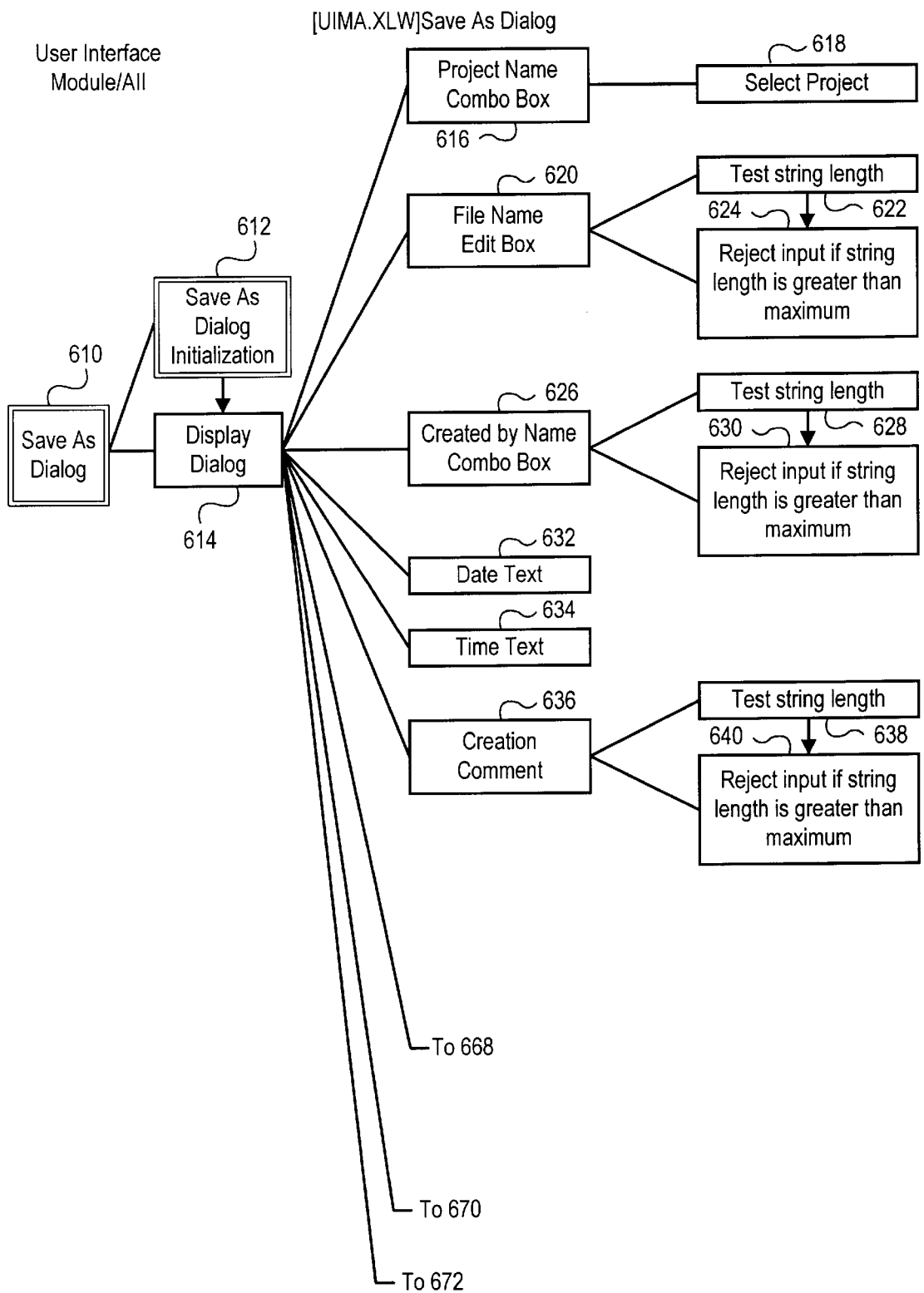
FIG. 31 shows a block diagram for a save as dialog for a user interface.
Figure 31B:
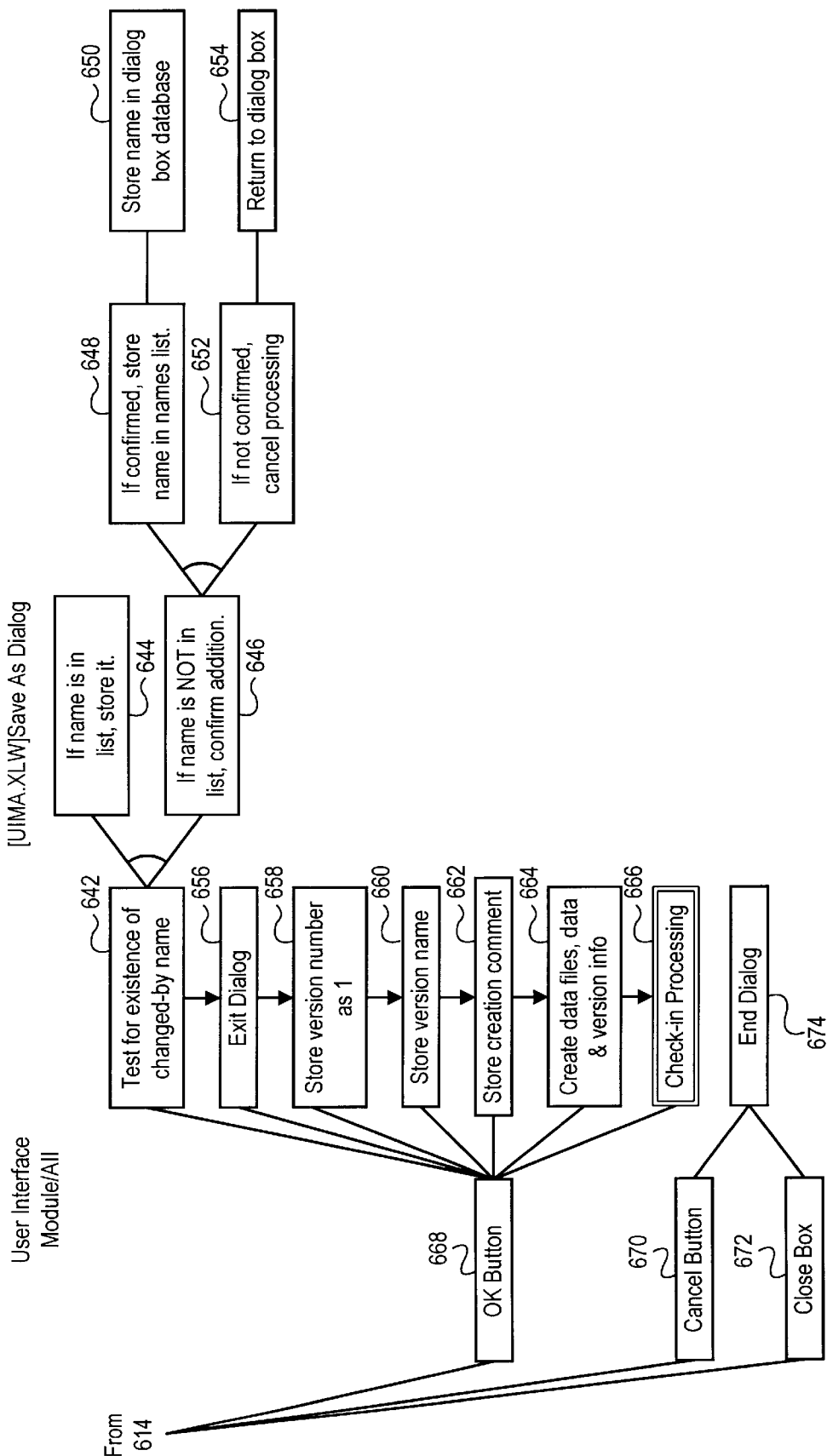

FIG. 31 shows a block diagram for a save as dialog for a user interface. Save as dialog 610 includes save as dialog initialization 612 and display dialog 614. Display dialog 614 includes project name combo box 616, file name edit box 620, created by name combo box 626, date text 632, time text 634, creation comment 636, OK button 668, cancel button 670, and close box 672. Project name combo box 616 includes select project 618. File name edit box 620 includes test string length 622 and reject input if string length is greater than maximum 624. Created by name combo box 626 includes test string length 628 and reject input if string length is greater than maximum 630. Creation comment 636 includes test string length 638 and reject input if string length is greater than maximum 640. OK button 668 includes test for existence of changed-by name 642, exit dialog 656, store version number as one 658, store version name 660, store creation comment 662, create delta files, data and version info 664, and check-in processing 666. Test for existence of changed-by name 642 includes if name is in list store it 664 and if name is not in list, confirm addition 646. If name is not in list, confirm addition 646 includes if confirmed, store name in names list 648, which includes store name in dialog box database 650, and if not confirmed, cancel processing 652, which includes return to dialog box 654. Cancel button 670 and close box 672 include end dialog 674.

Figure 32:
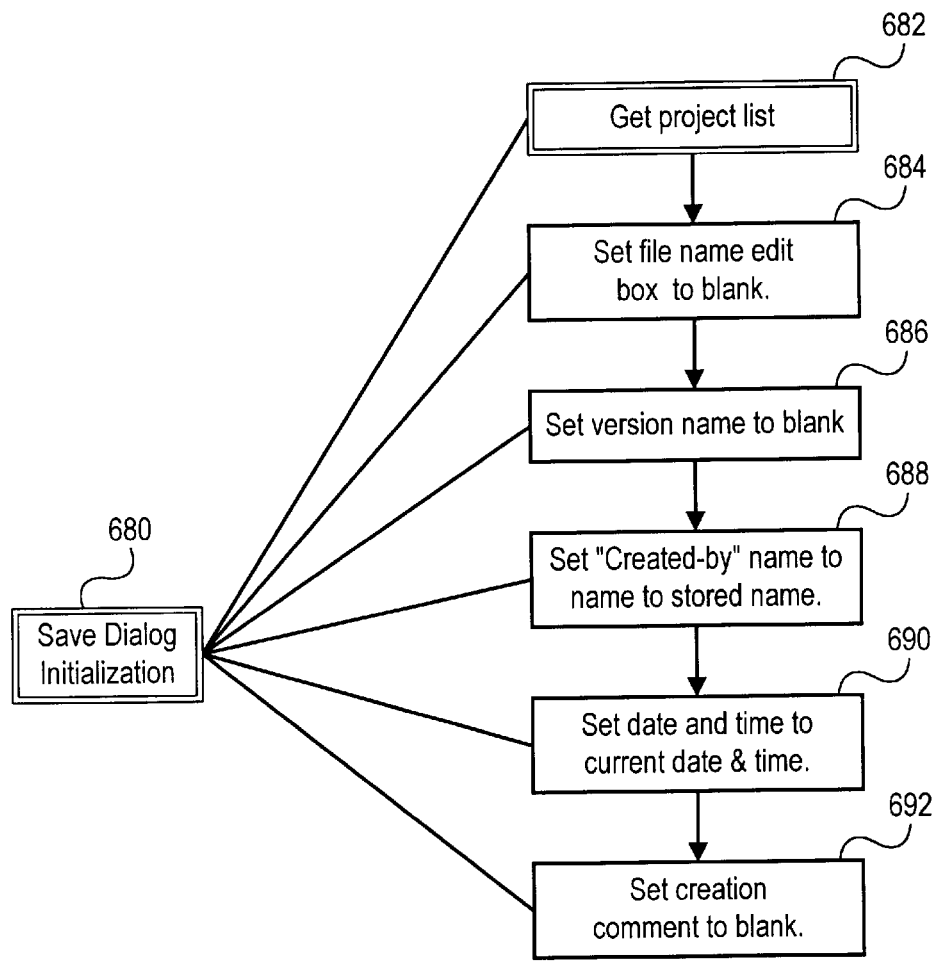
FIG. 32 shows a block diagram for a save as dialog initialization for user interface.

FIG. 32 shows a block diagram for a save as dialog initialization for a user interface. Save dialog initialization 680 includes get project list 682, set file name edit box to blank 684, set version name to blank 686, set "created by" name to stored name 688, set date and time to current date and time 690, and set creation comment to blank 692.

Figure 33A:
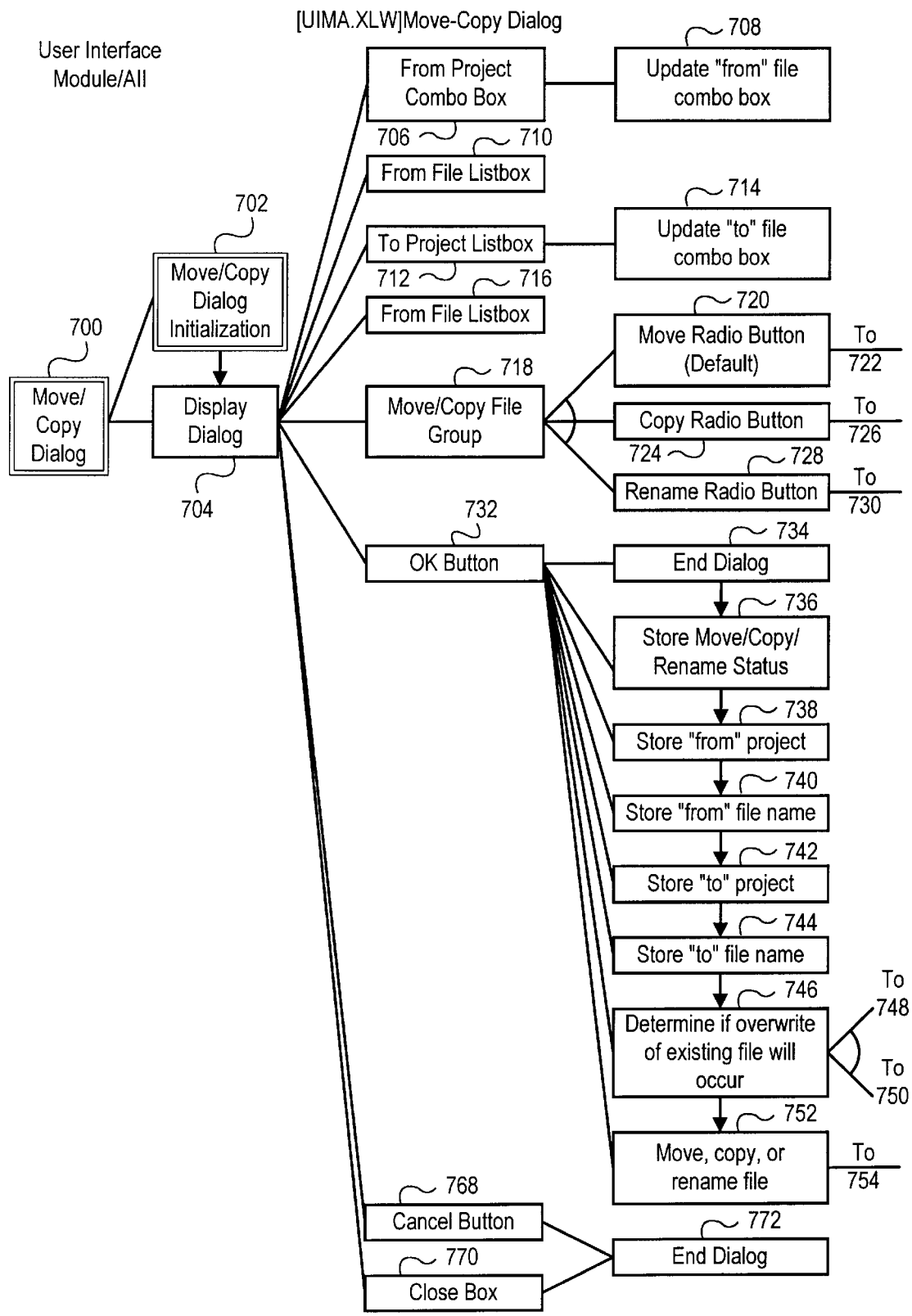
FIG. 33 shows a block diagram for a move-copy dialog for a user interface.
Figure 33B:
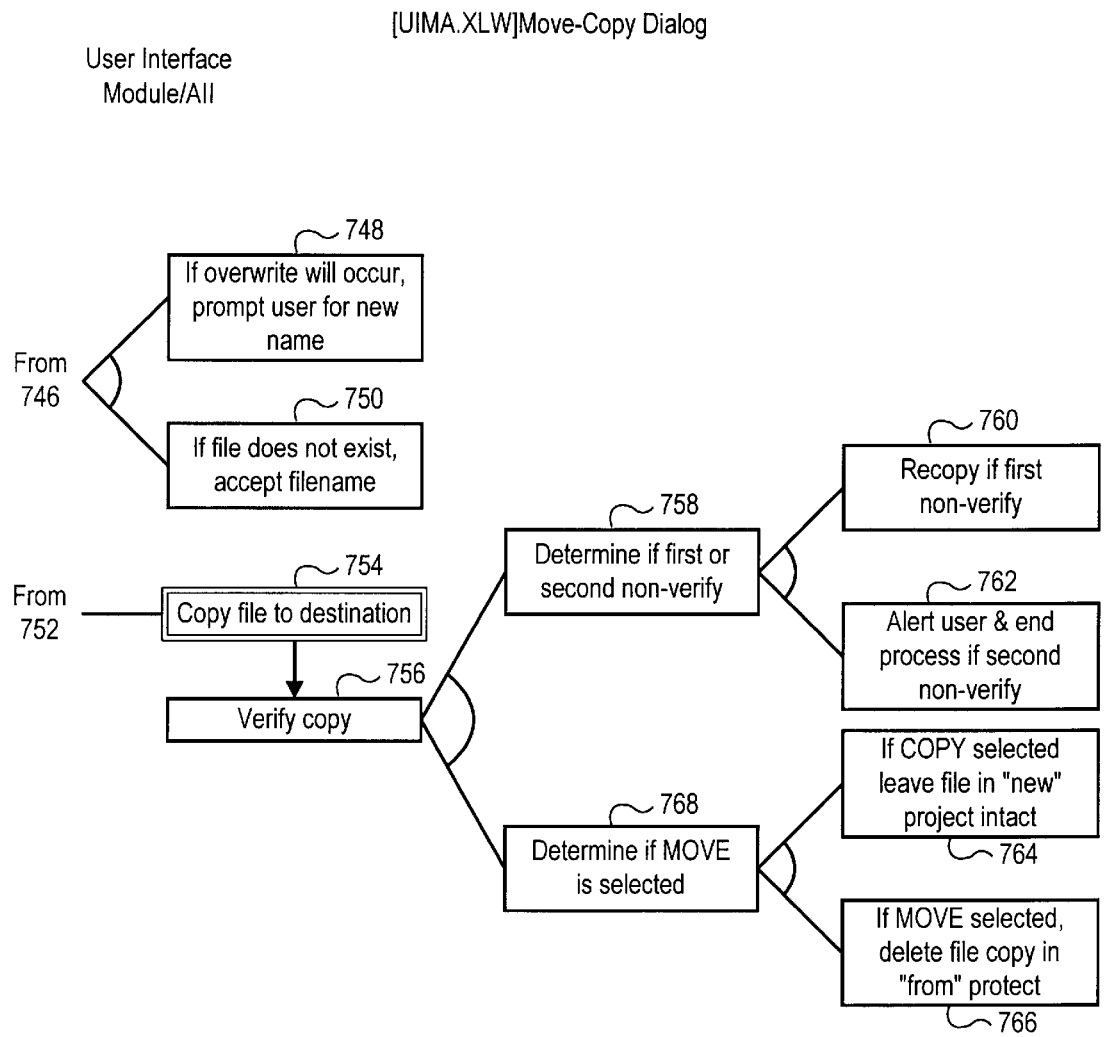

FIG. 33 shows a block diagram for a move-copy dialog for a user interface. Move/copy dialog 700 includes move/copy dialog initialization 702 and display dialog 704. Display dialog 704 includes from project combo box 706, from file list box 710, to project list box 712, from file list box 716, move/copy file group 718, OK button 732, and cancel button 768, and close button 770. From project combo box 706 includes update "from" file combo box 708. To project list box 712 includes update "to" file combo box 714. Move/copy file group 718 includes move radio button (default) 720, copy radio button 724, and rename radio button 728. Move radio button (default) 720 includes activate all combo boxes 722. Copy radio button 724 includes activate all combo boxes 726. Rename radio button 728 includes deactivate "to" project combo box; activate all other combo boxes 730. OK button 732 includes end dialog 734, store move/copy/rename status 736, store "from" project 738, store "from" file name 740, store "to" project 746, store "to" file name 744, determine if overwrite of existing file will occur 746, and move/copy or rename file 752. Determine if overwrite of existing file will occur 746 includes if overwrite will occur, prompt user for new name 748, and if file does not exist, accept file name 750. Move, copy, or rename file 752 includes copy file to destination 754, which is followed by verify copy 756. Verify copy 756 includes determine if first or second non-verify 758 and determine if move is selected 768. Determine if first or second non-verify 758 includes re-copy if first nonverify 760 and alert user and end process if second non-verify 762. Determine if move is selected 768 includes if copy selected leave file in from project intact 764 and if move is selected delete file copy from project.

Figure 34:
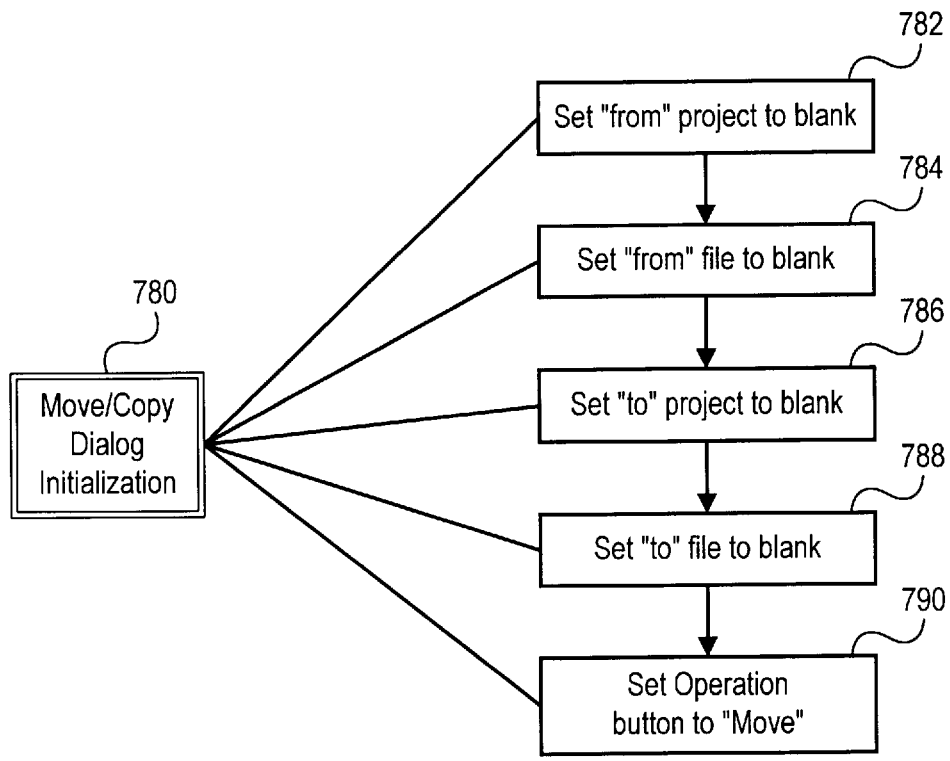
FIG. 34 shows a block diagram for a move-copy dialog initialization for user interface.

FIG. 34 shows a block diagram for a move-copy dialog initialization for a user interface. Move/copy dialog initialization 780 includes set "from" project to blank 782, set "from" file to blank 784, set "to" project to blank 786, set "to" file to blank 788, and set operation button to "move" 790.

Figure 35:
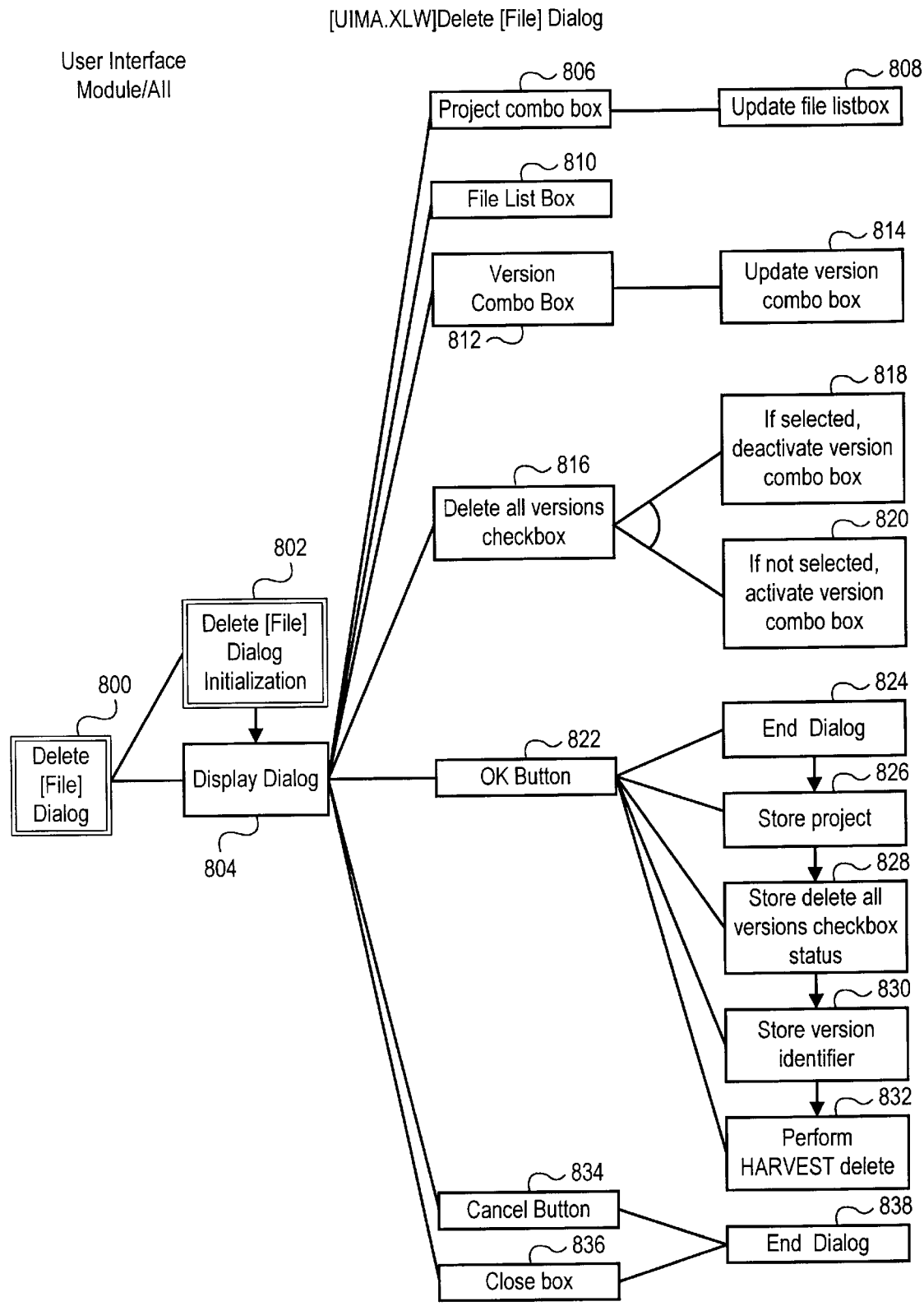
FIG. 35 shows a block diagram of a delete [file] dialog for a user interface.

FIG. 35 shows a block diagram of a delete [file] dialog for a user interface. Delete [file] dialog 800 includes delete [file] dialog initialization 802 and display dialog 804. Display dialog 804 includes project combo box 806, file list box 810, version combo box 812, delete all versions check box 816, OK button 822, cancel button 834, and close box 836. Project combo box 806 includes update file list box 808. Version combo box 812 includes update version combo box 814. Delete all versions check box 816 includes if selected, deactivate version combo box 818 and if not selected, activate version combo box 820. OK button 822 includes end dialog 824, store project 826, store delete all versions check box status 828, store version identifier 830, and perform harvest delete 832. Cancel button 834 and close box 836 include end dialog 838.

Figure 36:
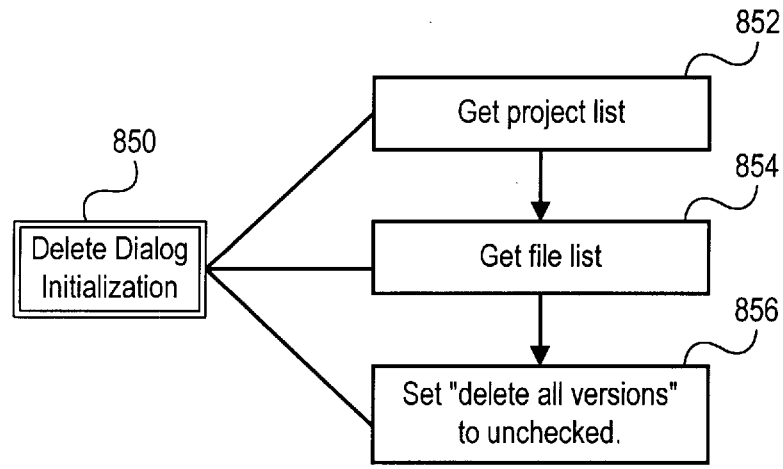
FIG. 36 shows a block diagram for a delete dialog initialization for a user interface.

FIG. 36 shows a block diagram for a delete dialog initialization for a user interface. Delete dialog initialization 850 includes get project list 852, get file list 854, and set "delete all versions" to unchecked 856.

Figure 37:
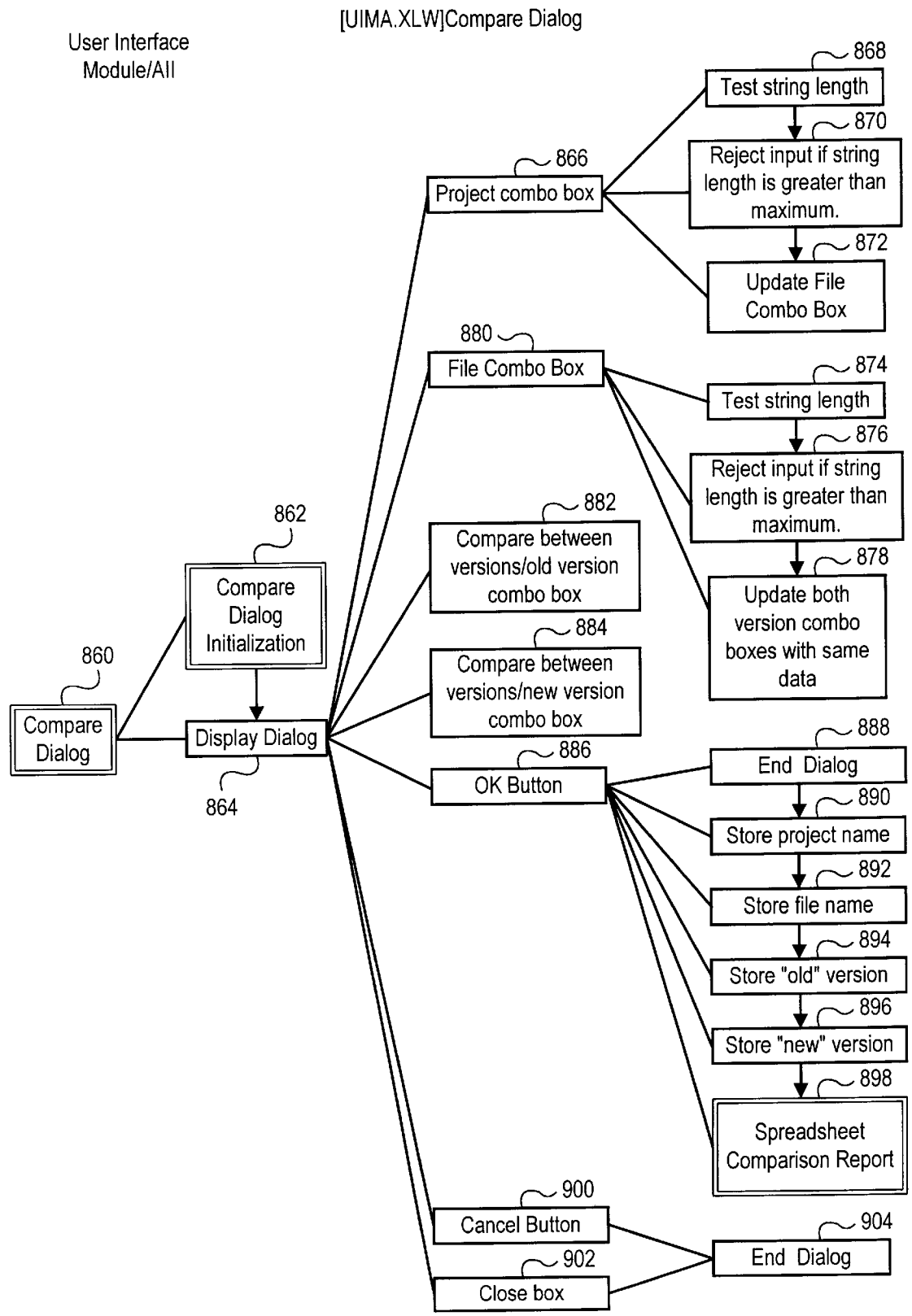
FIG. 37 shows a block diagram of a compare dialog for a user interface.

FIG. 37 shows a block diagram of a compare dialog for a user interface. Compare dialog 860 includes compare dialog initialization 862 and display dialog 864. Display dialog 864 includes project combo box 866, file combo box 880, compare between version/old version combo box 882, compare between version/new version combo box 884, OK button 886, cancel button 900, and close box 902. Project combo box 866 includes test string length 868, reject input if string length is greater than maximum 870, and update file combo box 872. File combo box 880 includes test string length 874, reject input of string length is greater than maximum 876, and update both version combo boxes with same data 878. OK button 886 includes end dialog 888, store project name 890, store file name 892, store "old" version 894, store "new" version 896, and spreadsheet comparison report 898. Cancel button 900 and close box 902 include end dialog 904.

Figure 38:
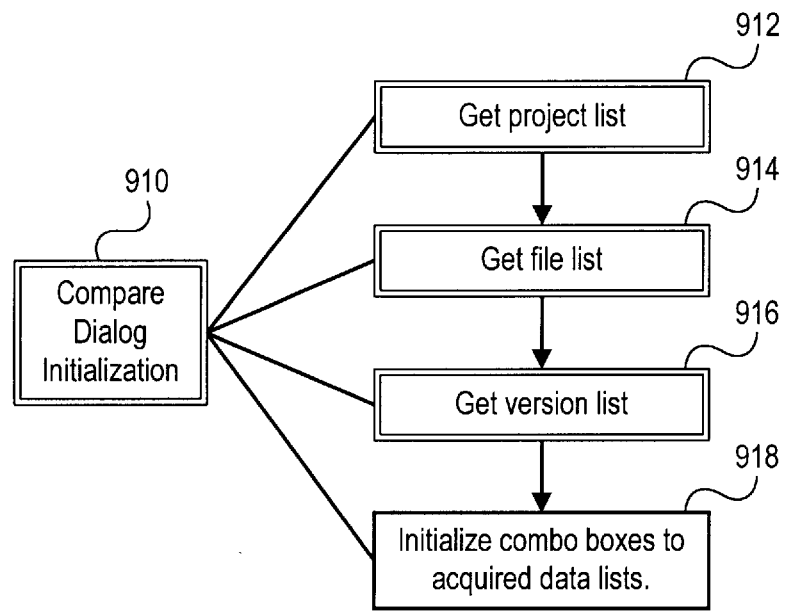
FIG. 38 shows a block diagram of a compare dialog initialization for a user interface.

FIG. 38 shows a block diagram of a compare dialog initialization for a user interface. Compare dialog initialization 910 includes get project list 912, get file list 914, get version list 916, and initialize combo boxes to acquired data lists 918. Note: Version lists are acquired now as the user will be expected to always provide that information.

Figure 39A:
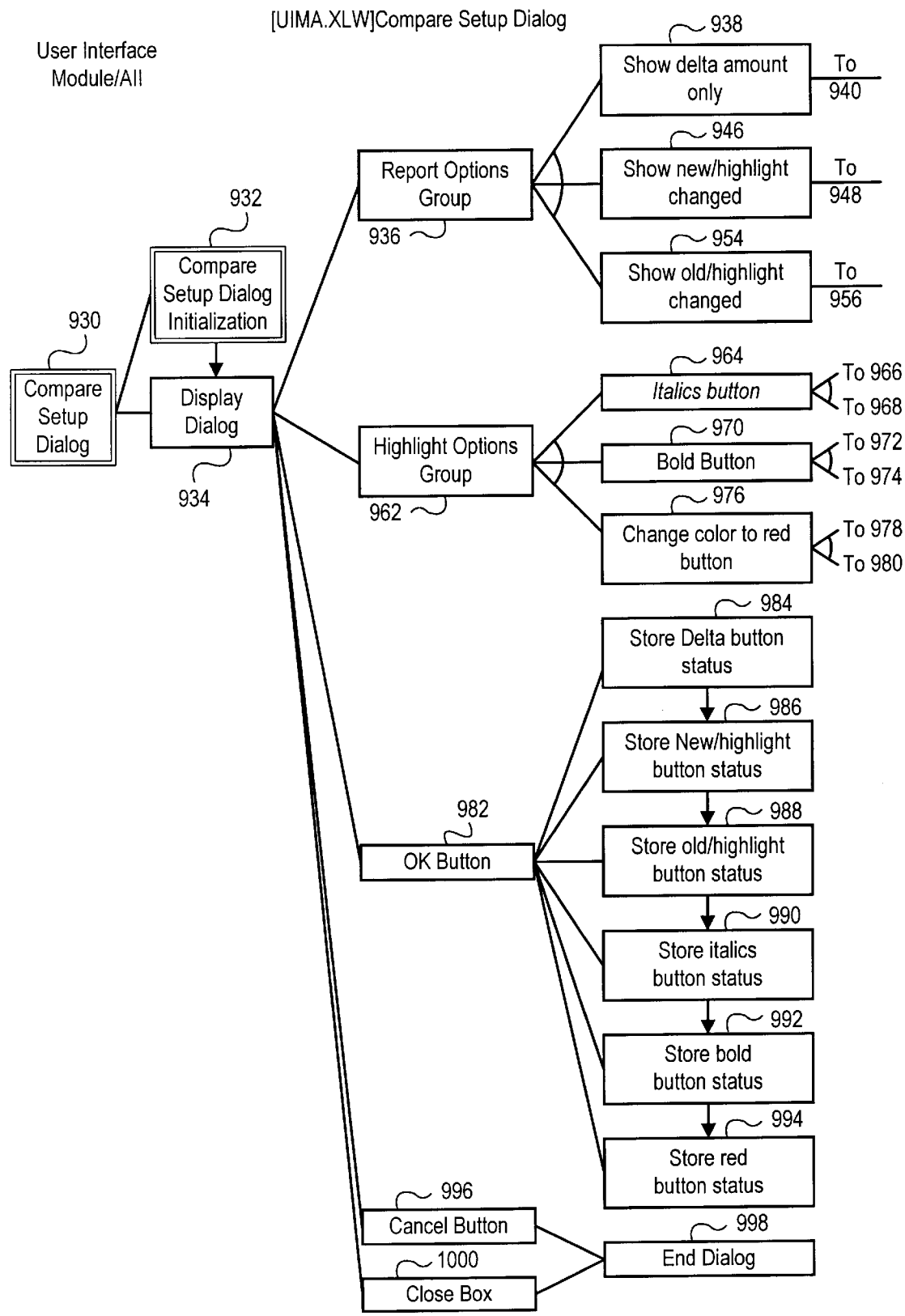
FIG. 39 shows a block diagram of a compare setup dialog for a user interface.
Figure 39B:
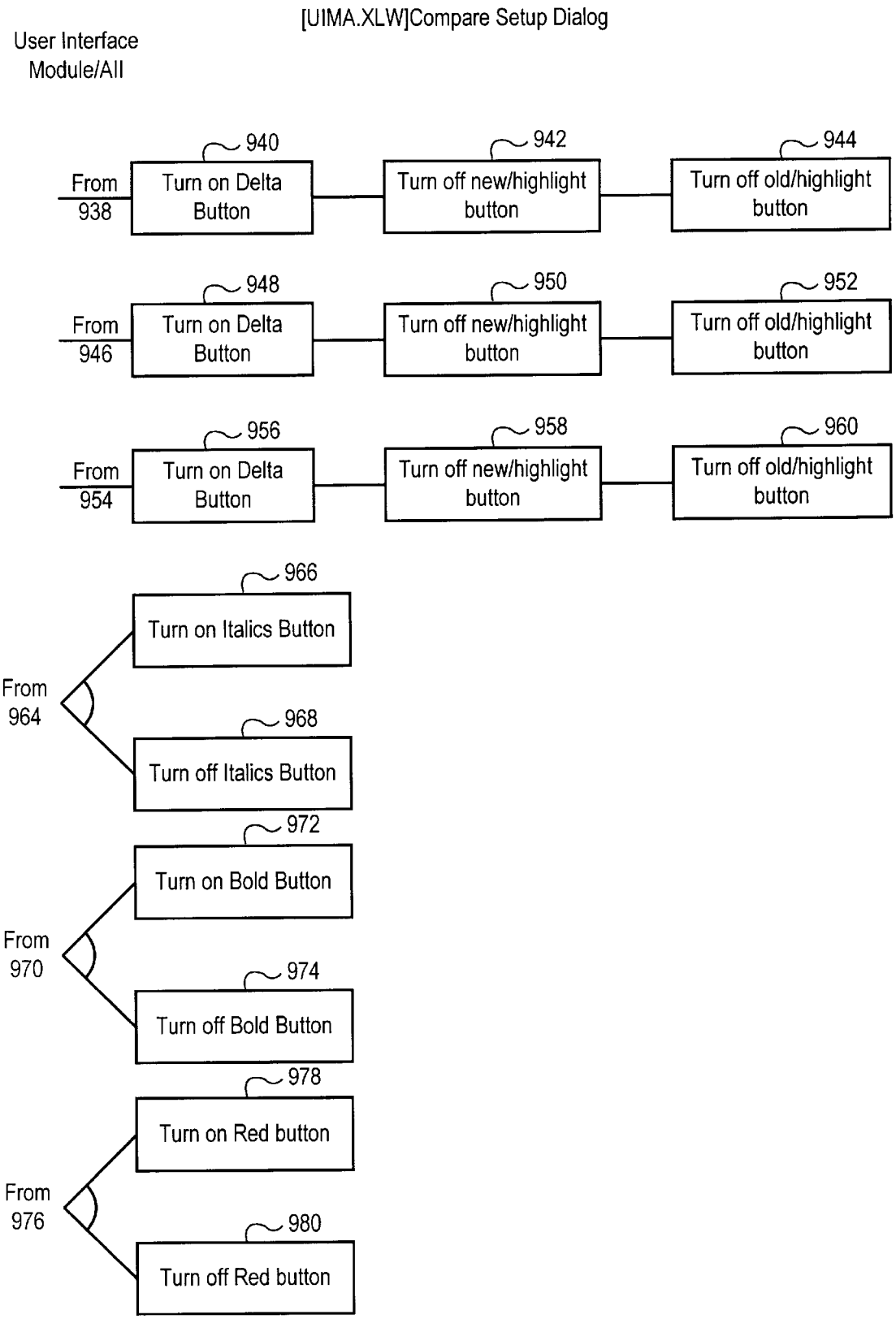

FIG. 39 shows a block diagram of a compare setup dialog for a user interface. Compare set up dialog 930 includes compare set up dialog initialization 932 and display dialog 934. Display dialog 934 includes report options group 936, highlight options group 962, OK button 982, cancel button 996, and close box 1000. Report options group 936 includes show delta amount only 938, show new/highlight changed 946, and show old/highlight changed 954. Show delta amount only 938 includes turn on delta button 940, turn off highlight button 942, and turn off old/highlight button 944. Show new/highlight changed 946 includes turn on delta button 948, turn off new/highlight button 950, and turn off old/highlight button 952. Show old/highlight changed 954 includes turn on delta button 956, turn off new/highlight button 958, and turn off old/highlight button 960. Highlight options group 962 includes italics button 964, bold button 970, and change color to red button 960. Italics button 964 includes turn on italics button 966 and turn off italics button 968. Bold button 970 includes turn on bold button 972 and turn off bold button 974. Change color to red button 976 includes turn on red button 978 and turn off red button 980. OK button 982 includes store delta button status 984, store new/highlight button status 986, store old/highlight button status 988, store italics button status 990, store bold button status 992, and store red button status 994. Cancel button 996 and close box 1000 include end dialog 998.

Figure 40:
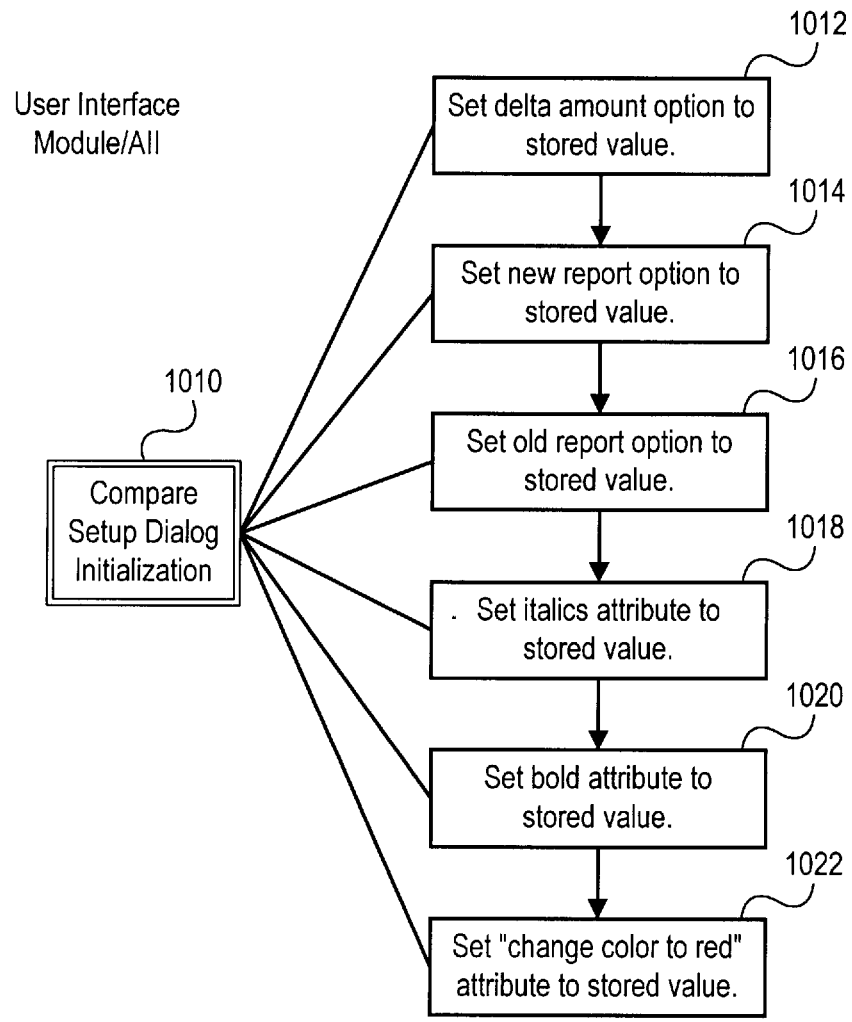
FIG. 40 shows a block diagram for a compare setup dialog initial for a user interface.

FIG. 40 shows a block diagram for a compare setup dialog initialization for a user interface. Compare set up dialog initialization 1010 includes set delta amount option to stored value 1012, set new report option to stored value 1014, set old report option to stored value 1016, set italics attribute to stored value 1018, set bold attribute to stored value 1020, and set "change color to red" attribute to stored value 1022.

Figure 41:
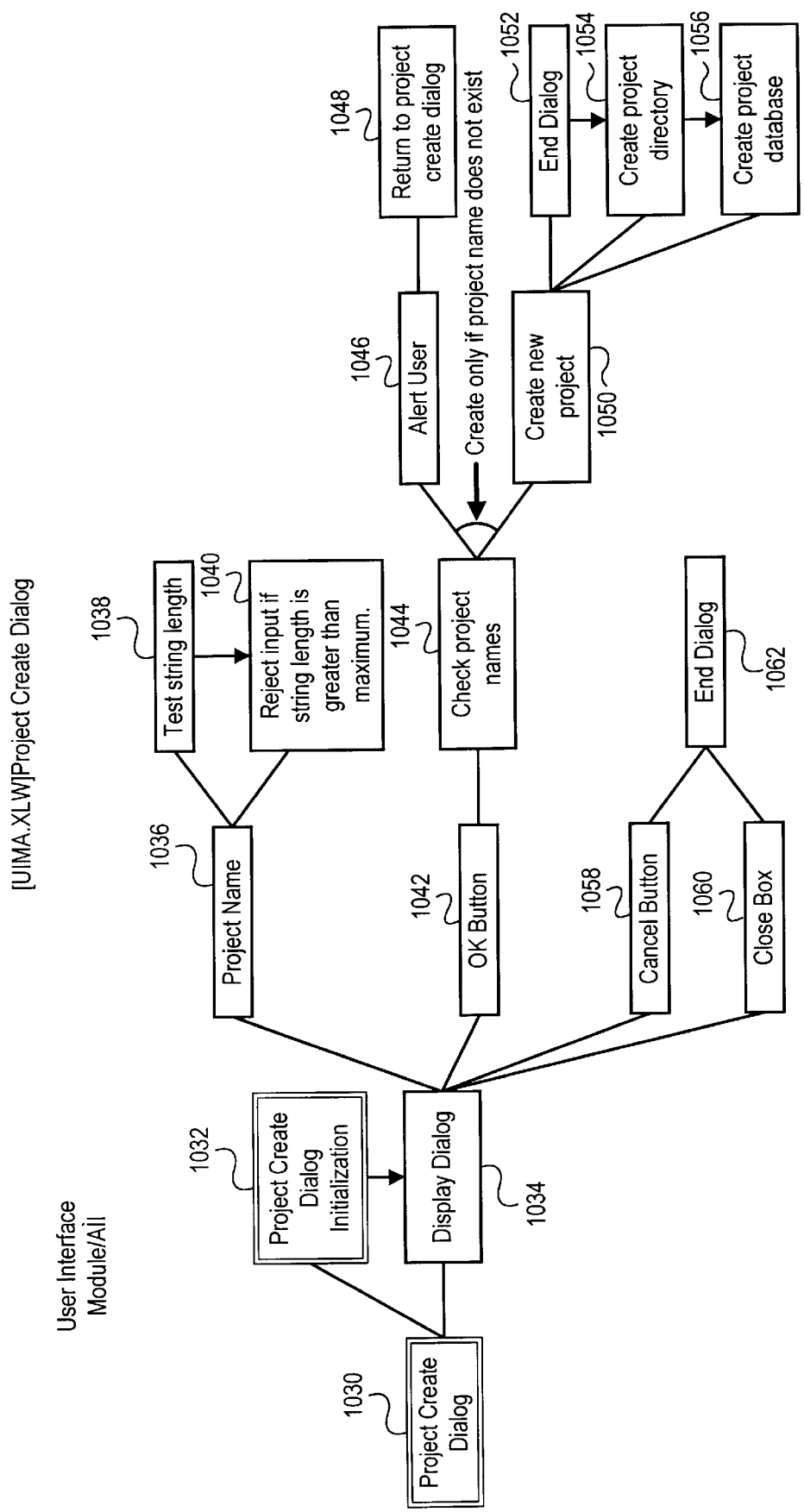
FIG. 41 shows a block diagram of a project created dialog for a user interface.

FIG. 41 shows a block diagram of a project create dialog for a user interface. Project create dialog 1030 includes project create dialog initialization 1032 and display dialog 1034. Display dialog 1034 includes project name 1036, OK button 1042, cancel button 1058, and close box 1060. Project name 1036 includes test string length 1038 and reject input if string length is greater than maximum 1040. OK button 1042 includes check project names 1044, which includes alert user 1046 and create new project 1050. A new project is created only if project name does not exist. Create new project 1050 includes end dialog 1052, create project directory 1054, and create project database 1056. Cancel button 1058 and close box 1060 include end dialog 1062.

Figure 42:
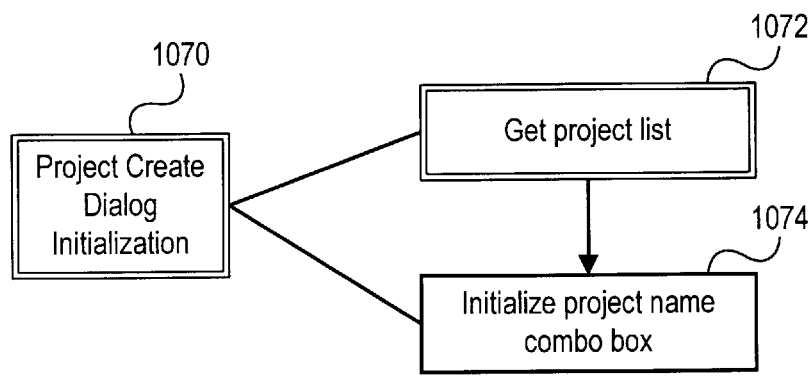
FIG. 42 shows a block diagram of a project create dialog initialization for a user interface.

FIG. 42 shows a block diagram of a project create dialog initialization for a user interface. Project create dialog initialization 1070 includes get project list 1072 and initialize project name combo box 1074.

Figure 43:
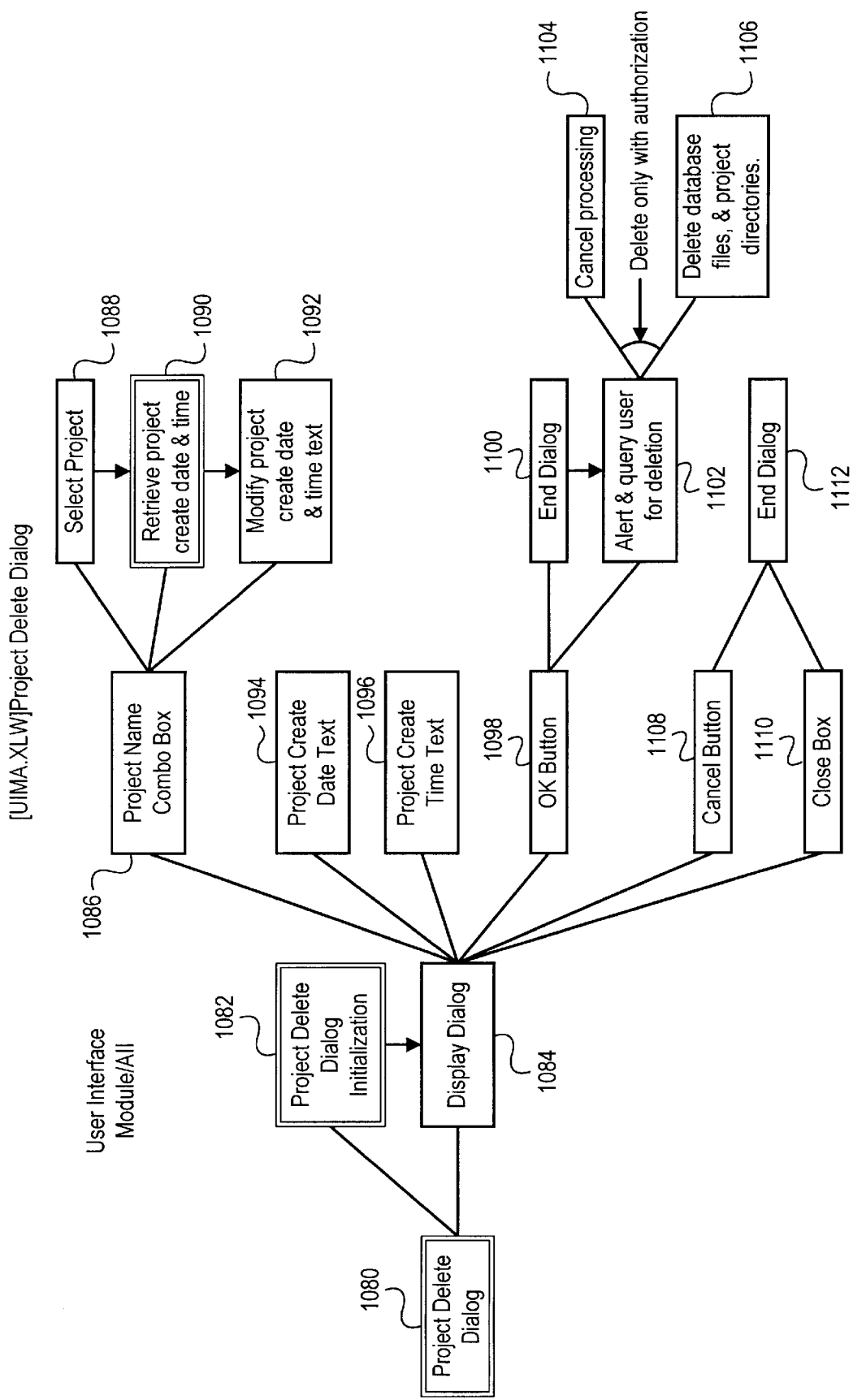
FIG. 43 shows a block diagram of a project delete dialog for a user interface.

FIG. 43 shows a block diagram of a project delete dialog for a user interface. Project delete dialog 1080 includes project delete dialog initialization 1082 and display dialog 1084. Display dialog 1084 includes project name combo box 1086, project create date text 1094, project create time text 1096, OK button 1098, cancel button 1108, and close box 1110. Project name combo box 1086 includes select project 1088, retrieve project create date and time 1090, and modify project create date and time text 1092. OK button 1098 includes end dialog 1100 and alert and query user for deletion 1102. Delete is performed only with authorization. Alert and query user for deletion 1102 includes cancel processing 1104 and delete database, files and project directories 1106. Cancel button 1108 and close box 1110 include end dialog 1112.

Figure 44:
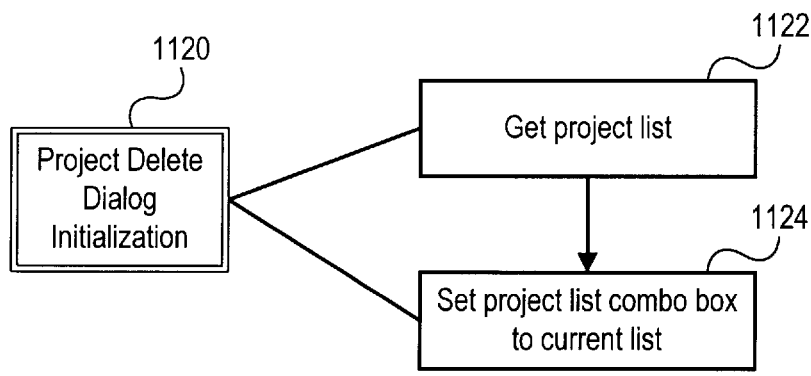
FIG. 44 shows a block diagram for a project delete dialog initialization for a user interface.

FIG. 44 shows a block diagram for a project delete dialog initialization for a user interface. Project delete dialog initialization 1120 includes get project list 1122 and set project list combo box to current list 1124.

Figure 45:
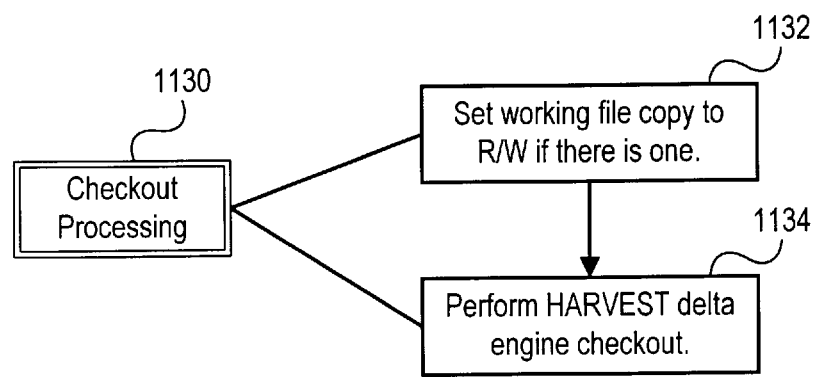
FIG. 45 shows a block diagram of a check out processing.

FIG. 45 shows a block diagram of check out processing. Check out processing 1130 includes set working file copy to R/W if there is one 1132 and form harvest delta engine check out 1134.

Figure 46:
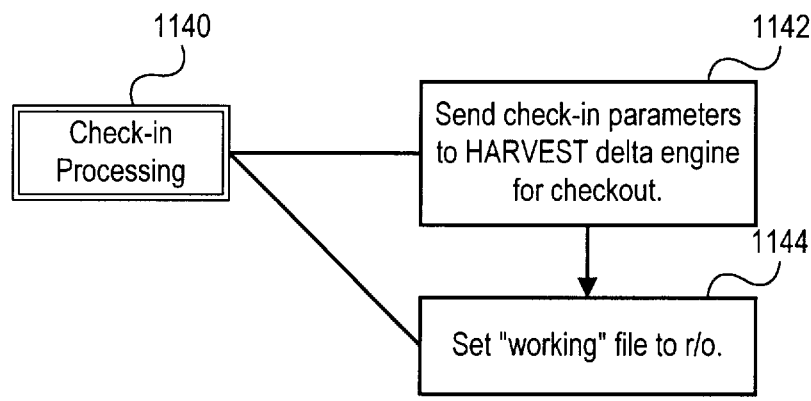
FIG. 46 shows a block diagram for a check-in processing.

FIG. 46 shows a block diagram for a check-in processing. Check-in processing 1140 includes send check-in parameters to harvest delta engine for check out 1142 and set "working" file to r/o 1144.

Figure 47:
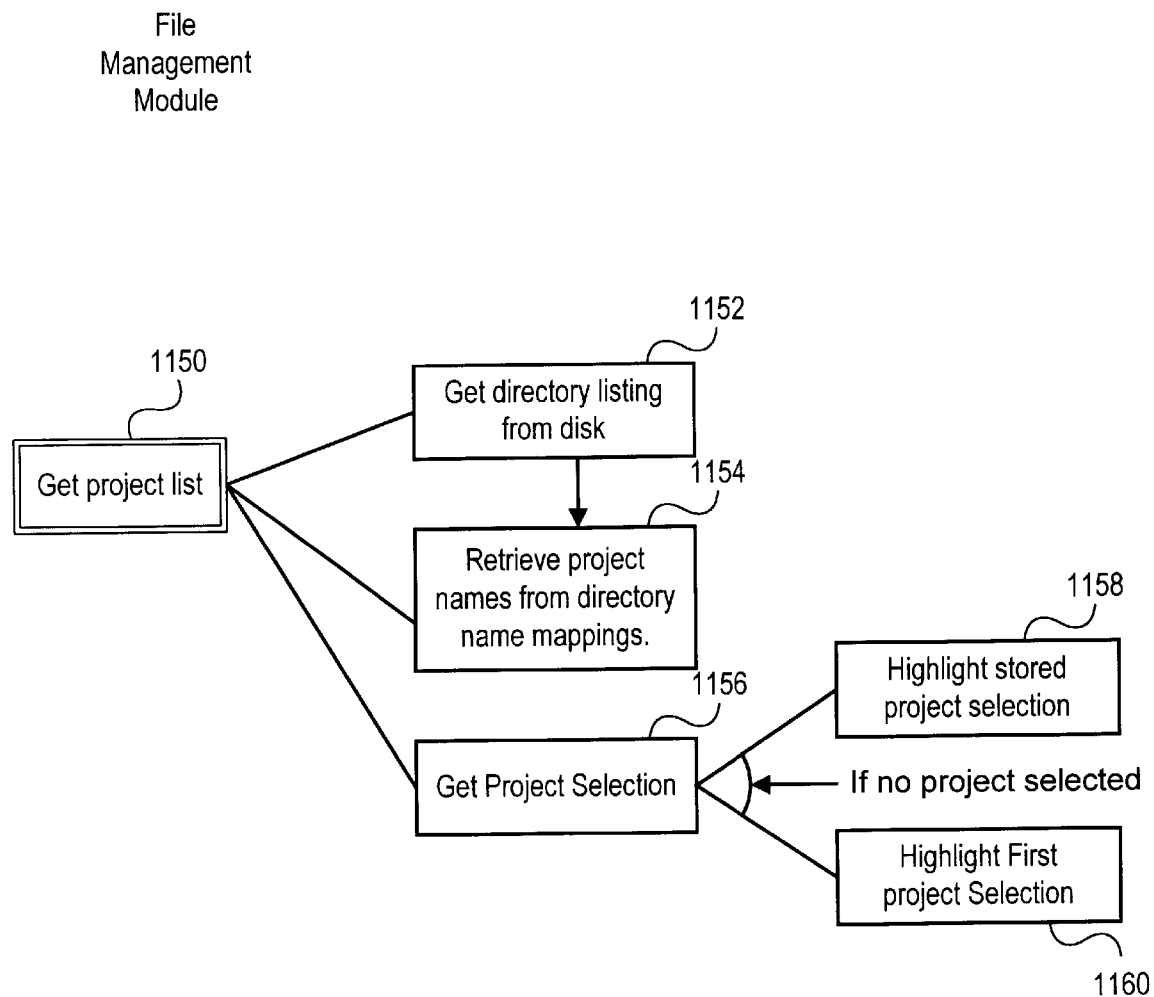
FIG. 47 shows a block diagram of project-file-version lists.

FIG. 47 shows a block diagram of project-file-version lists. Get project list 1150 includes get directory listing from disk 1152, retrieve project names from directory name mappings 1154, and get project selection 1156. Get project selection 1156 includes highlight stored project selection 1158 and, if no project is selected, highlight first project selection 1160.

Figure 48:
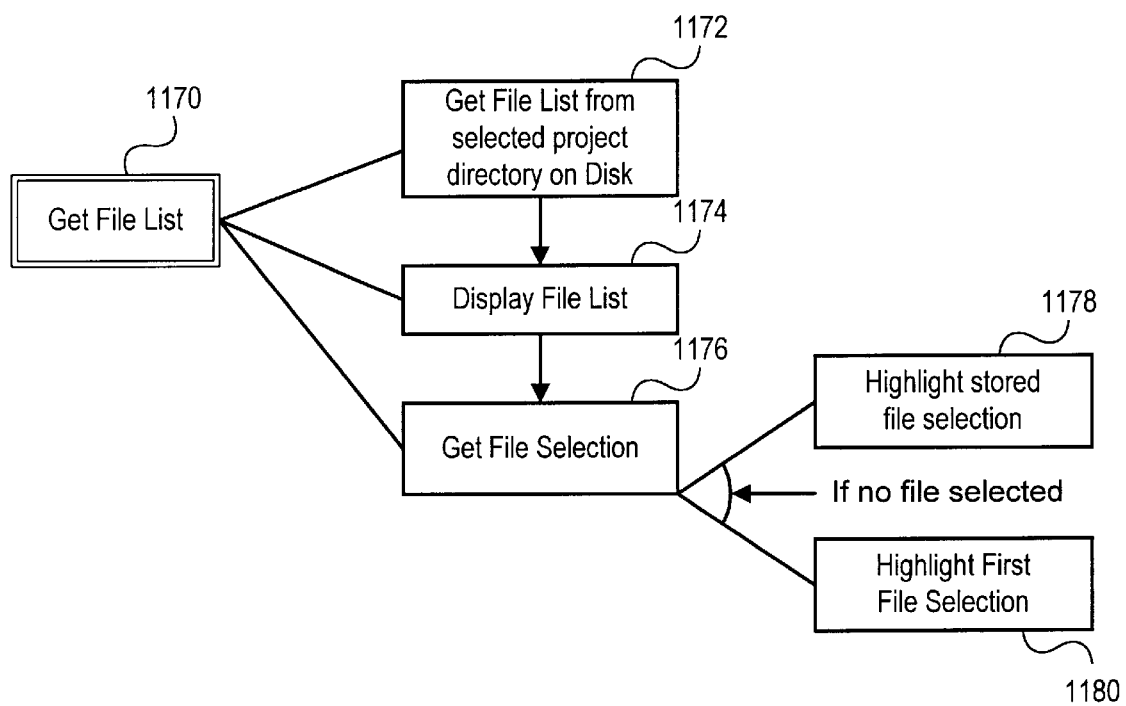
FIG. 48 shows a block diagram for project-file-version lists.

FIG. 48 shows a block diagram for project-file-version lists. Get file list 1170 includes get file list from selected project directory on disk 1172, display file list 1174, and get file selection 1176. Get file selection 1176 includes highlight stored file selection 1178 and highlight first file selection 1180.

Figure 49:
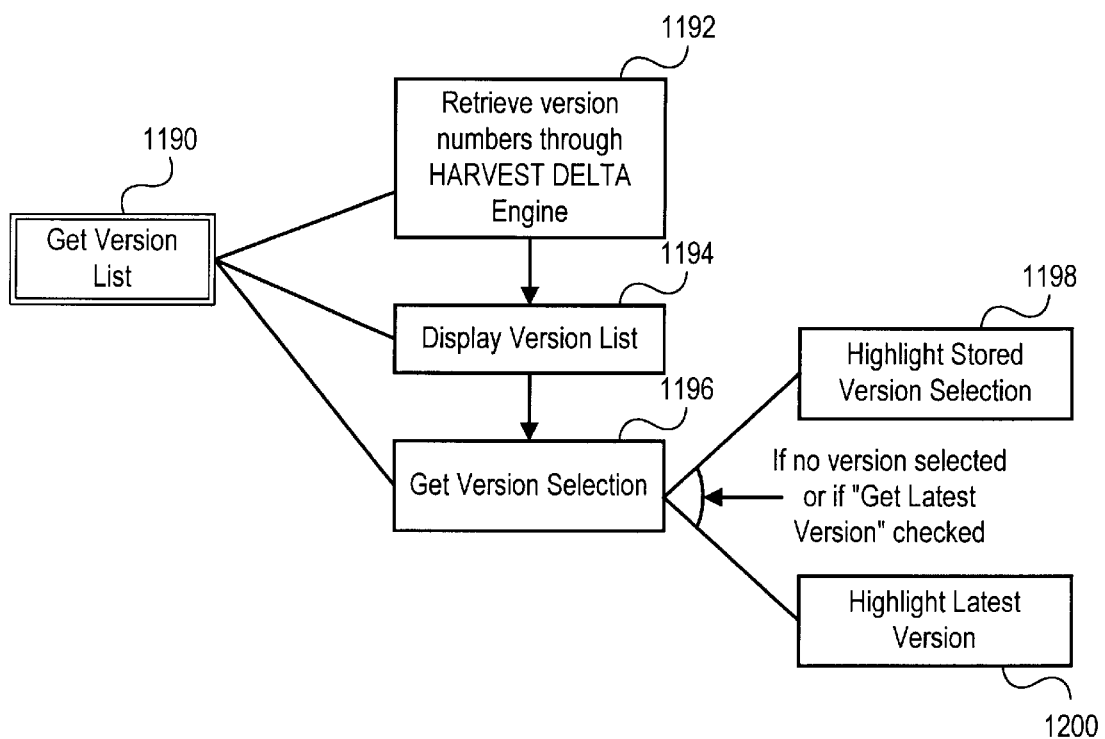
FIG. 49 shows a block diagram of project-file-version lists.

FIG. 49 shows a block diagram of project-file-version lists. Get version list 1190 includes retrieve version numbers through harvest delta engine 1192, display version list 1194, and get version selection 1196. Get version selection 1196 includes highlight stored version selection 1198 and highlight latest version 1200.

Figure 50:
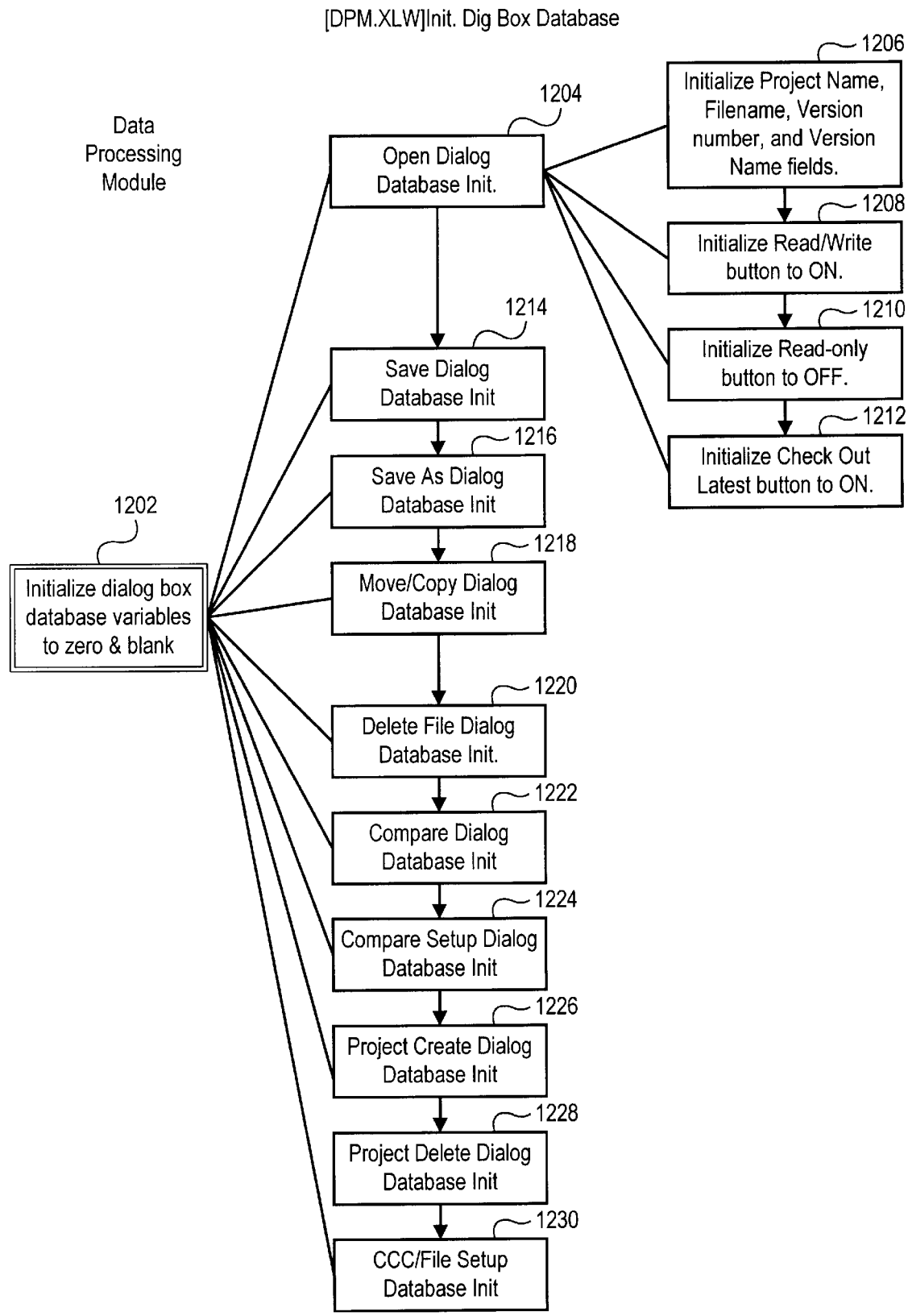
FIG. 50 shows a block diagram for an initialization dialog box database.

FIG. 50 shows a block diagram for an initialization dialog box database. Initialize dialog box database variables to zero and blank 1202 includes open dialog database init 1204, save dialog database init 1214, save as dialog database init 1216, move/copy dialog database init 1218, delete file dialog database init 1220, compare dialog database init 1222, compare set up dialog database init 1224, project create dialog database init 1226, project delete dialog database init 1228, and CCC/file set up database init 1230. Open dialog database init 1204 includes initialize project name, file name, version number, and version name fields 1206, initialize read/write button to on 1208, initialize read-only button to off 1210, and initialize check out latest button to on 1212.

Figure 51:
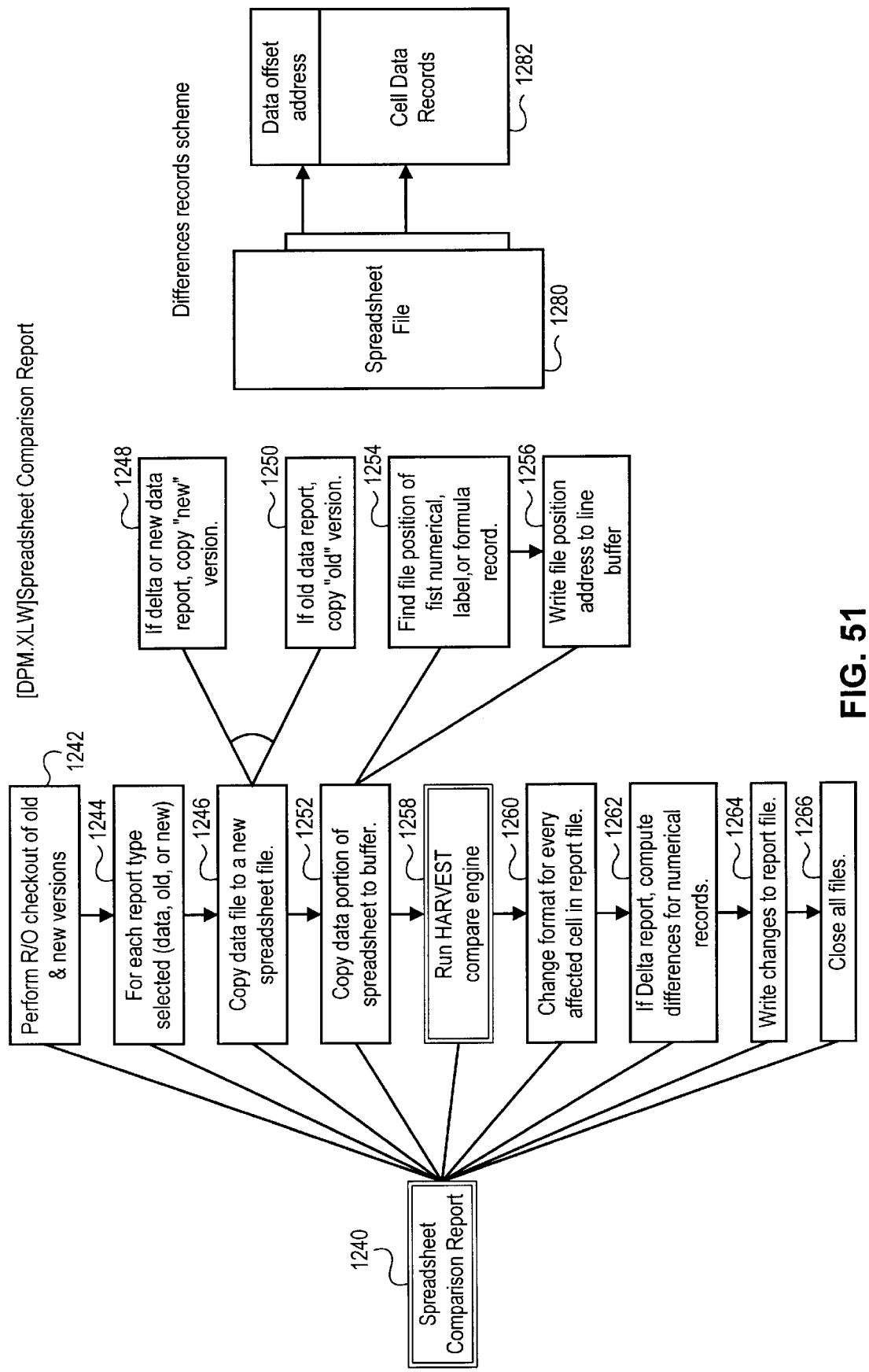
FIG. 51 shows a block diagram for a spreadsheet comparison report.

FIG. 51 shows a block diagram for a spreadsheet comparison report. Spreadsheet comparison report 1240 includes perform R/O check out of new and old versions 1242, for each report type selected (delta old, or new) 1244, copy data file to a new spreadsheet file 1246, copy data portion of spreadsheet to buffer 1252, run harvest compare engine 1258, change format for every effected cell in report file 1260, if delta report, compute differences for numerical records 1262, write changes to report file 1264, and close all files 1266. Copy data file to a new spreadsheet file 1246 includes if delta or new data report, copy "new" version 1246 and if old data report, copy "old" version 1250. Copy data portion of spreadsheet to buffer 1252 includes find file position of first numerical, label, or formula record 1254 and write file position address to line buffer 1256. Spreadsheet file 1280 includes data offset address and data records 1282. The cell data records is the data structure on which differences are calculated. At the beginning of a spreadsheet file contains records pertaining to specific format types that are referenced in the cell records themselves.

Figure 52:
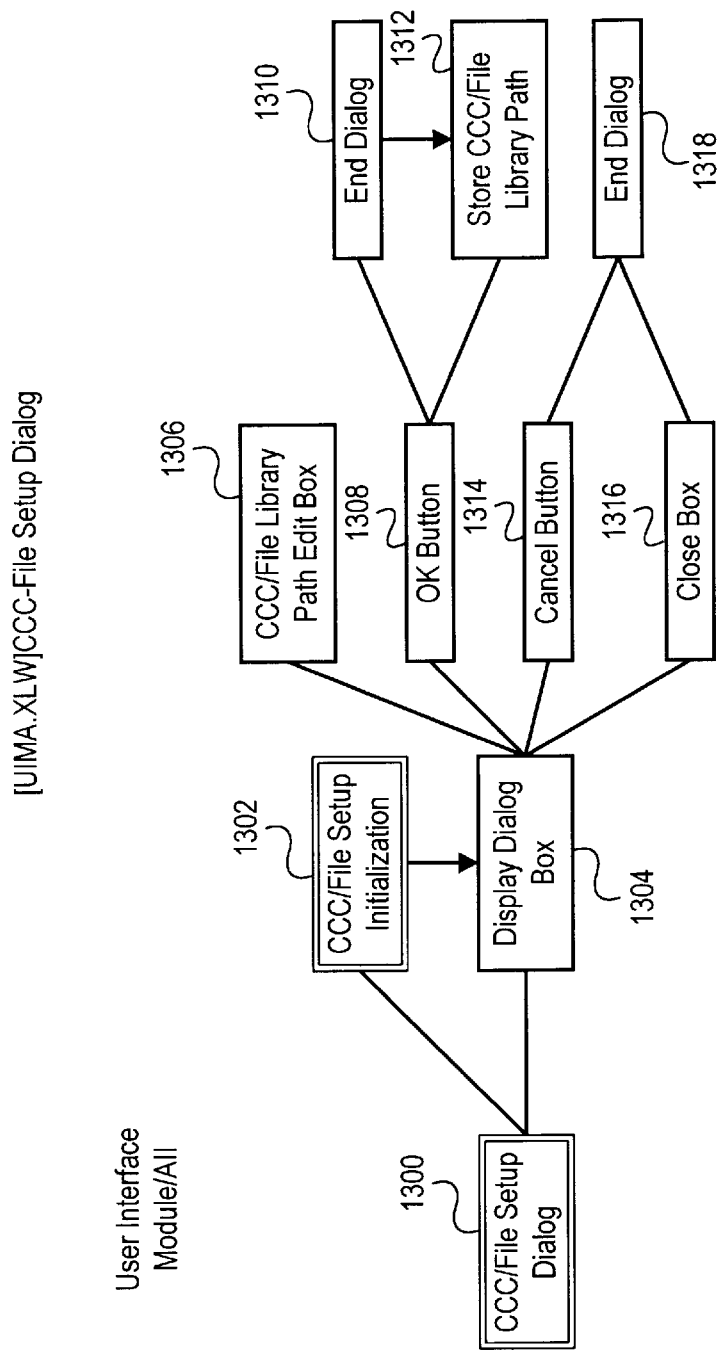
FIG. 52 shows a block diagram for a CCC-file setup dialog for a user interface.

FIG. 52 shows a block diagram for a CCC-file setup dialog for a user interface. CCC/file set up dialog 1300 includes CCC/file set up initialization 1302 and display dialog box 1304. Display dialog box 1304 includes CCC/file library path edit box 1306, OK button 1308, cancel button 1314, and close box 1316. OK button 1308 includes end dialog 1310 and store CCC/file library path 1310. Cancel button 1314 and close box 1316 include end dialog 1318.

Figure 53:
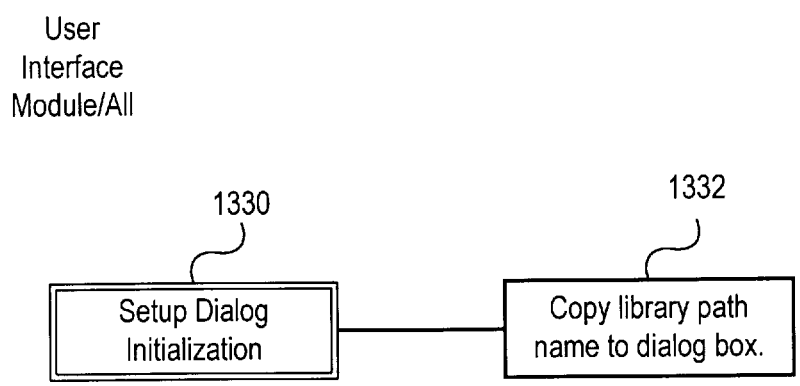
FIG. 53 shows a block diagram for a CCC-file setup dialog initialization for a user interface.

FIG. 53 shows a block diagram for a CCC-file setup dialog initialization for a user interface. Set up dialog initialization 1330 includes copy path name to dialog box 1332.

Figure 54:
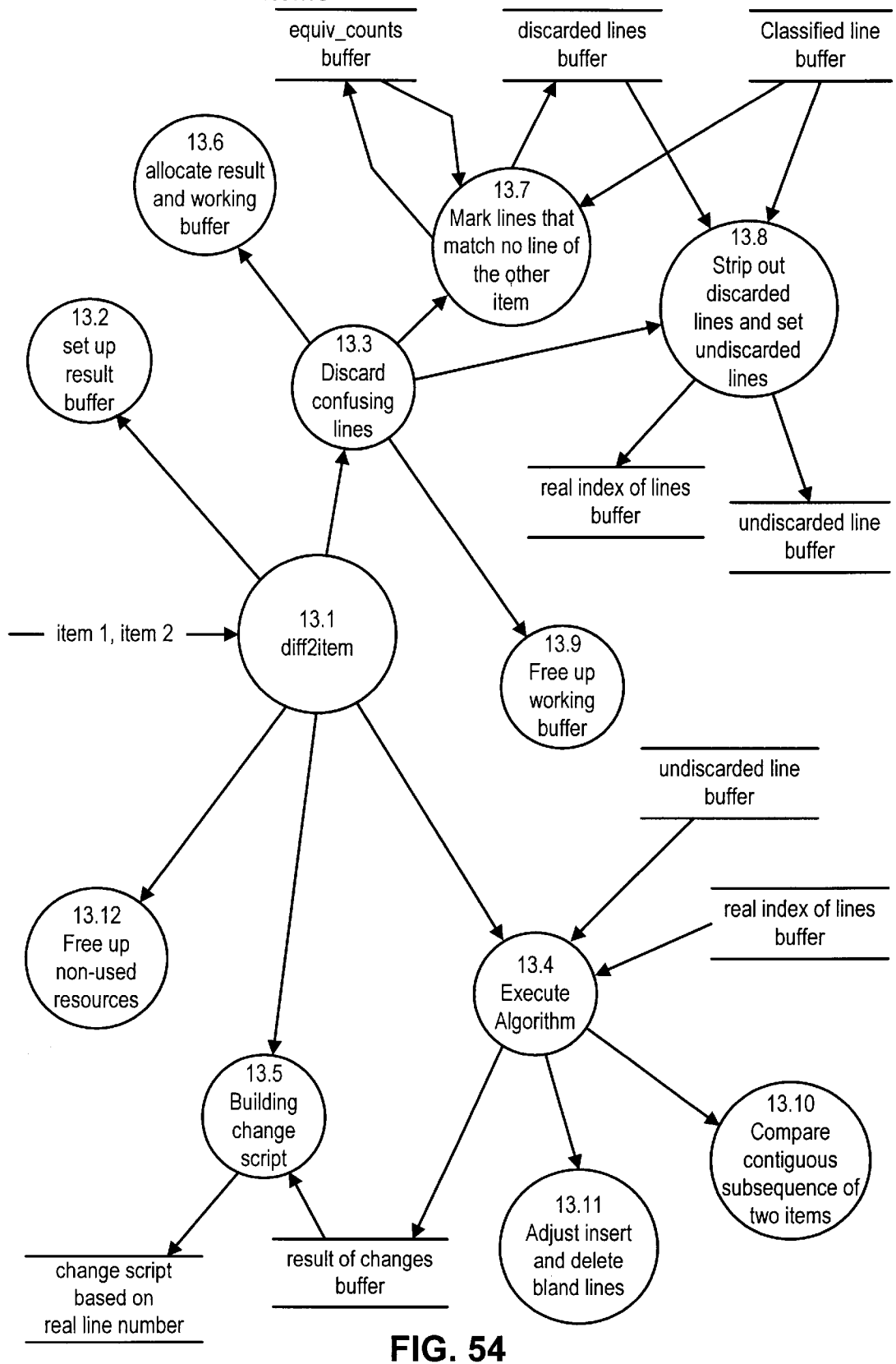
FIG. 54 shows a block diagram of a module name: Diff2items.

FIG. 54 shows a block diagram of a module name: Diff2items. Diff2item 13.1 operates on item 1 and item 2. Diff2item 13.1 is coupled into set up results buffer 13.2, discard confusing lines 13.3, building change script 13.5, and free up non-used resources 13.12. Discard confusing lines 13.3 is coupled into allocate result and working buffer 13.6, mark lines that match no line of the other item 13.7, strip out discarded lines and set undiscarded lines 13.8, and free up working buffer 13.9. Execute algorithm 13.4, which is coupled to diff2item 13.1, is coupled to compare contiguous subsequence of two items 13.10, and adjust insert and delete blend lines 13.11. From execute algorithm 13.4 is a connection to result of changes buffer. Undiscarded line buffer is coupled to execute algorithm 13.4, real index of lines buffer is also coupled to execute algorithm 13.4. Result of changes buffer is coupled to building change script 13.5. Building change script 13.5 is coupled to change script based on real line number. Mark lines that match no line of the other item 13.7 is coupled for input and output to equiv_count buffer, discarded lines buffer, and classified line buffer. Discarded lines buffer is coupled to strip out discarded lines and set undiscarded lines 13.8, which is coupled into real index of lines buffer and discarded line buffer.

Figure 55:
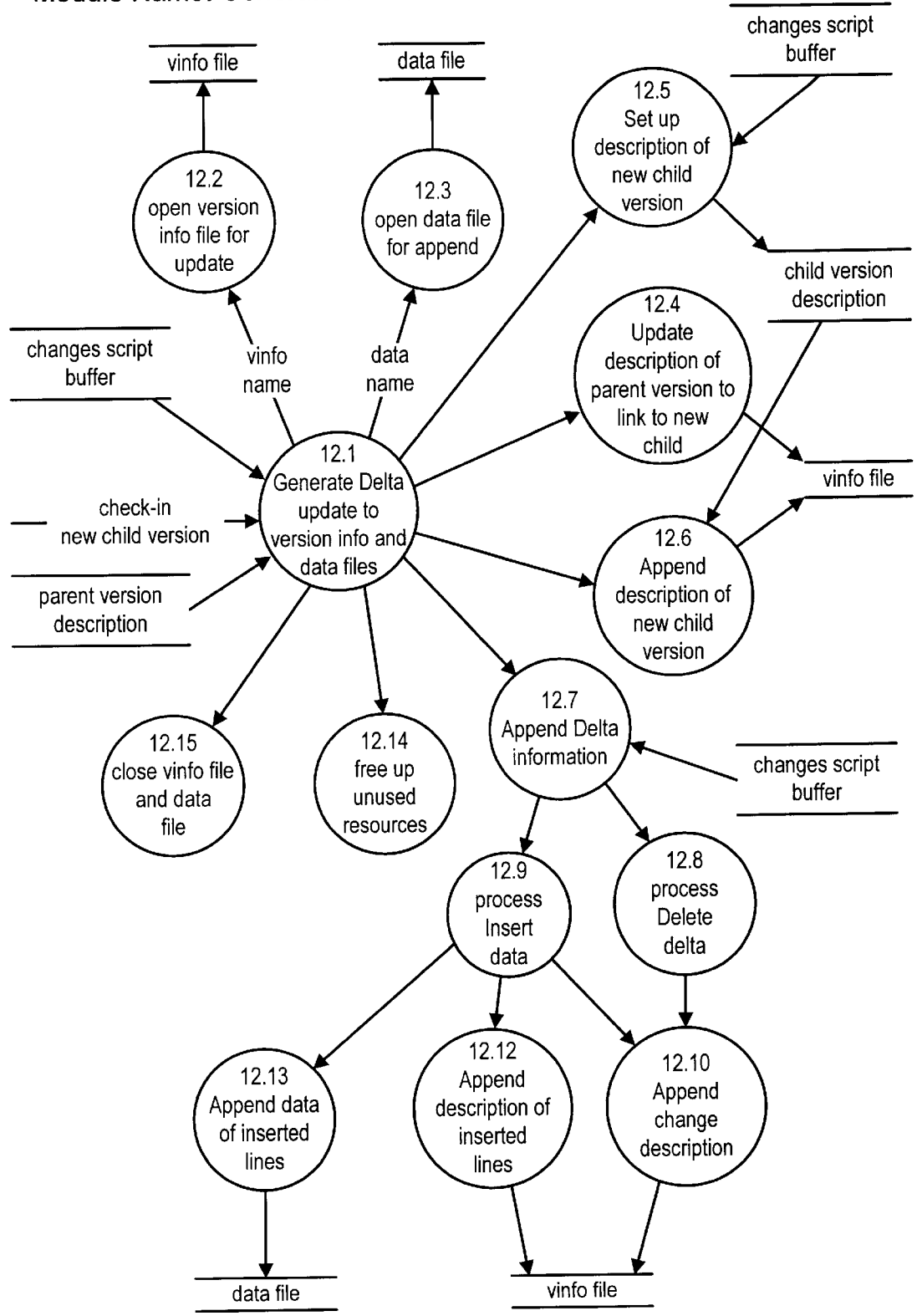
FIG. 55 shows a block diagram of module name: Generate delta.

FIG. 55 shows a block diagram of module name: Generate delta. Generate delta, update to version info and data files 12.2 receives input from changes script buffer, check-in new child version, and parent version description. Generate delta, update to version info and data files 12.1 is coupled to open version info file for update through vinfo name, to open data file for append through data name, to set up description of new child version 12.5, to update description of parent version to link to new child 12.4, to append description of new child version 12.6, to append delta information 12.7, to free up unused resources 12.14, and to close vinfo file and data file 12.15. Open version info file for update 12.2 is coupled into vinfo file. Open data file for append 12.3 is coupled into data file. Set up description of new child version 12.5 receives input from changes script buffer and outputs to child version description. Update description of parent version to link to new child is coupled into vinfo file. Append description of new child version 12.6 is coupled into vinfo file. Child version description is coupled into append description of new child version 12.6. Append delta information 12.7 receives input from changes script buffer. Append delta information 12.7 is coupled into process insert delta 12.9 and process delta data 12.8. Process insert data 12.9 is coupled into append data of inserted lines 12.13, append description of inserted lines 12.12, and append change description 12.10. Append data of inserted lines 12.13 is coupled into data file. Append description of inserted lines 12.12 is coupled into vinfo file. Append change description 12.10 is coupled into vinfo file. Process delta data 12.8 is coupled into append change description 12.10.

Figure 56:
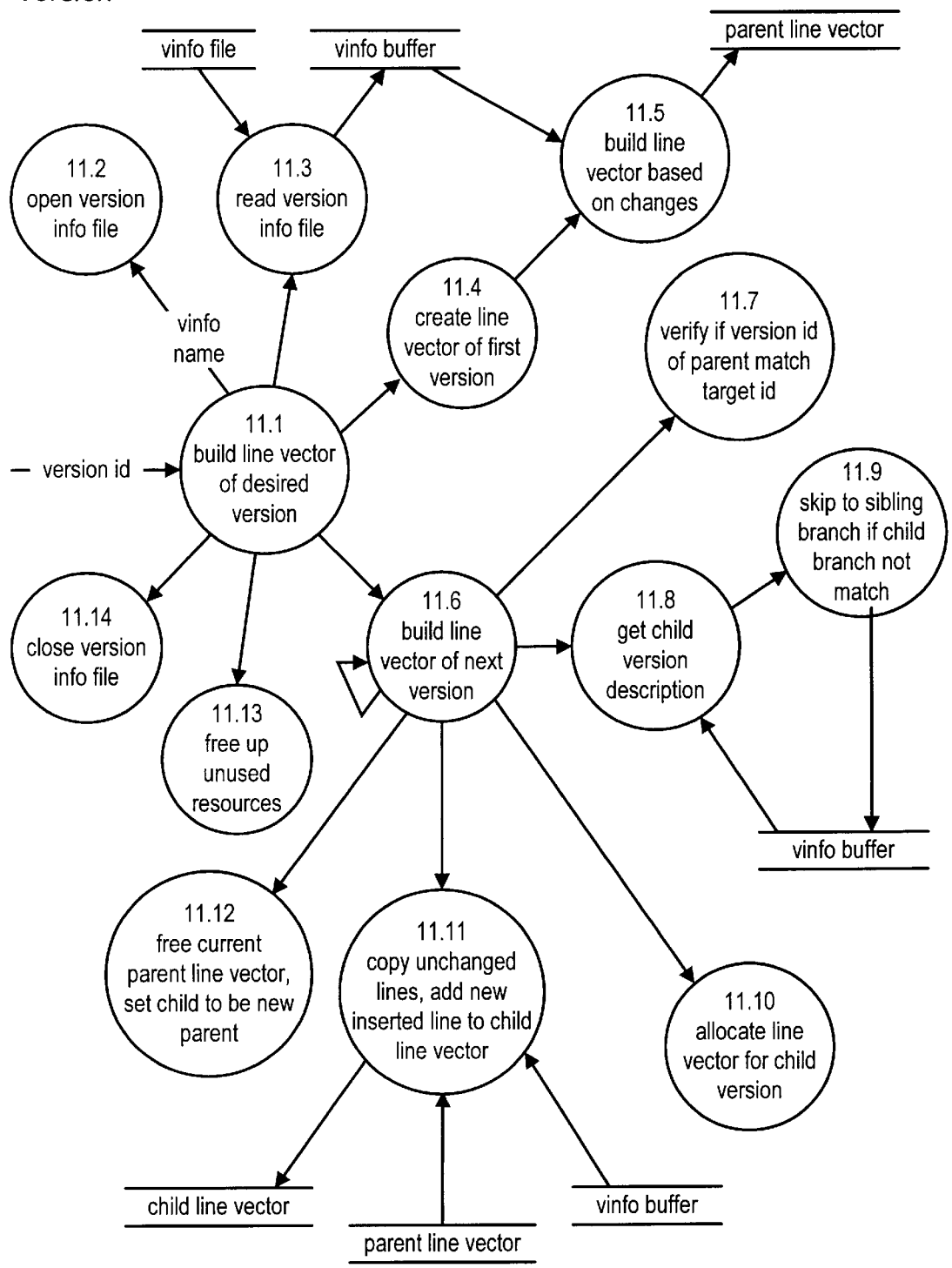
FIG. 56 shows a block diagram of module name: Build line vector of desired version.

FIG. 56 shows a block diagram of module name: Build line vector of desired version. Version id is input into build line vector of desired version 11.1. Build line vector of desired version 11.1 is coupled through vinfo name into open version info file 11.2, read version info file 11.3, create line vector of first version 11.4, build line vector of next version 11.6, free up unused resources 11.13, and close version info file 11.14. Read version info file 11.3 receives input from vinfo file and outputs to vinfo buffer. Create line vector of first version 11.4 is coupled into build line vector based on changes. Build line vector based on changes 11.5 receives input from vinfo buffer and outputs to parent line vector. Build line vector of next version 11.6 is coupled into verify if version ID of parent match target ID 11.7, and get child version description 11.8, allocate line vector for child version 11.10, copy unchanged lines, add new inserted line to child line vector 11.11, and free current parent line vector, set child to be new parent 11.12. Get child version description 11.8 is coupled into skip sibling branch if child branch not match, and vinfo buffer is coupled into skip to sibling branch if child branch not match 11.9 and into get child version description 11.8. Copy unchanged lines, add new inserted line to child vector 11.11 receives input from vinfo buffer, and parent line vector and outputs to child line vector. Build line vector of next version 11.6 has a loop onto itself.

Figure 57:
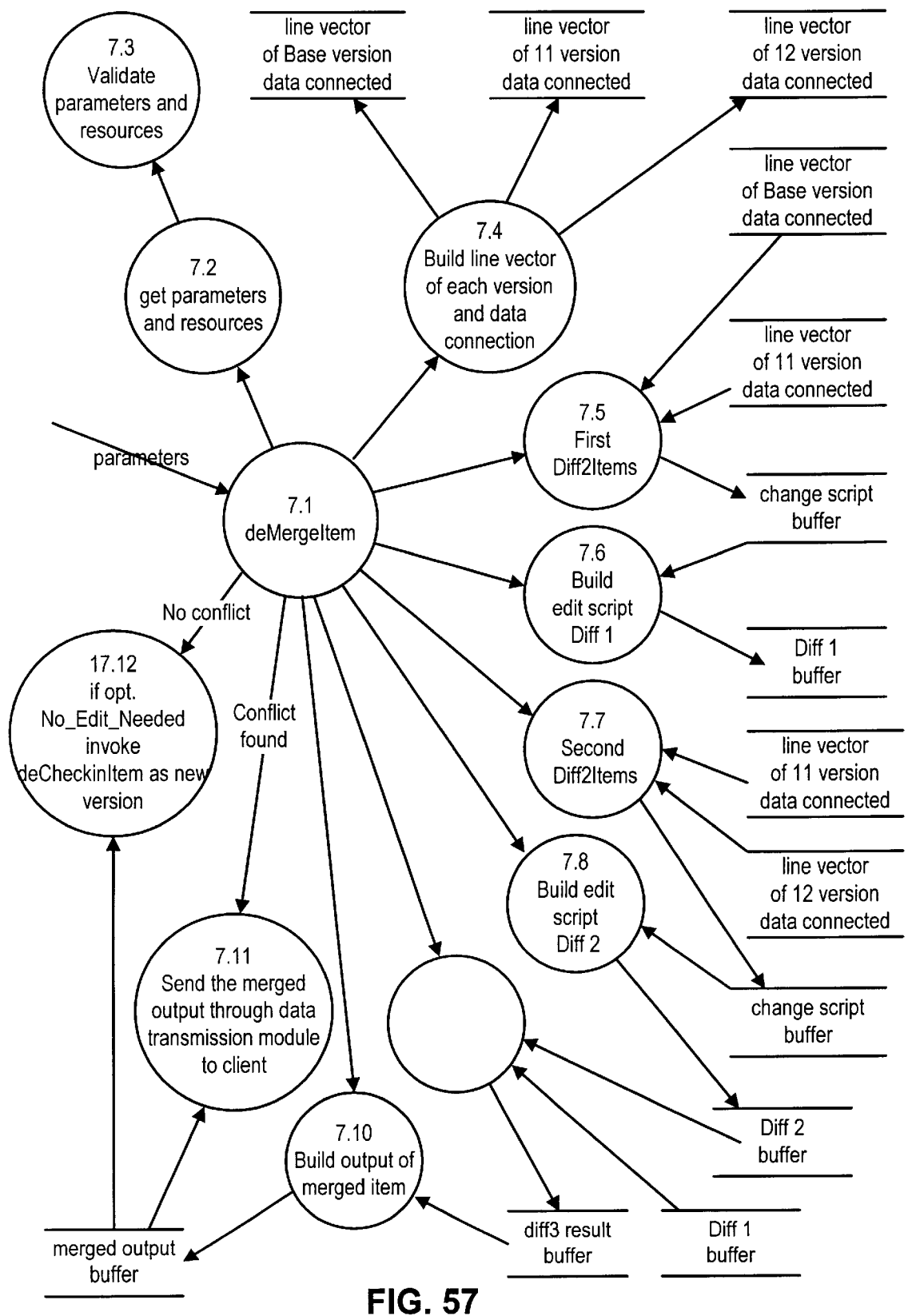
FIG. 57 shows a block diagram of module name: deMergeitem.

FIG. 57 shows a block diagram of module name: deMergeitem. deMergeitem 7.1 receives parameters. deMergeitem 7.1 is coupled into get parameters and resources 7.2, build line vector of each version and data connection 7.4, first diff2item 7.5, build edit script diff1 7.6, second diff2items 7.7, build edit script diff2 7.8, build output of merged item 7.10, through conflict found to send the merged output through data transmission module to client 7.11, through no conflict to if opt. no_edit_needed invoke deCheckinItem as new version 7.12. Build line vector of each version and data connection 7.4 is coupled into line vector of base version data connected, line vector of 11 version data connected, and line vector of 12 version data connected. First diff2item 7.5 receives input from line vector of base version data connected and line vector of 11 version data connected and outputs to change script buffer. Build edit script diff1 7.6 receives input from change script buffer and outputs to diff1 buffer. Second diff2item 7.7 receives input from line vector 11 version data connected and line vector 12 version data connected and outputs to change script buffer. Build edit script diff 2 7.8 receives input from change script buffer and outputs to diff2 buffer. Build output of merged item 7.10 receives input from diff3 results buffer and outputs to merged output buffer. Send the merged output through data transmission module to client 7.11 receives input from merged output buffer. If opt. no_edit_needed invoke deCheckinItem as new version 7.12 receives input from merged output buffer.

Figure 58:
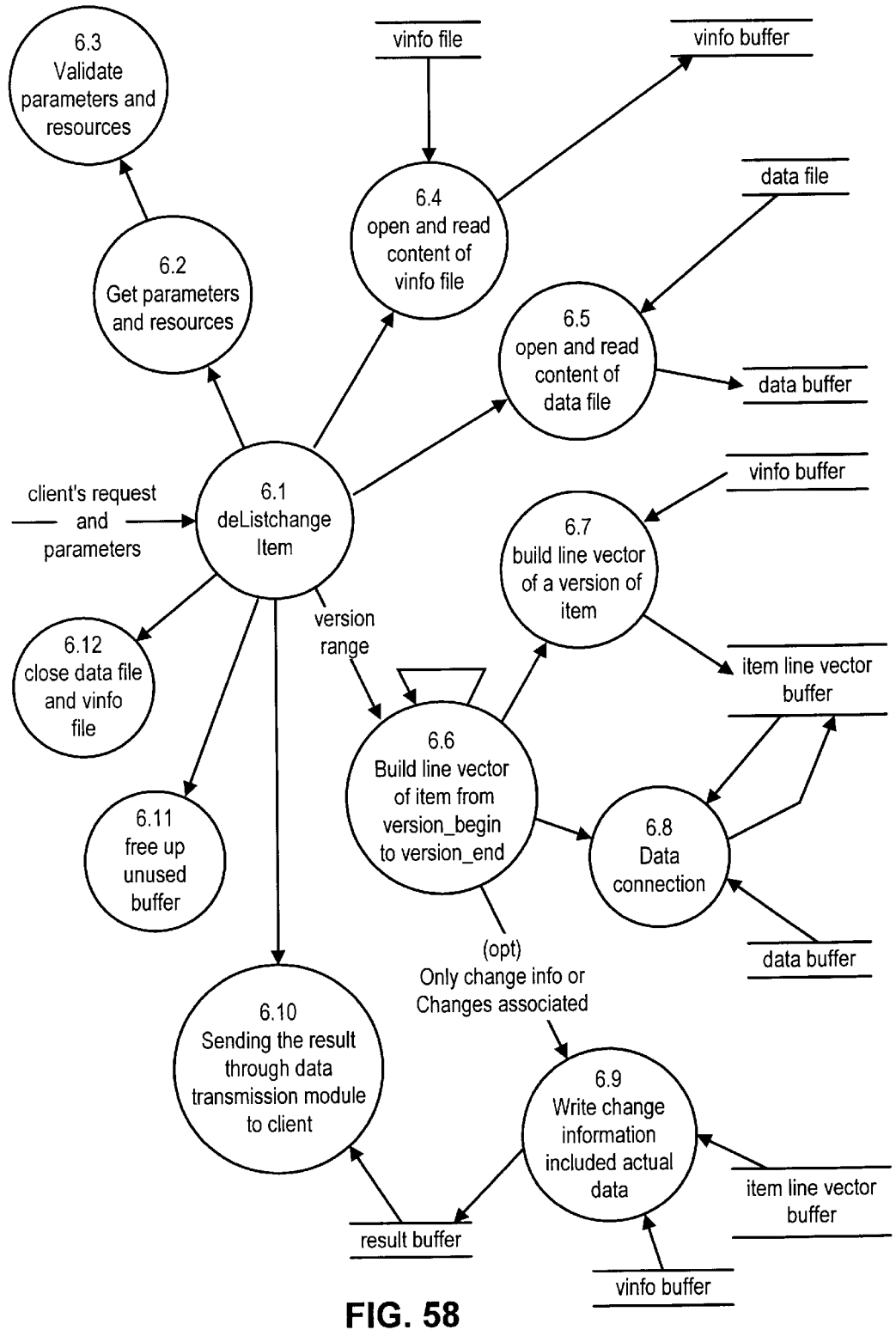
FIG. 58 shows a block diagram of module name: deListchangeitem.

FIG. 58 shows a block diagram of module name: deListchangeItem. deListchangeItem 6.1 receives client's request and parameters. deListchangeItem 6.1 is coupled into get parameters and resources 6.2, open and read content of vinfo file 6.4, open and read content of data file 6.5, through version range to build line vector of item from version_begin to version_end 6.6, to sending the result through data transmission module to client 6.10, to free up unused buffer 6.11, and to close data file and vinfo file 6.12. Open and read content of vinfo file 6.4 receives data from vinfo file and outputs to vinfo buffer. Open and read content of data file 6.5 receives input from data file and outputs to data buffer. Build line vector of item from version_begin to version_end outputs to build line vector of version item 6.7, data connection 6.8, through (opt) only change info or changes annotated to write change information included actual data 6.9. Build line vector of a version of item 6.7 receives input from vinfo buffer and outputs to item line vector buffer. Data connection 6.8 receives input from and outputs to item line vector buffer and receives input from data buffer. Write change information included actual data 6.9 receives input from item line vector buffer and vinfo buffer and outputs to results buffer. Sending the result through data transmission module to client 6.10 receives input from results buffer.

Figure 59:
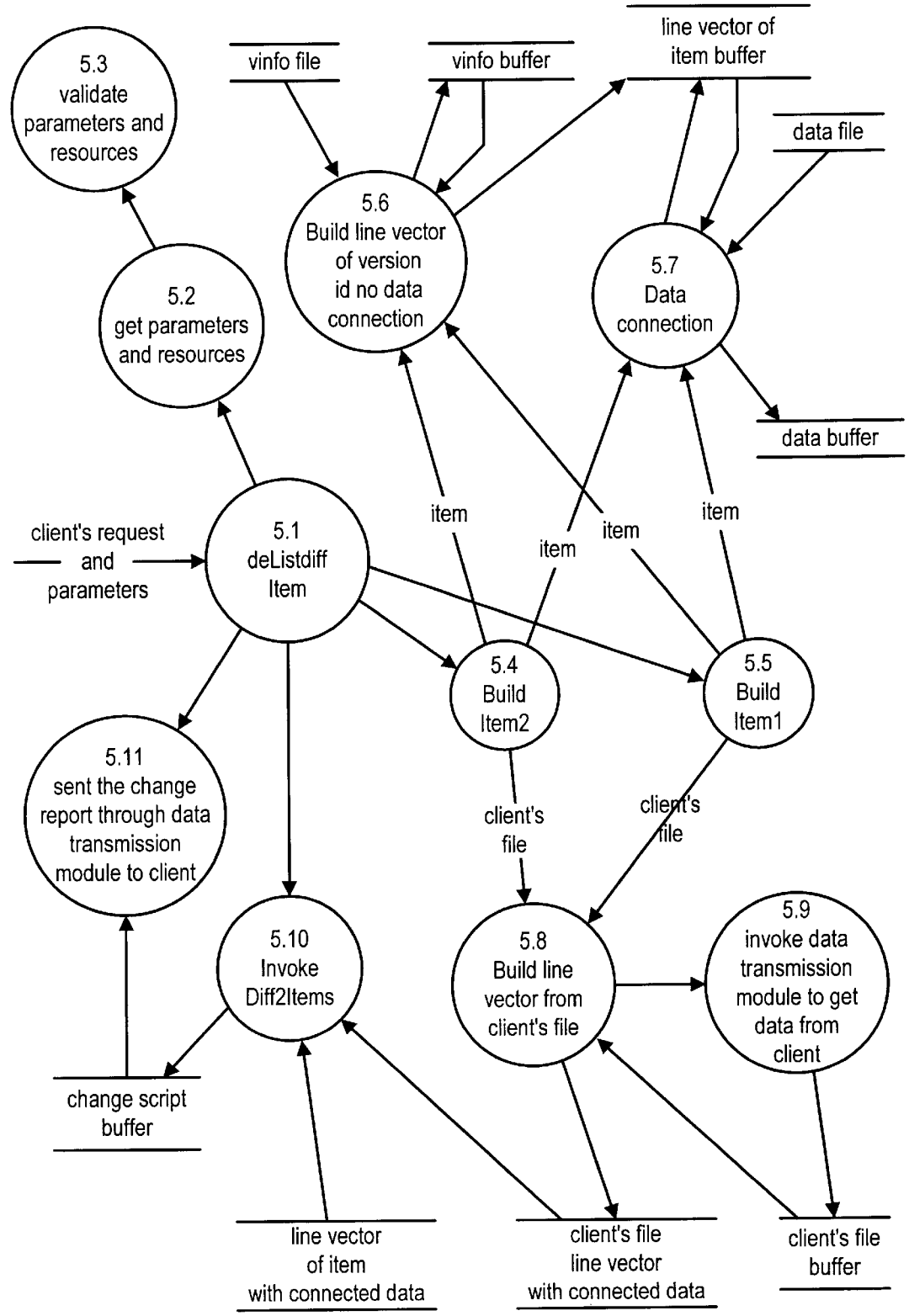
FIG. 59 shows a block diagram of module name: deListdiffitem.

FIG. 59 shows a block diagram of module name: deListdiffitem. deListdiffItem 5.1 receives client's request and parameters. deListdiffItem 5.1 is coupled into get parameters and resources 5.2, build item1 5.5, build item2 5.4, invoke diff2items 5.10, and send the change report through data transmission module to client 5.11. Get parameters and resources 5.2 is coupled into validate parameters and resources 5.3. Build item2 5.4 is coupled through item into build line vector of version id no data connection 5.6 and through item2 data connection 5.7 and through client's file into build line vector from client's file. Build line vector of version id no data connection 5.6 receives input from vinfo file and receives input from and is coupled into vinfo buffer and is coupled into line vector of item buffer. Data connection 5.7 receives input from and is coupled into line vector of item buffer, receives input from data file, and outputs to data buffer. Data connection 5.7 receives input from build item1 5.5 and build item2 5.4. Build line vector from client's file 5.8 receives input from build line item2 5.4, build item1 5.5, and client's file buffer and outputs to invoke data transmission module to get data from client 5.9 and client's file line vector with connected data. Invoke diff2items 5.10 receives input from client's file line vector with connected data and line vector of item with connected data and outputs to change script buffer. Sent the change report through data transmission module to client 5.11 receives input from change script buffer.

Figure 60:
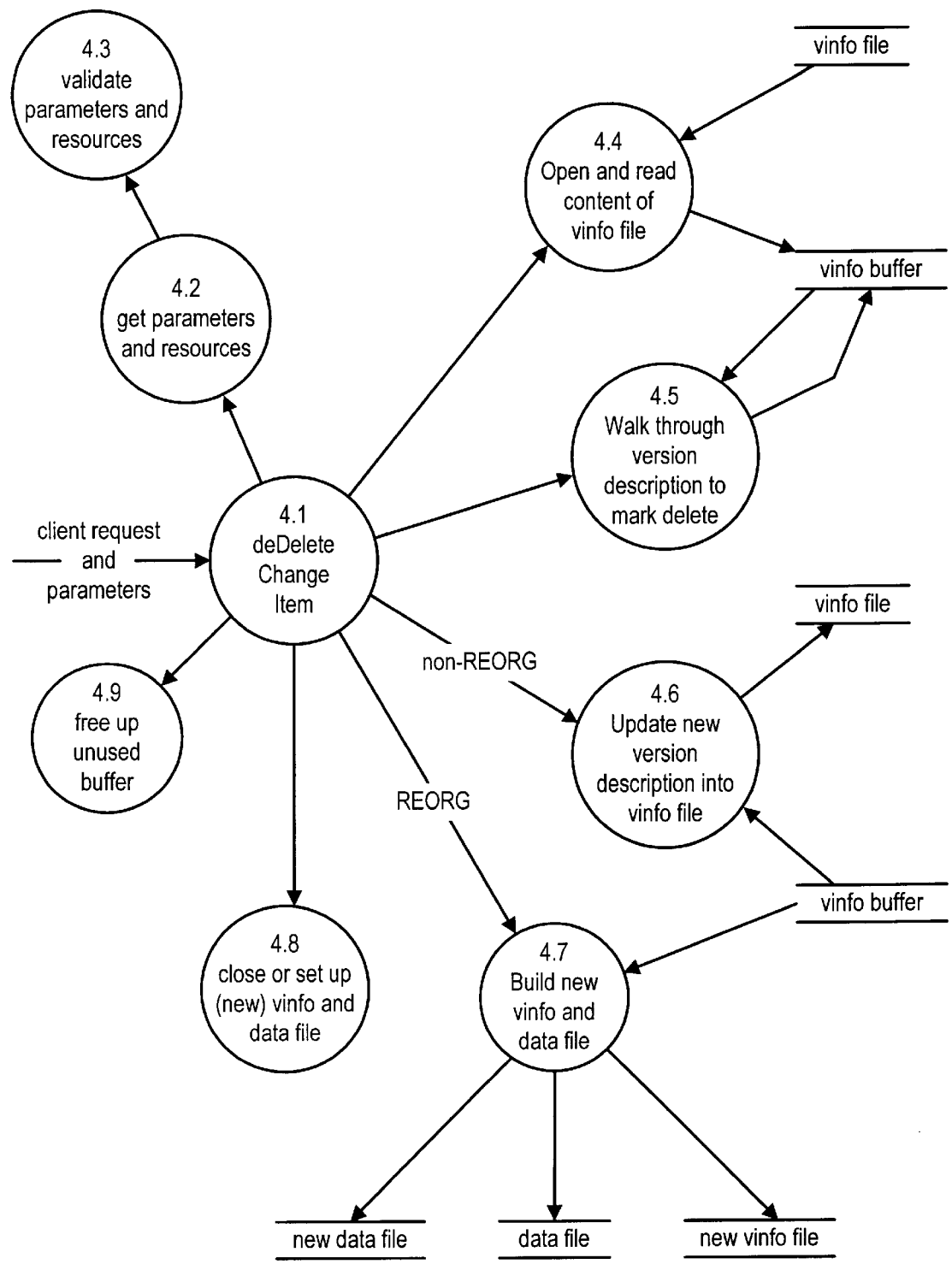
FIG. 60 shows a block diagram of module name: deDeleteChangeitem.

FIG. 60 shows a block diagram of module name: deDeleteChangeItem. deDeleteChangeItem 4.1 receives input client request and parameters and outputs to get parameters and resources 4.2, open and read content of vinfo file 4.4, walk through version description to mark delete 4.5, through non-record to update new version description info file 4.6, through reorg to build new vinfo and data file 4.7, close or set up (new) vinfo and data file 4.8, and free up unused buffer 4.9. Get parameters and resources 4.2 is coupled into validate parameters and resources 4.3. Open and read content of vinfo file 4.4 receives input from vinfo file and outputs to vinfo buffer. Walk through version description to mark delete 4.5 is coupled into vinfo buffer and receives info from vinfo buffer. Update new version description vinfo file 4.6 is coupled into vinfo file and receives input from vinfo buffer. Build new vinfo and data file 4.7 receives input from vinfo buffer and data file and outputs to new data file and vinfo file.

Figure 61:
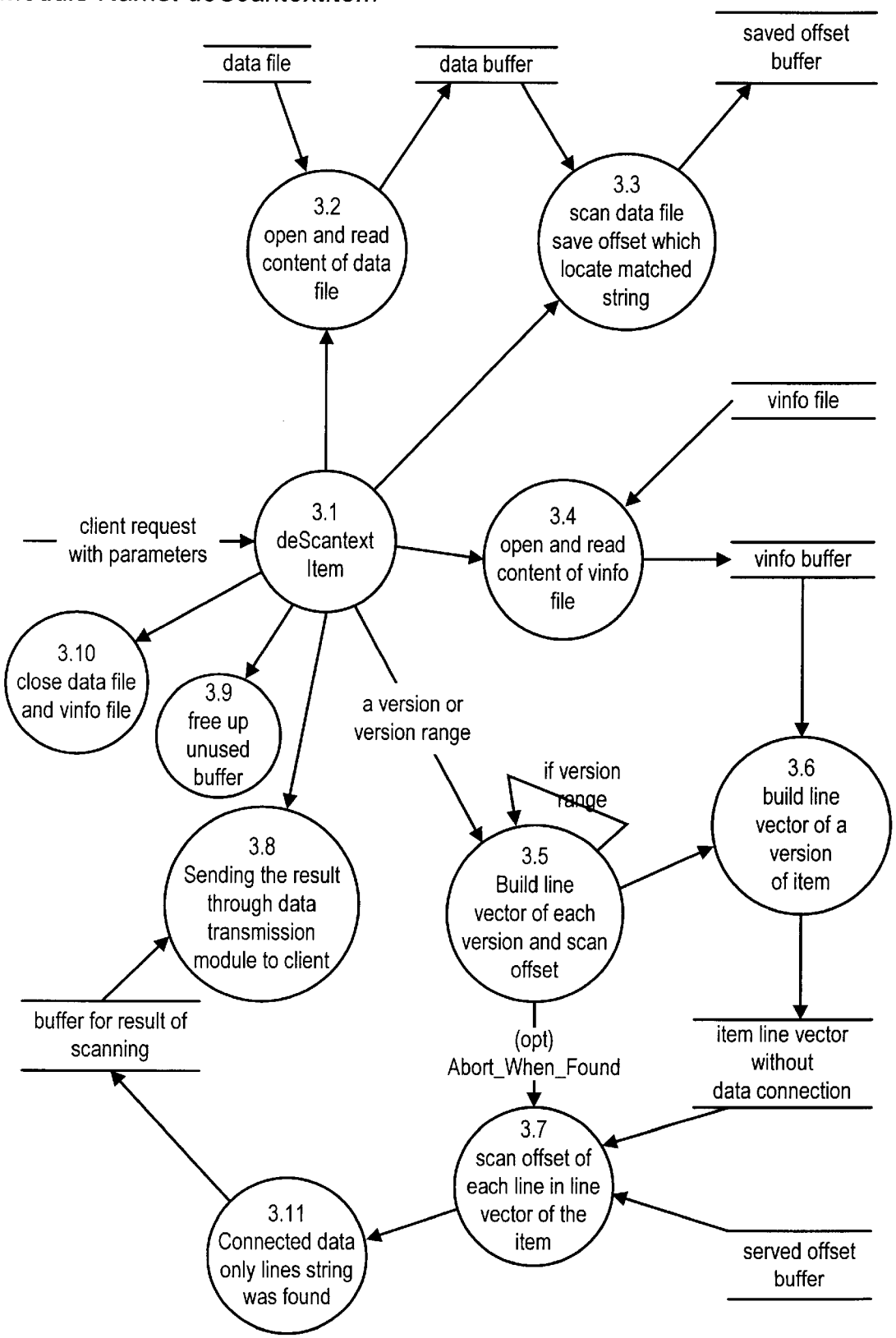
FIG. 61 shows a block diagram of module name: deScantextitem.

FIG. 61 shows a block diagram of module name: deScantextItem. deScantextItem 3.1 receives input client request with parameters. deScantextItem 3.1 is coupled into open and read content of data file 3.2, scan data file save offset which locate matching string 3.3, open and read content of vinfo file 3.4, through a version or a version range into build line vector of each version and scan offset 3.5, sending the result through data transmission module to client 3.8, free up unused buffer 3.9, and close data file and vinfo file 3.10. Open and read content of data file 3.2 receives input from data file and outputs to data buffer. Scan data file save offset which locate matched string 3.3 receives input from data buffer and outputs to saved offset buffer. Open and read content of vinfo file 3.4 receives input from vinfo file and outputs to vinfo buffer. Build line vector of each version and scan offset 3.5, outputs to build line vector of version of item 3.6, and through (opt) abort_when_found to scan offset of each line in line vector of the item 3.7. Build line vector of version of item 3.6 receives input from vinfo buffer and outputs to line vector without data connection. Line vector without data connection is input into scan offset of each inline vector of the item 3.7, which also receives input from saved offset buffer and outputs to connected data only lines string was found 3.11. Connected data only lines string was found 3.11 outputs to buffer for a result of scanning, which inputs to sending the result through data transmission module to client 3.8.

Figure 62:
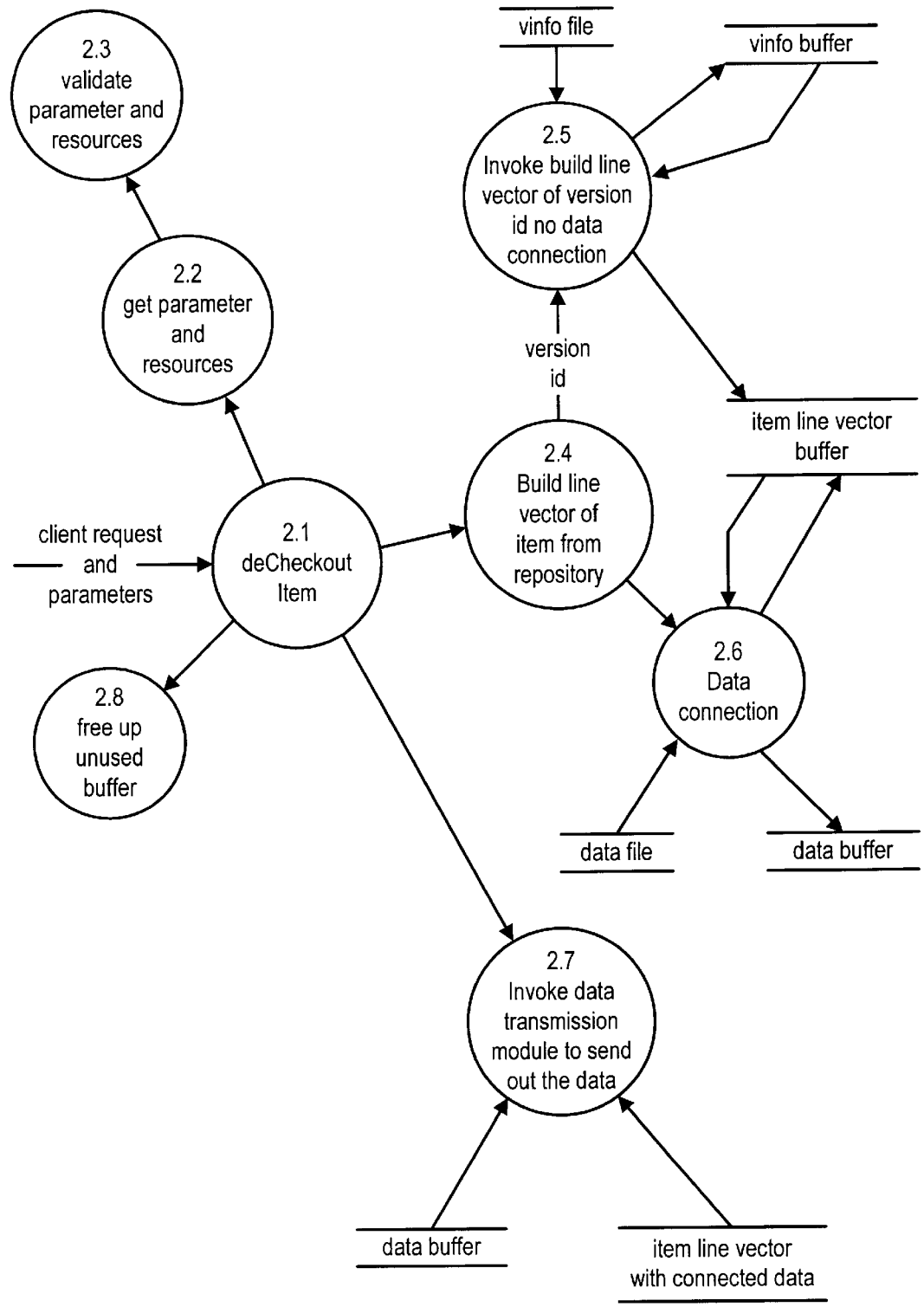
FIG. 62 shows a block diagram of module name: deCheckoutitem.

FIG. 62 shows a block diagram of module name: deCheckoutitem. deCheckout Item 2.1 receives client request and parameters and outputs to get parameter and resources 2.2, build line vector of item from repository 2.4, invoke data transmission module to send out the data 2.7, and free up unused buffer 2.8. Get parameter and resources 2.2 outputs to validate parameter and resources 2.3. Build line vector of item from repository 2.4 is coupled through version id into invoke build line vector of version id no data connection 2.5, and data connection 2.6. Invoke build line vector of version id no data connection 2.5 receives input from vinfo file and vinfo buffer and outputs to vinfo buffer and item line vector buffer. Data connection 2.6 receives input from and outputs to line item vector buffer and receives input from data file and outputs to data buffer. Invoke data transmission module to send out the data 2.7 receives input from data buffer and item line vector with connected data.

Figure 63:
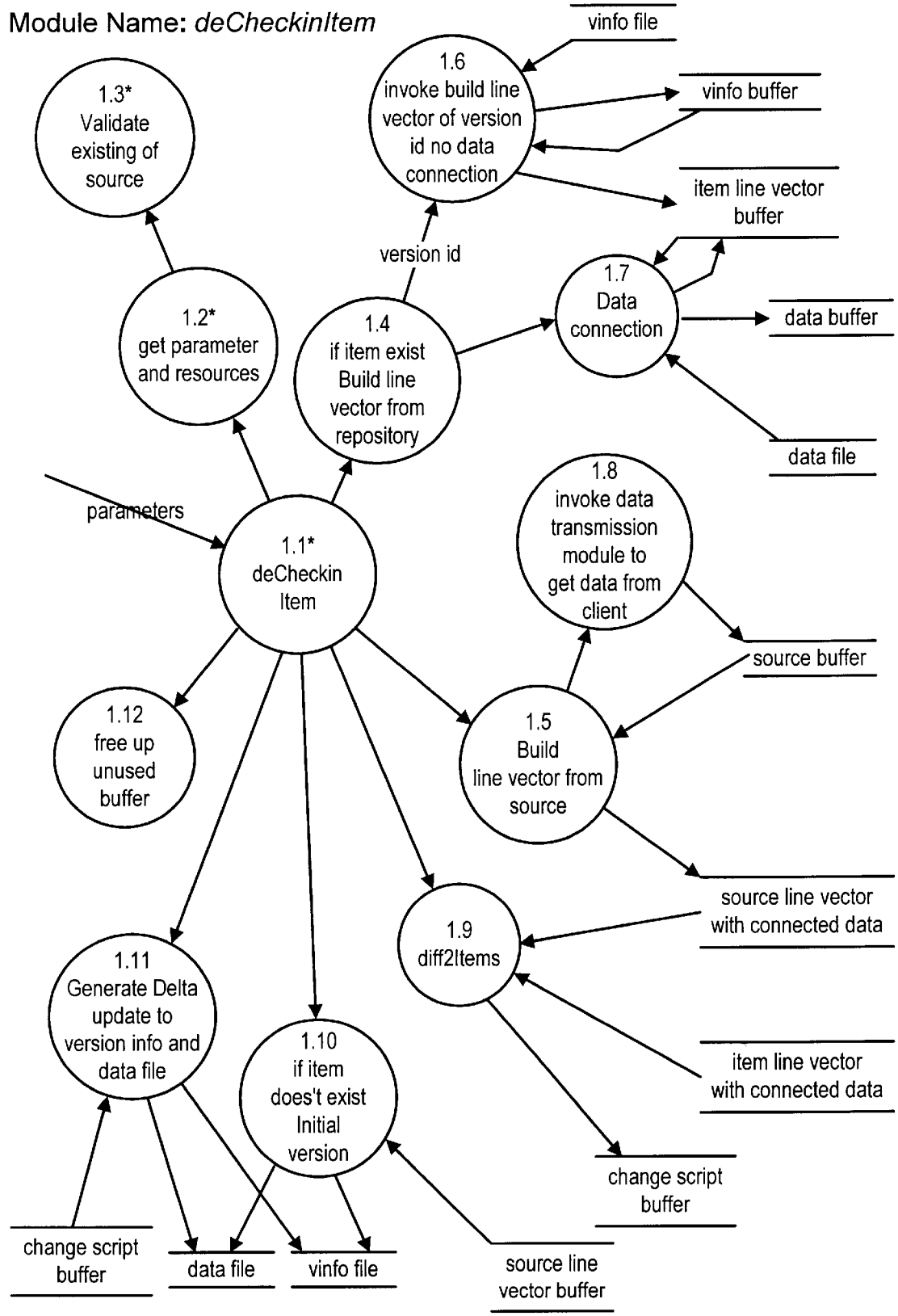
FIG. 63 shows a block diagram of module name: deCheckinItem.

FIG. 63 shows a block diagram of module name: deCheckinitem. deCheckin Item 1.1 receives parameters and is coupled to get parameter and resources 2.1, if item exists build line vector from repository 1.4, build line vector from source 1.5, diff2items 1.9, if item doesn't exist initial version 1.10, generate delta update to version info and data file 1.11, and free up unused buffer 1.12. Get parameter and resources 1.2 is coupled into validate existing of source. If item exists build line vector from repository 1.4 is coupled into invoke build line vector of version id no data connection 1.6 through version id and to data connection 1.7. Invoke build line vector of version id no data connection 1.6 receives input from vinfo file and vinfo buffer and is coupled into line item vector buffer. Data connection 1.7 receives input from data file and item line vector buffer and outputs to data buffer. Build line vector from source 1.5 is coupled into invoke data transmission module to get data from client 1.8, which is coupled into source buffer, and into source line vector with connected data. Build in line vector from source 1.5 receives data from source buffer. Diff2items 1.9 receives input from source line vector with connected data and item line vector with connected data and outputs to change script buffer. If item doesn't exist initial version 1.10 receives input from source line vector buffer and outputs to vinfo file and data file. Generate delta update to version info and data file 1.11 outputs to vinfo file and data file and receives input from change script buffer.

Figure 64:
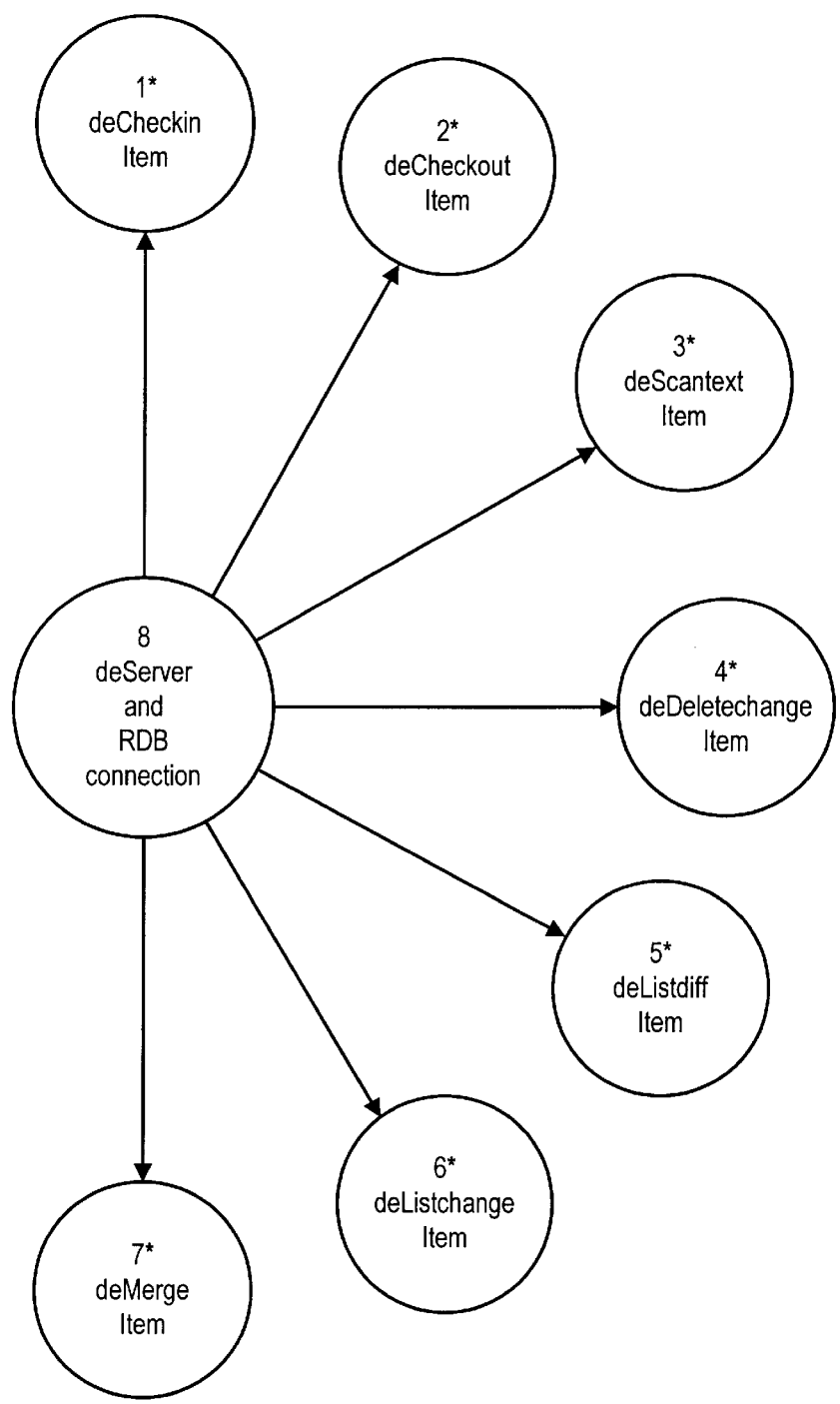
FIG. 64 shows a block diagram of module name: Delta Engine Component.

FIG. 64 shows a block diagram of module name: Delta Engine Component. deServer and RDB connection 8 is coupled into deCheckin Item 1, deCheckout Item 2, deScantext Item 3, deDeletechange Item 4, deListdiff Item 5, deListchange Item 6, and deMerge Item 7.

Although the present invention has been described in detail with reference only to the presently-preferred embodiments, those of ordinary skill in the art will appreciate that various modifications can be made without departing from the invention. Accordingly, the invention is defined by the following claims.

I claim:

1. A version management system for storing and retrieving user-selectable versions of a document maintained in a computer which has a displayer, comprising:

a user interface;

document processing software executable by the computer for driving said displayer to generate a display representing at least a portion of the document;

a first version control file for storing an original version of the document and at least one set of variable-sized delta-formatted data records representing differences between two user-selectable versions of the document;

a second version control file comprising at least one set of pointers for selecting a set of said delta-formatted records from said first version control file; said set of pointers corresponding to a user-selectable version of the document; and a version management processor for fetching and processing said delta-formatted difference data to regenerate said user-selectable version of the document and supplying said regenerated user-selectable version of a document to said document processing software in accordance with selection by the user.

2. The system of claim 1, wherein said version management processor comprises a delta processor for applying said delta-formatted data records from said first version control file to said original version of the document to regenerate a second version of the document.

3. The system of claim 1, additionally comprising:

means for selecting a first and a second version of the document; and means for formatting and displaying said first version of a document comprised of the plurality of display fields with a first of said display fields displaying document data in a first format where said document data is the same in said second version as in said first version and with a second of said display fields displaying document data in a modified format where said document data is different in said second version than in said first version.

4. The system of claim 3, wherein said modified format is selected from the group of bolding, font selection or color.

5. The system of claim 3, additionally comprising a configuration file for storing user-alterable data; wherein said modified format is selectable according to said user-alterable data.

6. The system of claim 1, wherein said document processing software is spreadsheet processing software and said original version document is a spreadsheet document.

7. The system of claim 6, wherein said spreadsheet processing software is selected from the group of Lotus 1-2-3, Microsoft Excel and Borland Quattro Pro.

8. The system of claim 7, additionally comprising formatting means to display said differences on said regenerated next document wherein unchanged data is represented with a value of 0.

9. The system of claim 1, wherein said document processing software is a word processing software and said original version document is a word processing document.

10. The system of claim 9, wherein said word processing software is selected from the group of Microsoft Word, WordPerfect and Lotus Ami Pro.

11. The system of claim 1, wherein said delta-formatted data records represent differences between two consecutive versions of the document.

12. The system of claim 1, wherein said delta-formatted data records represent differences between a user-selectable version of the document and said original version of the document.

13. The system of claim 1, wherein said second version control file additionally comprises data for identifying a version of the document.

14. The system of claim 1, wherein said user-selection means comprises means for selecting the document by identifying the document by a name and a version number.

15. The system of claim 14, wherein said document name and said version are selectable from a list of existing document versions.

16. A method for storing, retrieving and displaying a user-selectable version document maintained in a computer and supplying said version documents to document processing software, comprising the steps of:

1) identifying said user-selectable version document by a name and a version number;

2) retrieving an original version of said user-selectable version document document to form a first prior version document;

3) retrieving a set of variable-sized delta-formatted data representing difference data from said first prior version document;

4) applying said difference data to said first prior version document to regenerate a next prior version document;

5) repeating steps 3–4 for until said delta-formatted data representative of said user-selectable version document has been processed;

6) supplying said regenerated document to said document processing software; and 7) creating a display which includes at least a portion of said regenerated document.

17. The system of claim 16, wherein said document processing software is spreadsheet processing software and said documents are spreadsheet documents.

18. The system of claim 17, wherein said spreadsheet processing software is selected from the group of Lotus 1-2-3, Microsoft Excel and Borland Quattro Pro.

19. The system of claim 16, wherein said document processing software is a word processing software and said documents are word processing documents.

20. The system of claim 19, wherein said word processing software is selected from the group of Microsoft Word, WordPerfect and Lotus Ami Pro.

21. A method for storing, retrieving and displaying a user-selectable version document maintained in a computer and supplying said documents to document processing software, comprising the steps of:

1) identifying said user-selectable version document by a name and a version number;

2) retrieving an original version of said user-selectable version document;

3) retrieving a set of variable-sized delta-formatted data representing difference data from said original version document to said user-selectable version document;

4) applying said difference data to said original version document to regenerate said user-selectable version document;

5) supplying said regenerated document to said document processing software; and 6) operating said document processing software to create a display that displays at least part of said regenerated document.

22. The system of claim 21, wherein said document processing software is spreadsheet processing software and said documents are spreadsheet documents.

23. The system of claim 21, wherein said spreadsheet processing software is selected from the group of Lotus 1-2-3, Microsoft Excel and Borland Quattro Pro.

24. The system of claim 21, wherein said document processing software is word processing software and said documents are word processing documents.

25. The system of claim 24, wherein said word processing software is selected from the group of Microsoft Word, WordPerfect and Lotus Ami Pro.

26. A system for displaying the differences between two versions of a document each having a display format, comprising:

means for selecting a first and a second version of a document; and means for formatting and displaying said first version of a document comprised of a plurality of display fields with a first of said display fields displaying said document data in a first format where said document data is the same in said second version as in said first version and with a second of said display fields displaying document data in a modified format where said document data is different in said second version than in said first version.

27. The system of claim 26, wherein said modified format is user-selectable from the group of bolding, font selection or color.

28. The system of claim 27, additional comprising a configuration file for storing data corresponding to said user-selectable modified format.

29. The system of claim 26, additionally comprising delta-formatting means for storing and fetching said first and second versions.

* * * * *